United States Patent
Asami

(10) Patent No.: US 9,036,278 B2
(45) Date of Patent: May 19, 2015

(54) IMAGING LENS AND IMAGING DEVICE

(75) Inventor: Taro Asami, Saitama-ken (JP)

(73) Assignee: FUJIFILM CORPORATION, Tokyo (JP)

( * ) Notice: Subject to any disclaimer, the term of this patent is extended or adjusted under 35 U.S.C. 154(b) by 0 days.

(21) Appl. No.: 14/063,099

(22) PCT Filed: Apr. 27, 2012

(86) PCT No.: PCT/JP2012/002899
§ 371 (c)(1),
(2), (4) Date: Oct. 25, 2013

(87) PCT Pub. No.: WO2012/147359
PCT Pub. Date: Nov. 1, 2012

(65) Prior Publication Data
US 2014/0078604 A1  Mar. 20, 2014

(30) Foreign Application Priority Data
Apr. 28, 2011  (JP) .................. 2011-101177

(51) Int. Cl.
*G02B 13/04* (2006.01)
*G02B 9/34* (2006.01)
(Continued)

(52) U.S. Cl.
CPC  *G02B 13/04* (2013.01); *G02B 9/34* (2013.01); *G02B 13/004* (2013.01); *G02B 13/06* (2013.01)

(58) Field of Classification Search
CPC ............ G02B 13/04; G02B 9/34; G02B 9/60; G02B 9/62; G02B 9/64
USPC ......... 359/650, 749, 755–757, 761–763, 770, 359/771, 781
See application file for complete search history.

(56) References Cited

U.S. PATENT DOCUMENTS

| | | |
|---|---|---|
| 7,280,289 B2 | 10/2007 | Yamakawa |
| 7,697,221 B2 | 4/2010 | Mori |
| 8,379,326 B2 * | 2/2013 | Yamakawa .................. 359/715 |

(Continued)

FOREIGN PATENT DOCUMENTS

| | | |
|---|---|---|
| EP | 1975664 | 10/2008 |
| JP | 2005-227426 | 8/2005 |

(Continued)

OTHER PUBLICATIONS

International Search Report PCT/JP2012/002899 dated Aug. 21, 2012, with English translation.

(Continued)

*Primary Examiner* — Darryl J Collins
(74) *Attorney, Agent, or Firm* — Young & Thompson

(57) ABSTRACT

An imaging lens consists of a negative first lens, a negative second lens, a third lens of a plano-convex shape having a convex surface directed toward an object side or of a positive meniscus shape having a convex surface directed toward the object side, and a fourth lens of a plano-convex shape having a convex surface directed toward an image side or of a positive meniscus shape having a convex surface directed toward the image side, which are arranged in this order from the object side. Further, the following conditional formula (1) is satisfied:

$$2.25 < vd2/vd3 \qquad (1),$$ where vd2: an Abbe number of a material of the second lens for d-line, and
vd3: an Abbe number of a material of the third lens for d-line.

21 Claims, 31 Drawing Sheets

(51) Int. Cl.
  *G02B 13/00* (2006.01)
  *G02B 13/06* (2006.01)

(56) References Cited

U.S. PATENT DOCUMENTS

| | | | |
|---|---|---|---|
| 8,416,511 | B2 | 4/2013 | Asami |
| 2007/0183062 | A1 | 8/2007 | Nakamura |
| 2008/0239517 | A1 | 10/2008 | Mori |
| 2008/0316618 | A1 | 12/2008 | Yamakawa et al. |
| 2010/0246029 | A1* | 9/2010 | Asami ............ 359/708 |
| 2010/0259835 | A1 | 10/2010 | Asami |
| 2012/0147484 | A1* | 6/2012 | Asami ............ 359/753 |

FOREIGN PATENT DOCUMENTS

| | | |
|---|---|---|
| JP | 2007-206516 | 8/2007 |
| JP | 2009-003343 | 1/2009 |
| JP | 2009-265354 | 11/2009 |
| JP | 2010-014855 | 1/2010 |
| JP | 2011-065132 | 3/2011 |
| TW | 390459 | 10/2010 |

OTHER PUBLICATIONS

Extended European search report, dated Nov. 26, 2014, in corresponding European Patent Application No. 12776822.4.
Extended European search report, dated Mar. 23, 2015, in corresponding European Patent Application No. 12776822.4.
Robert R. Shannon, "The art and design of optical design/ Abberations", Aug. 1, 1997, The Art and Science of Optical Design, Cambridge University Press, pp. 178-191.
Warren J. Smith, "Modern Lens Design", Jan. 1, 1992, pp. 25-27.

* cited by examiner

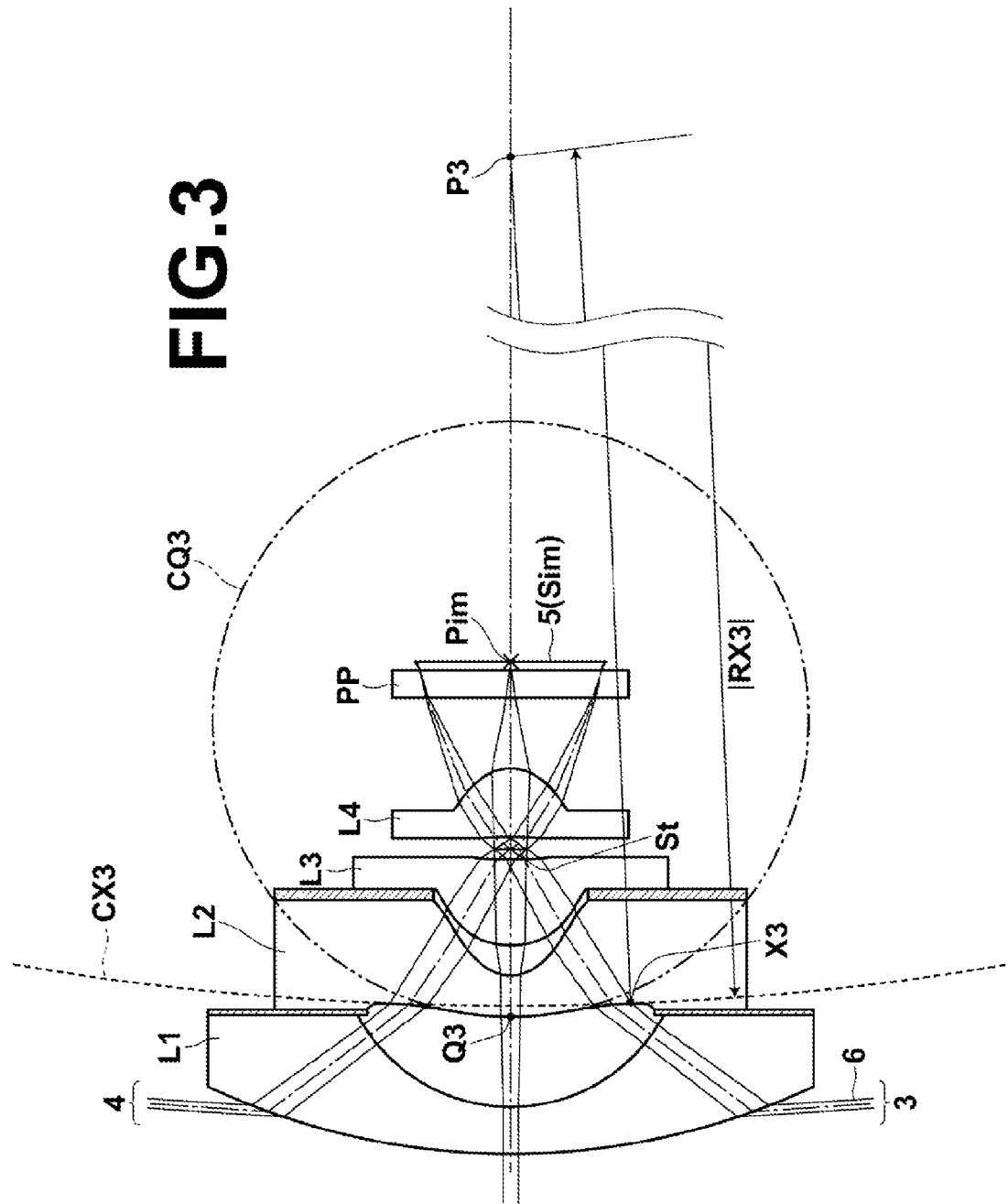

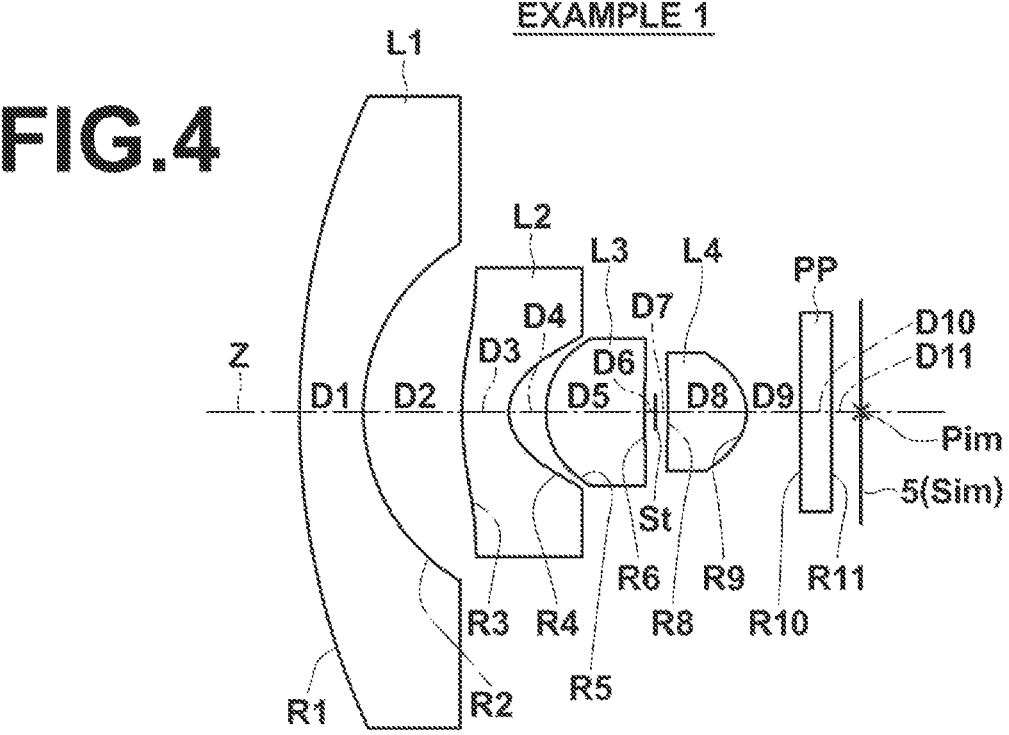
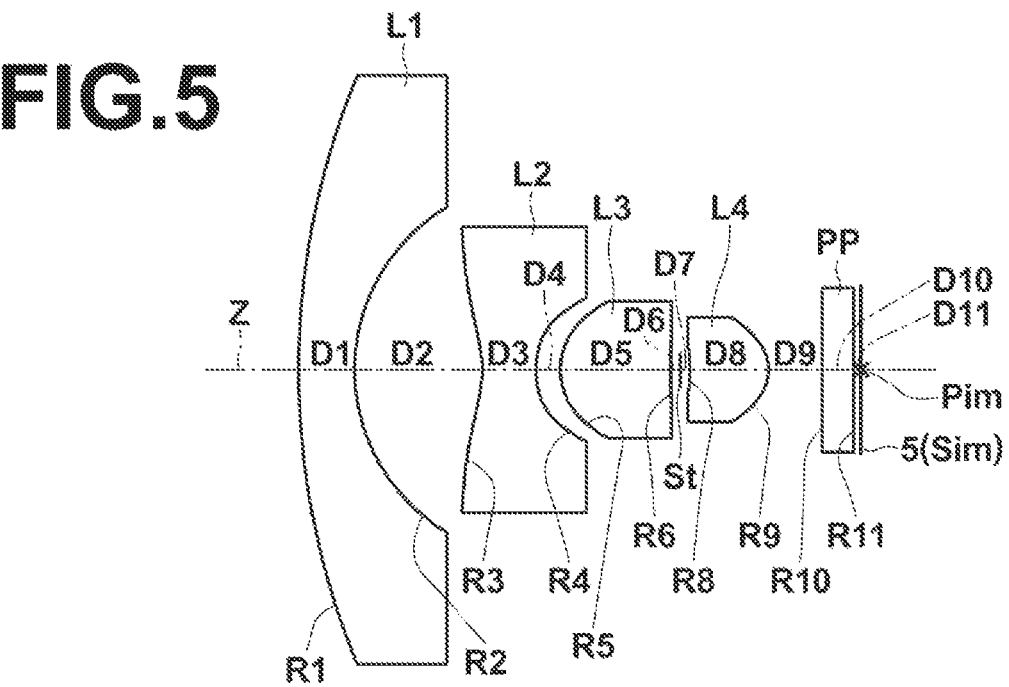

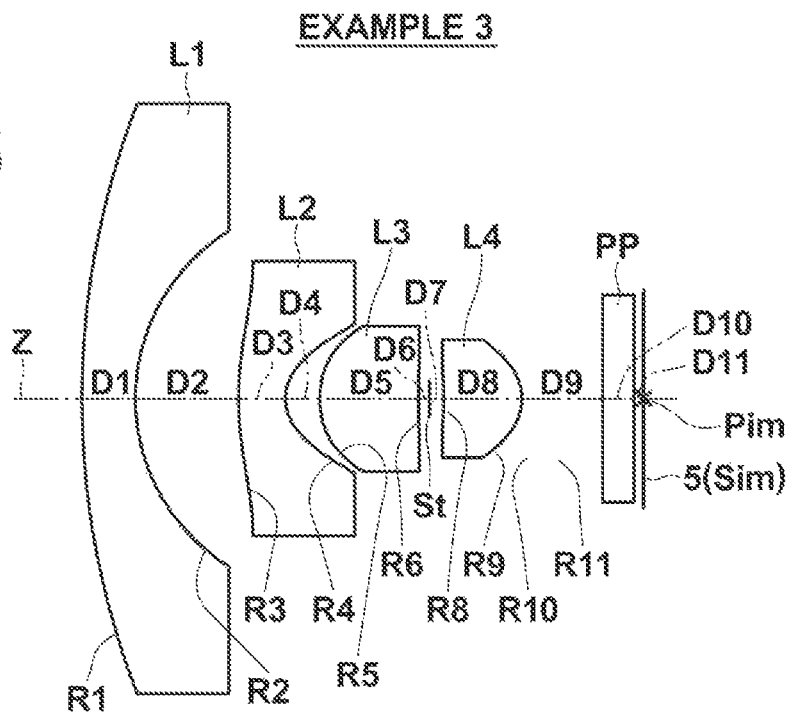
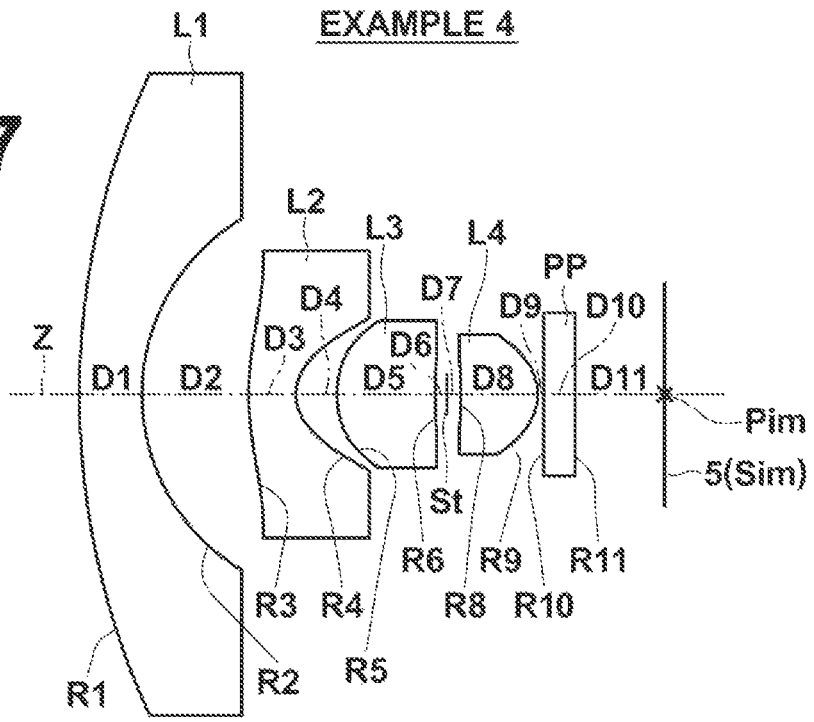

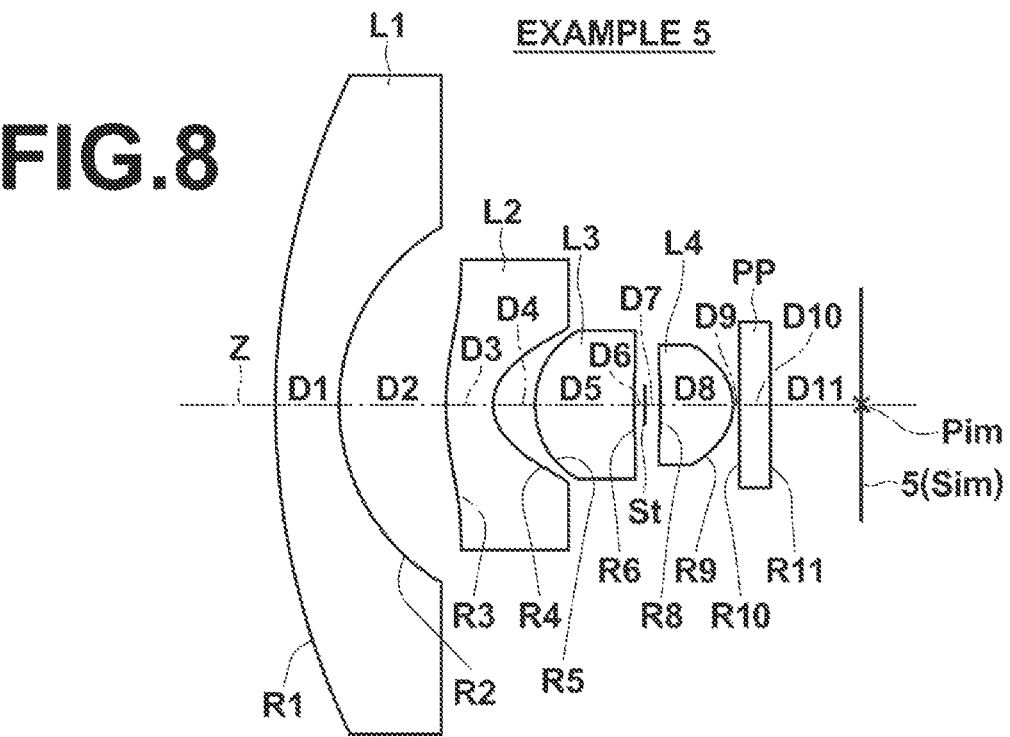
FIG.8  EXAMPLE 5
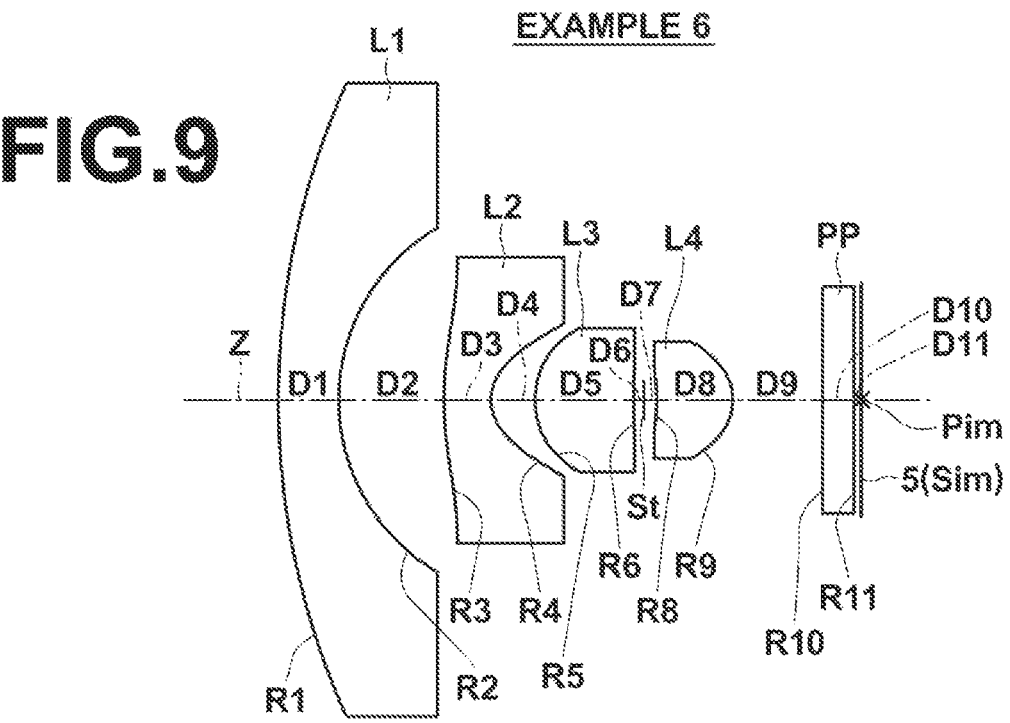
FIG.9  EXAMPLE 6

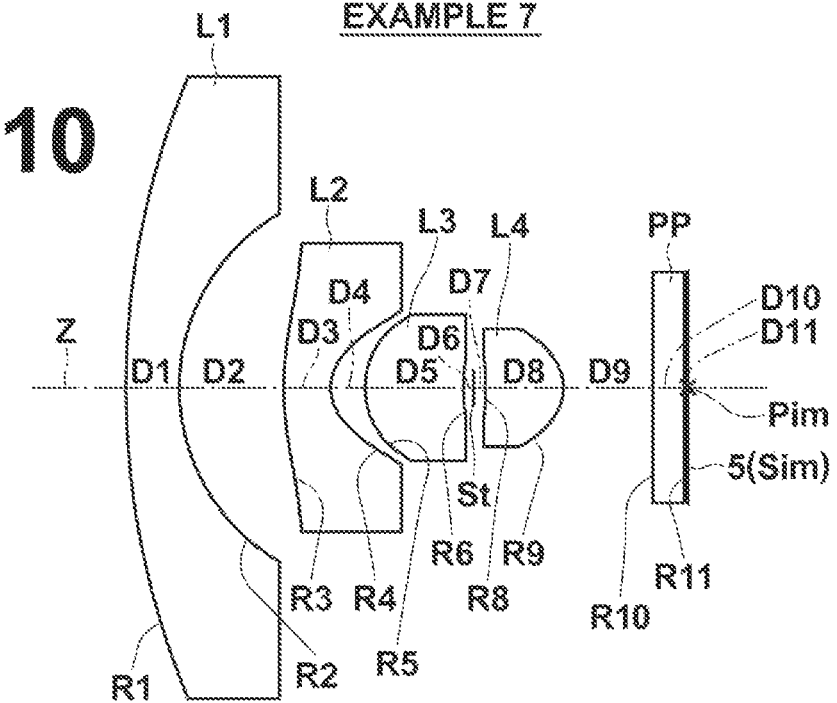
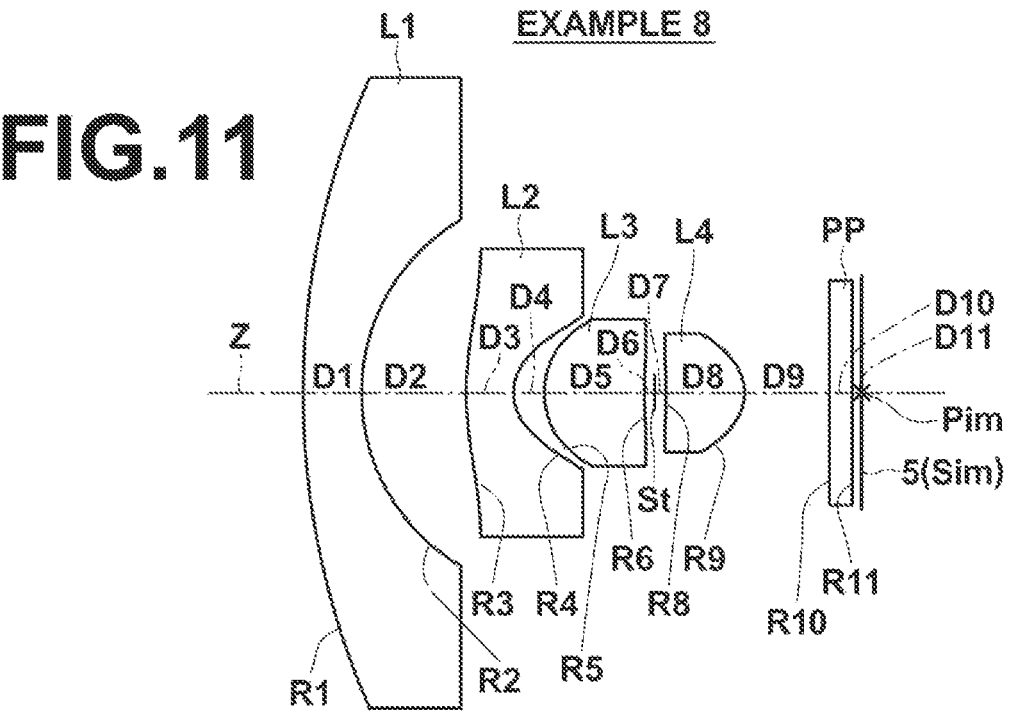

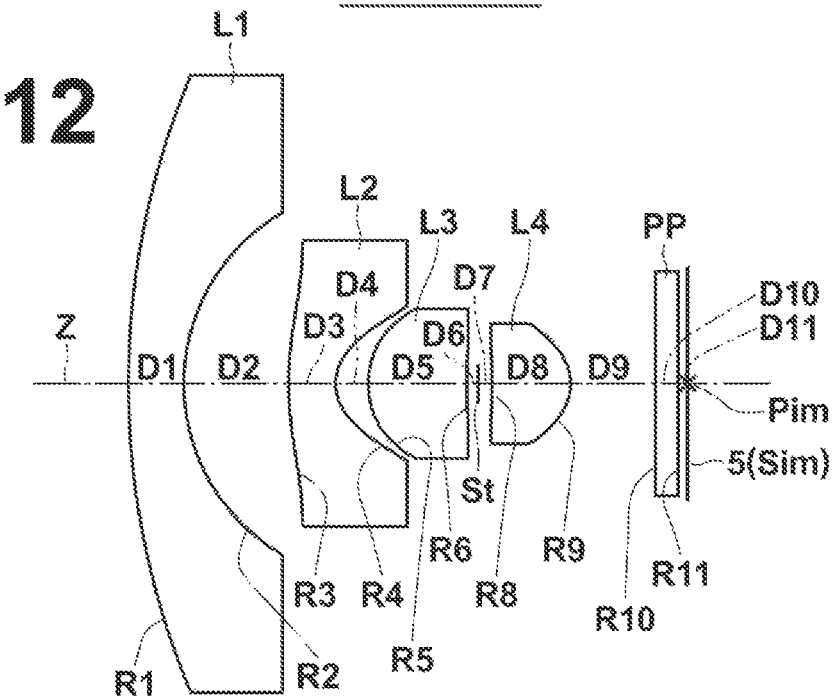
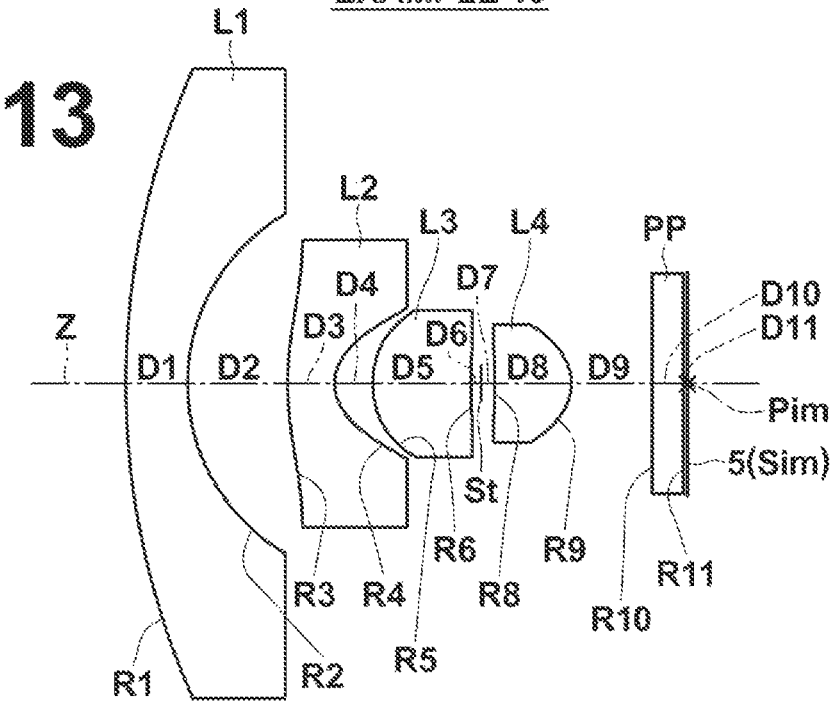

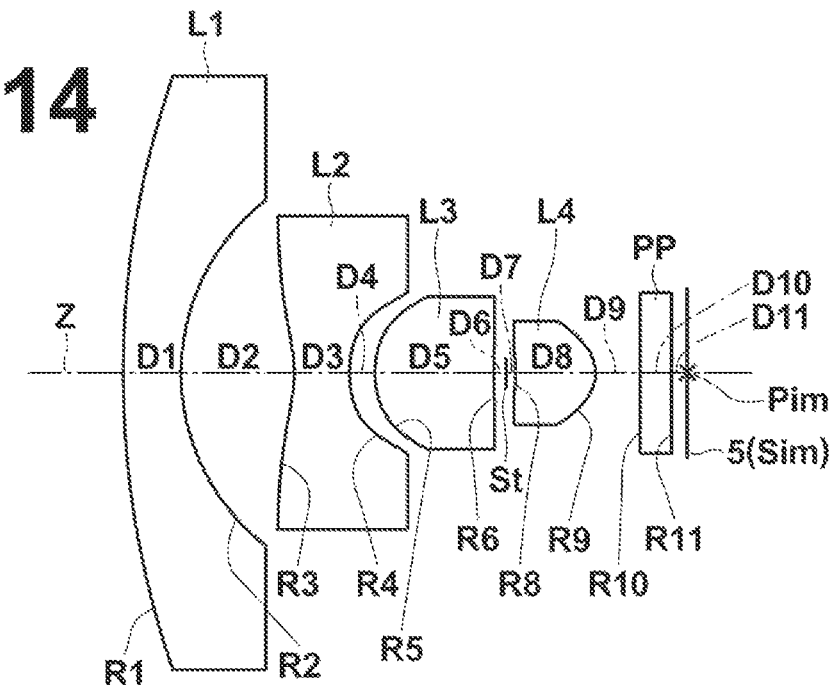
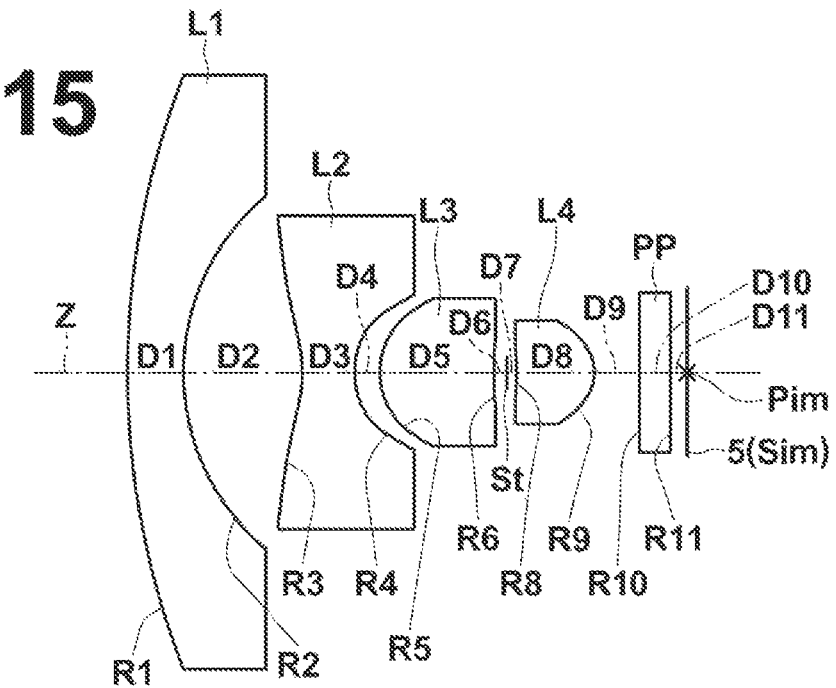

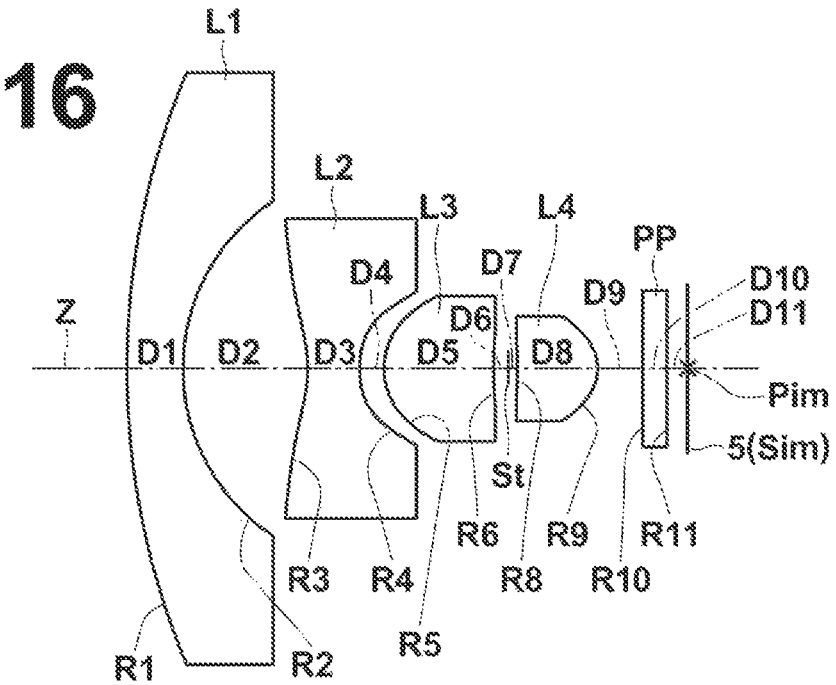
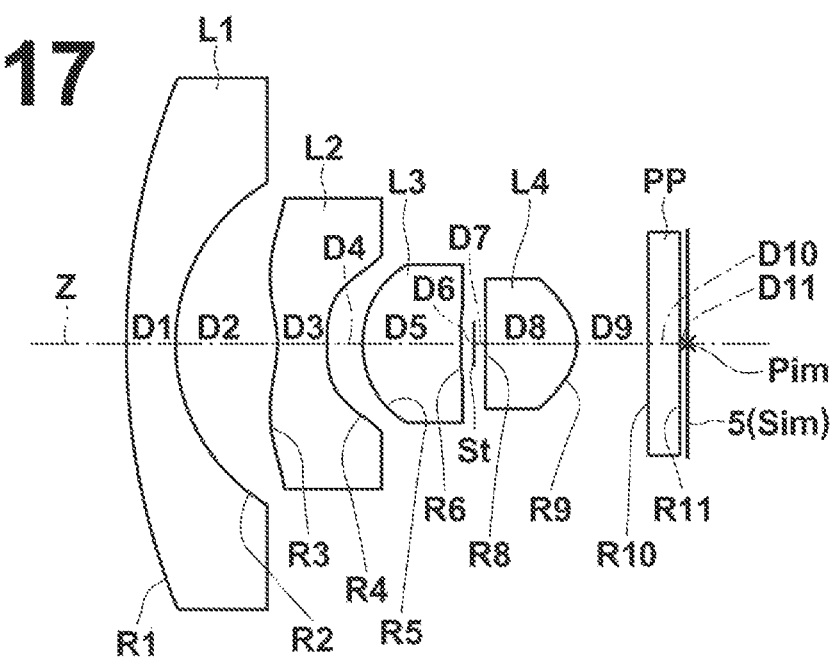

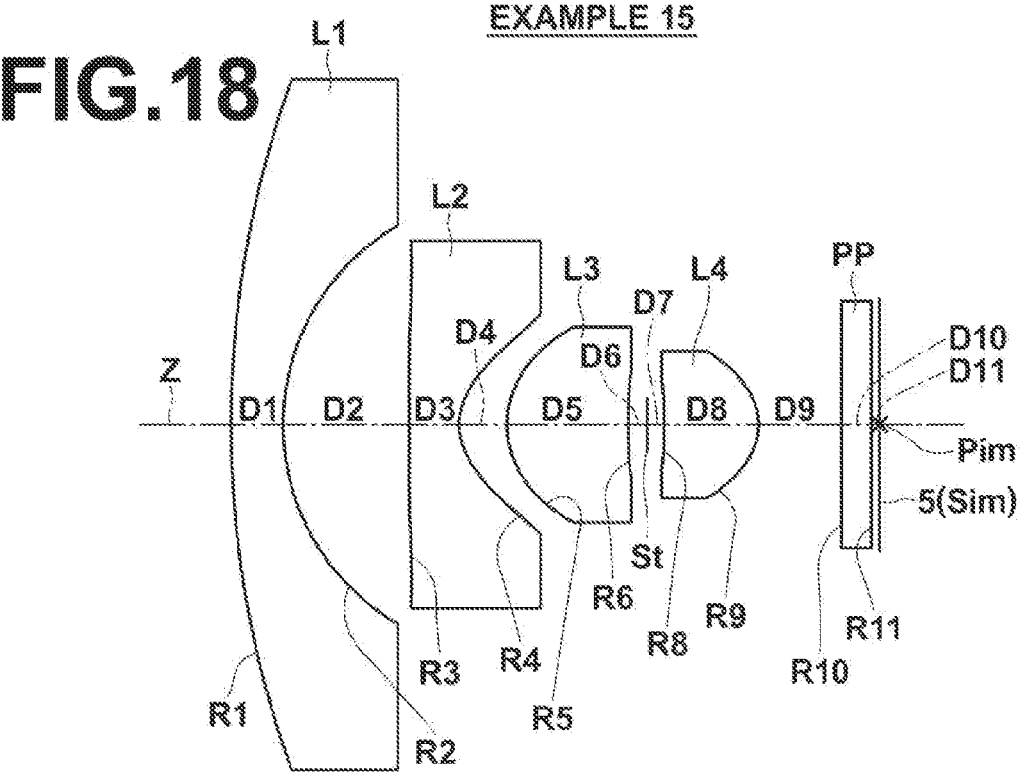
FIG.18 EXAMPLE 15
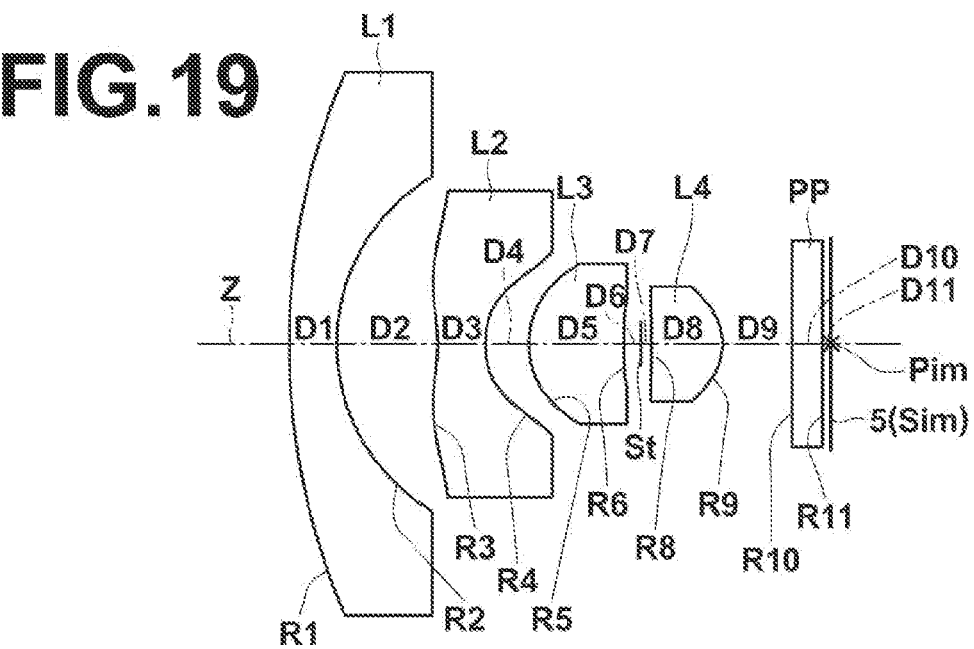
FIG.19 EXAMPLE 16

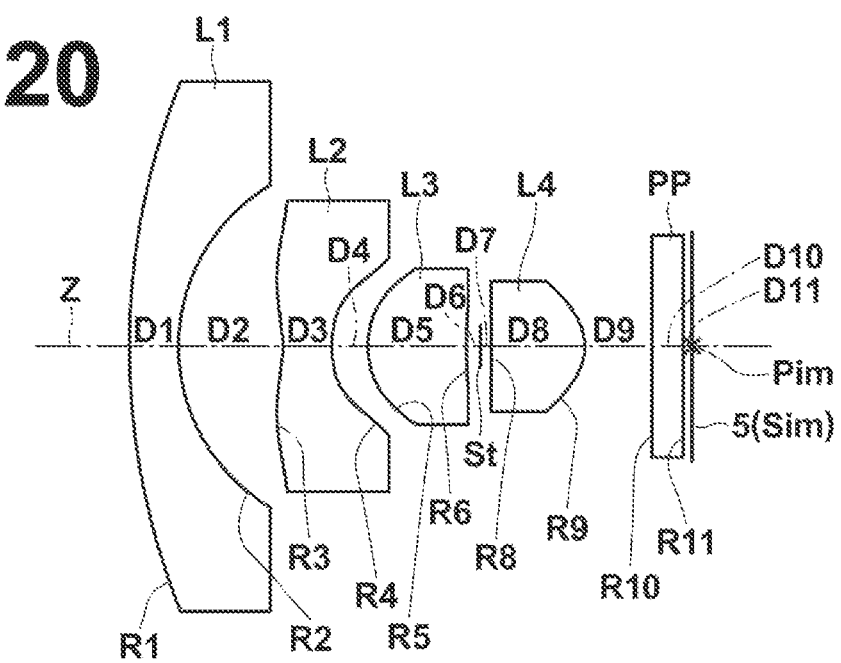
FIG.20 EXAMPLE 17
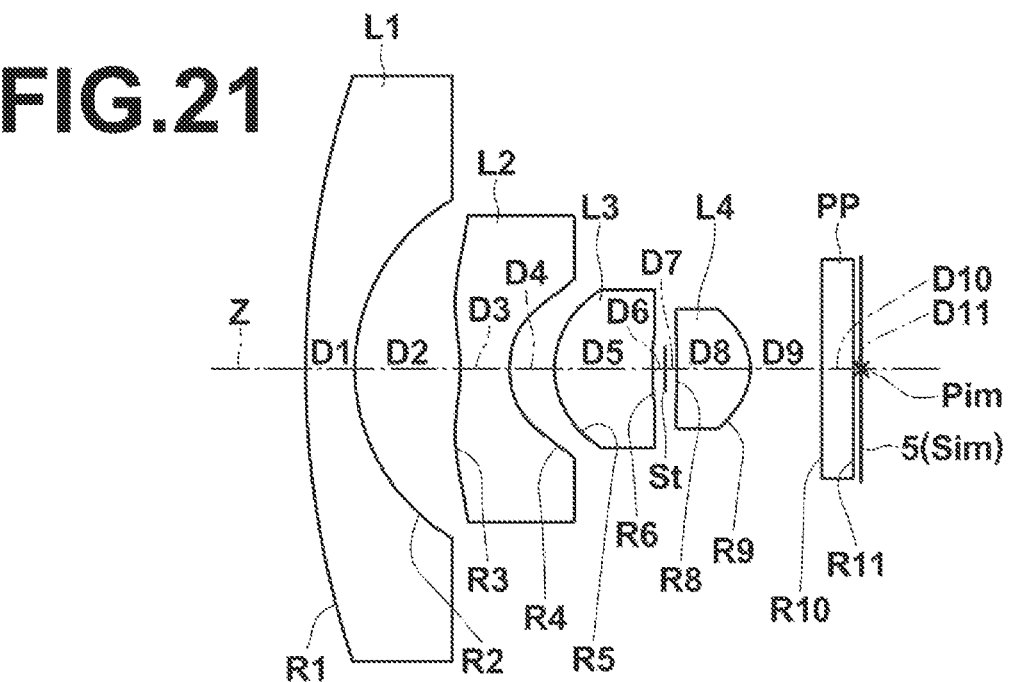
FIG.21 EXAMPLE 18

EXAMPLE 19
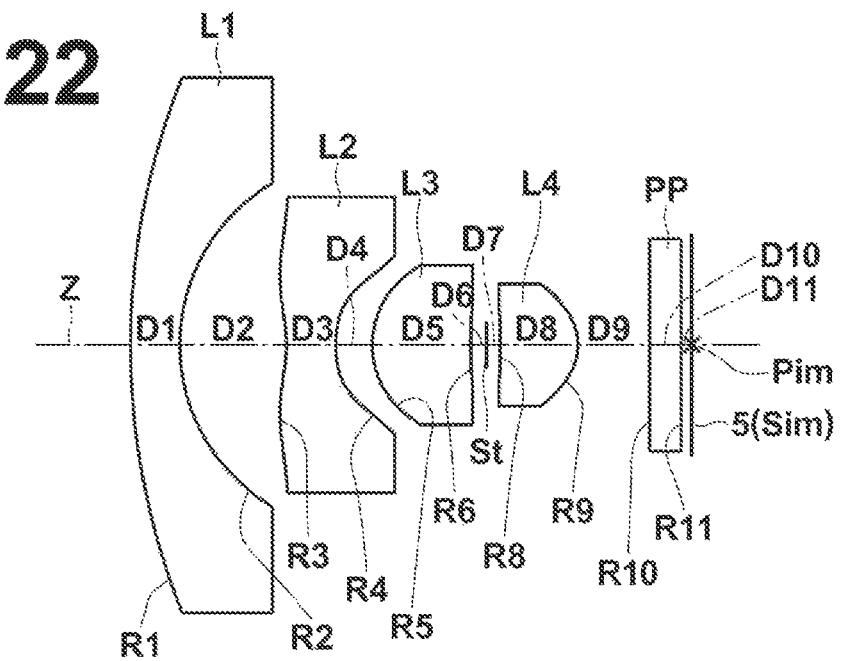
EXAMPLE 20
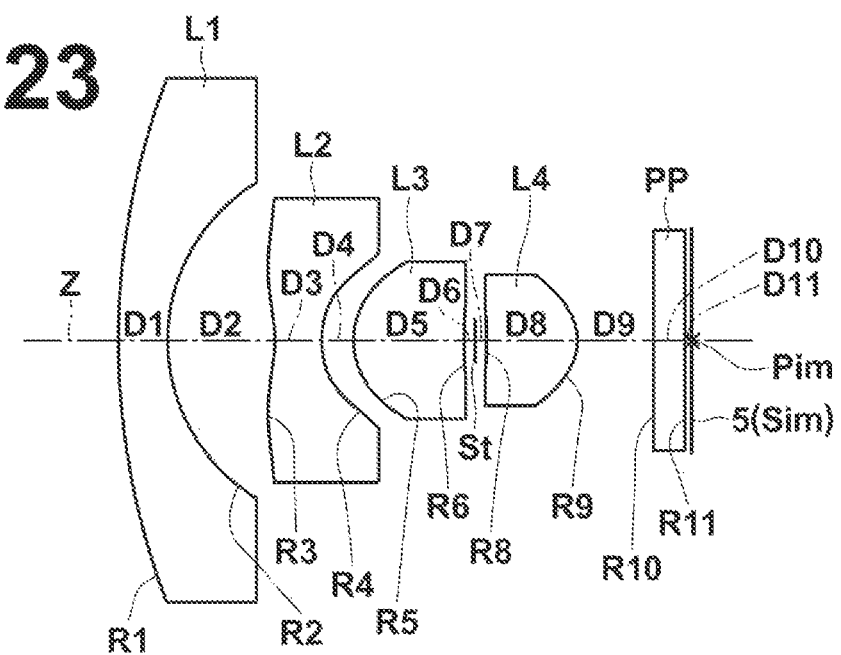

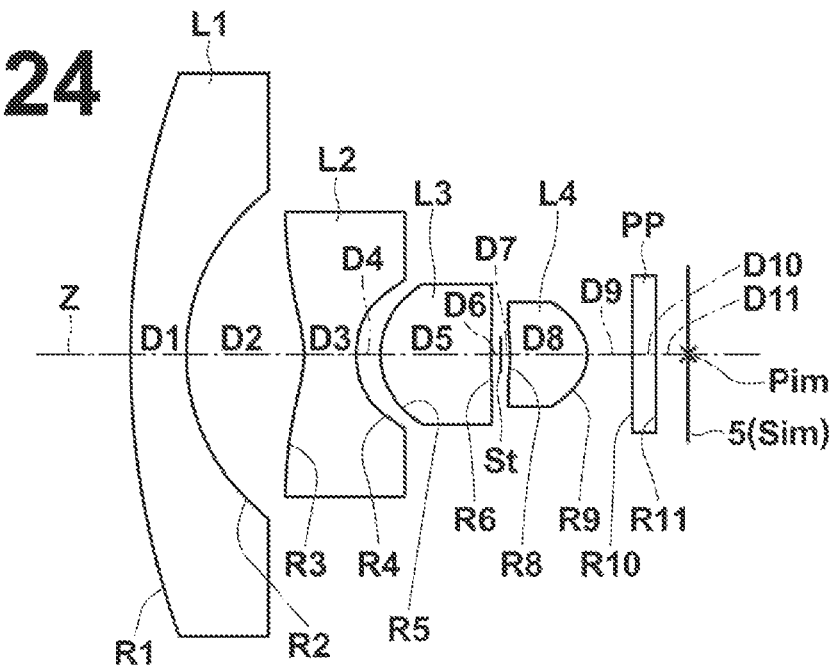
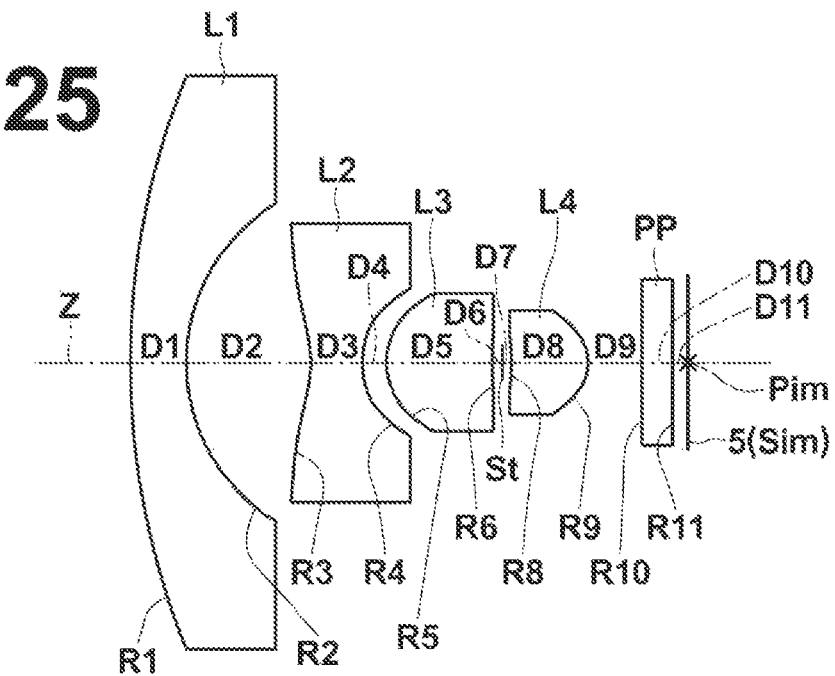

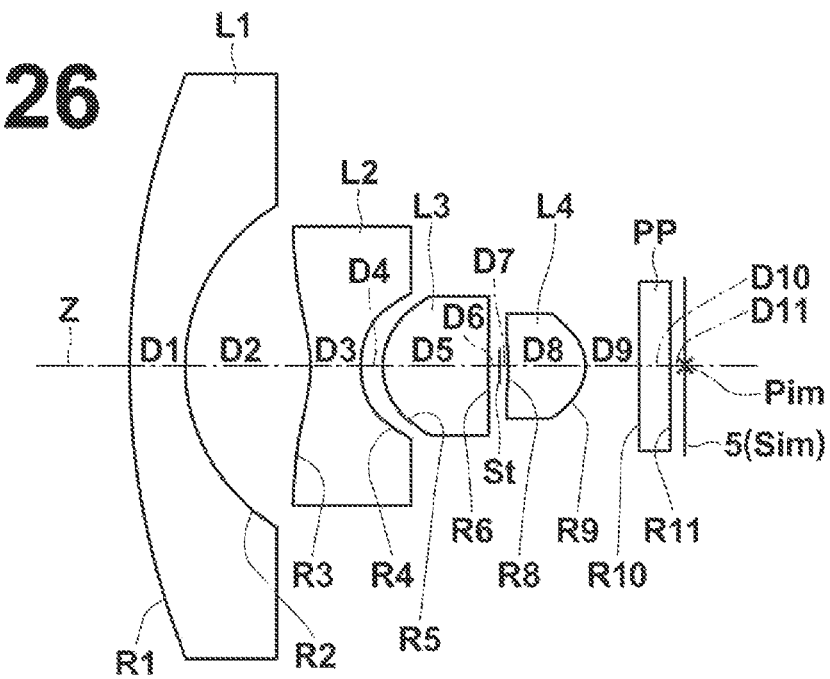
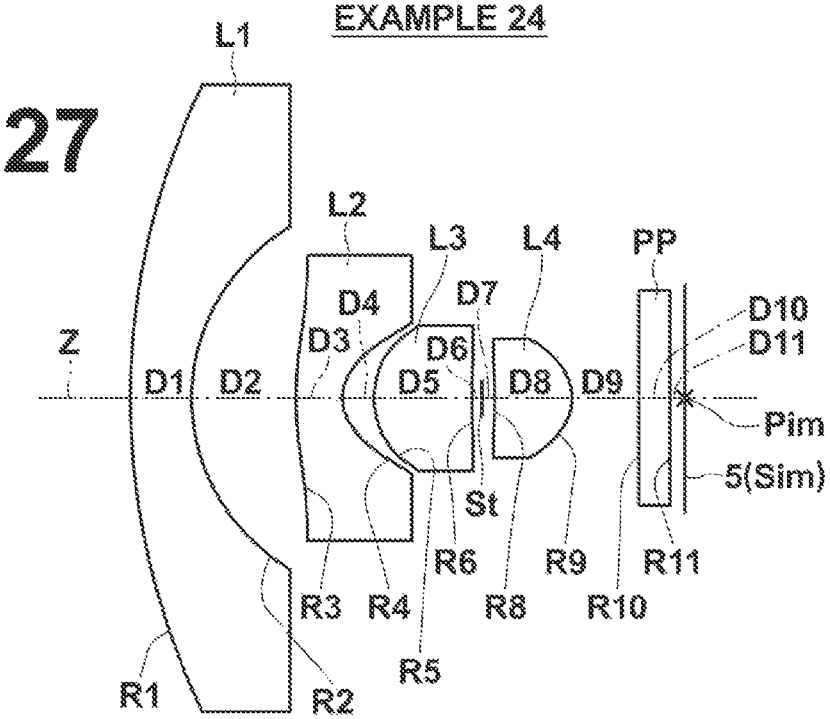

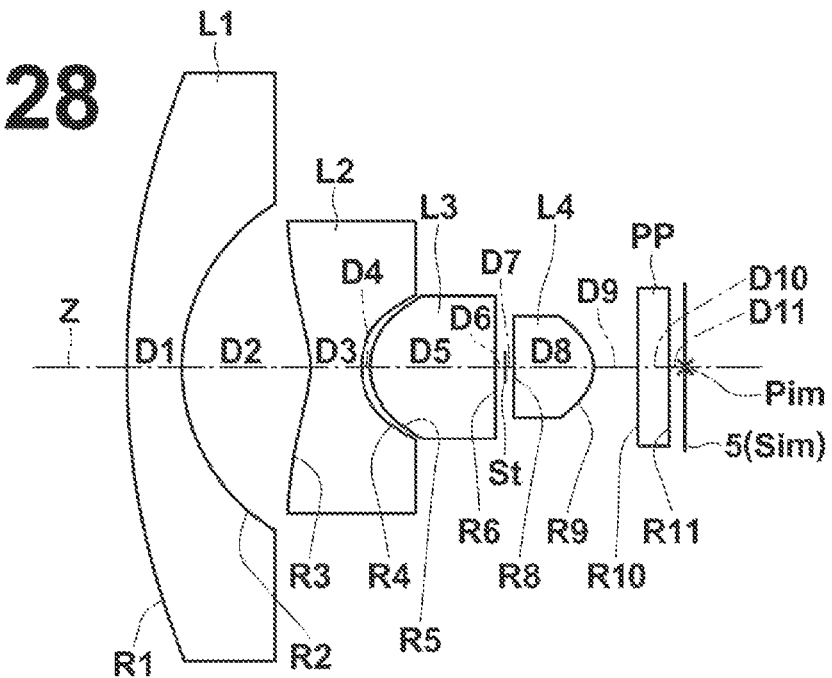
FIG.28 EXAMPLE 25
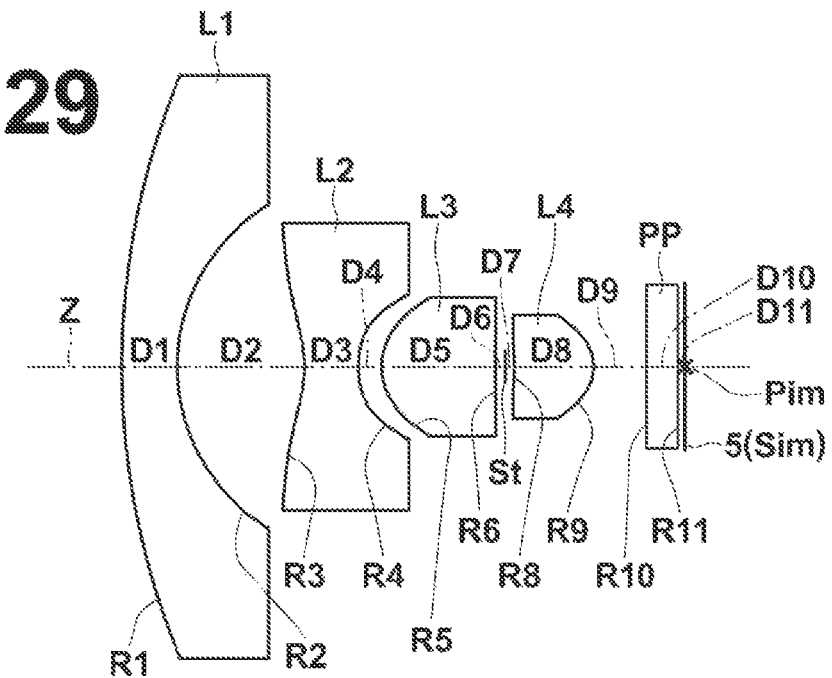
FIG.29 EXAMPLE 26

EXAMPLE 27

EXAMPLE 28

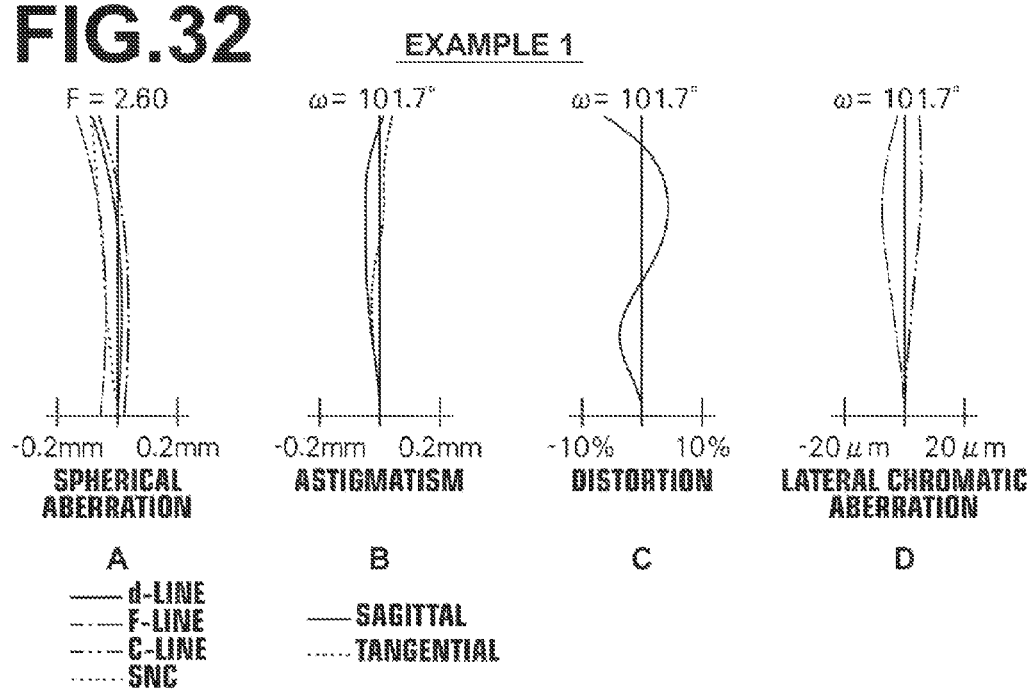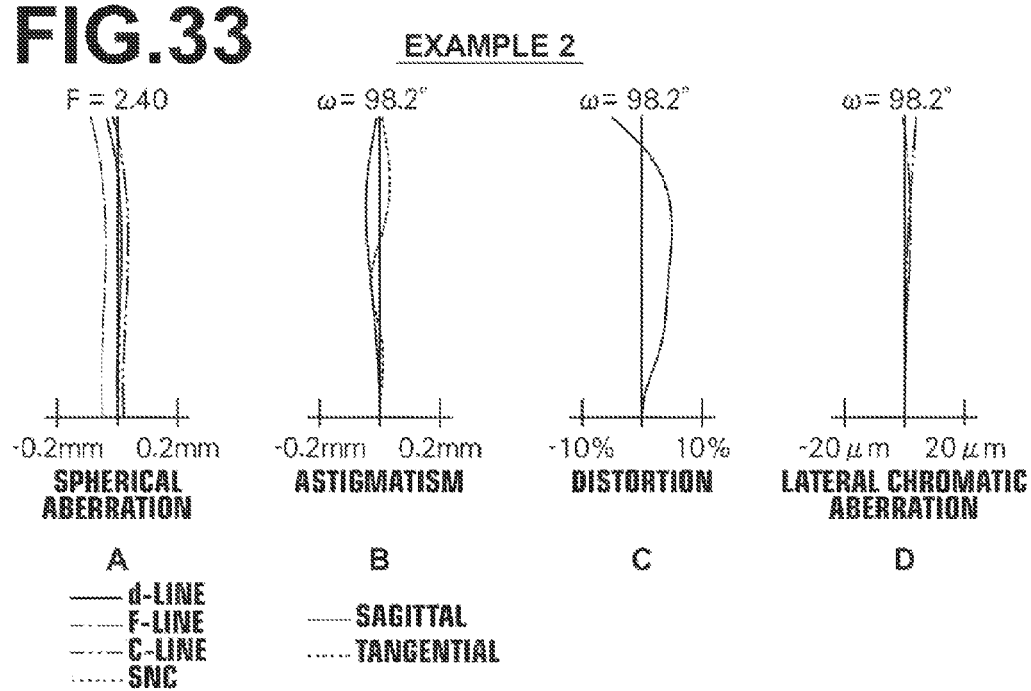

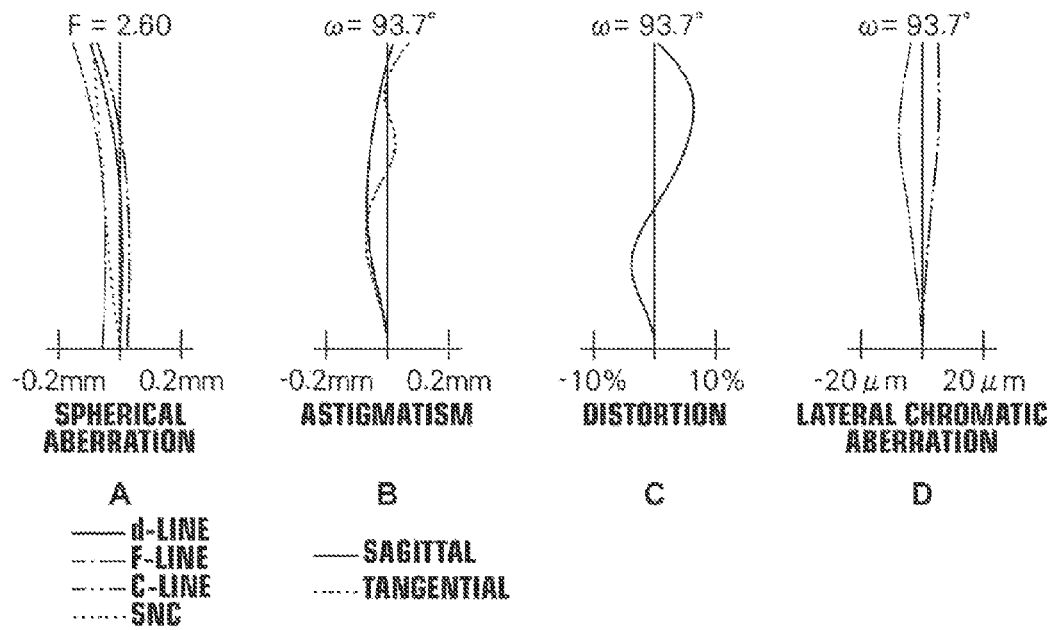
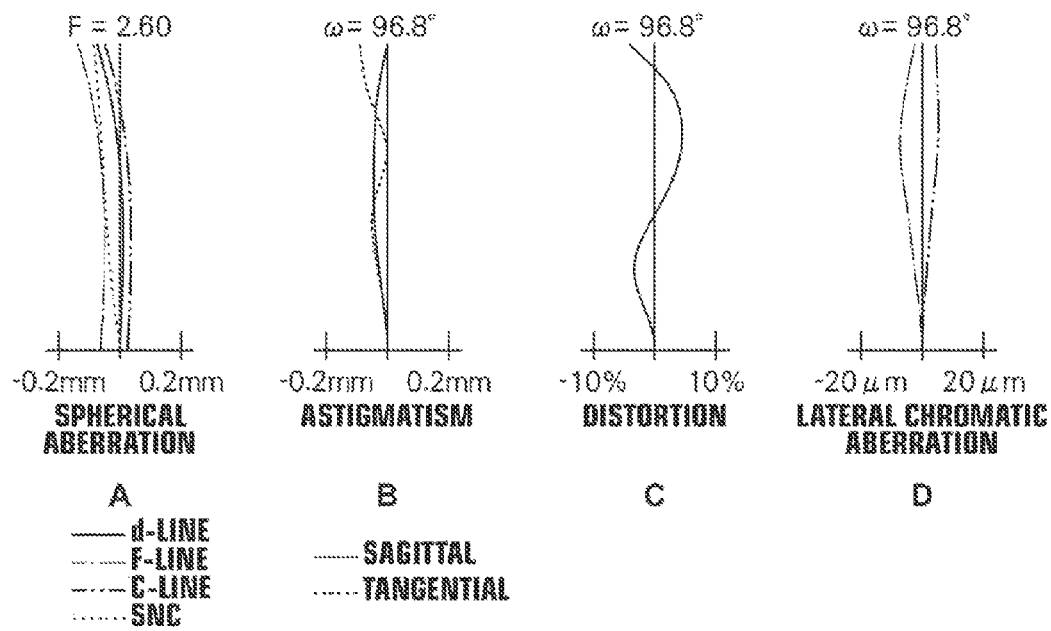

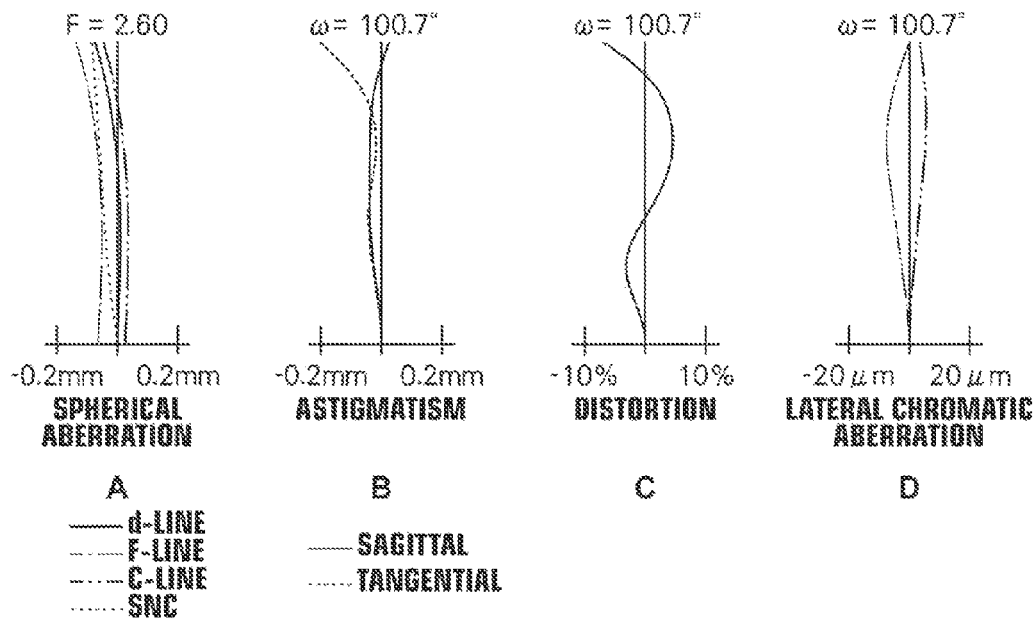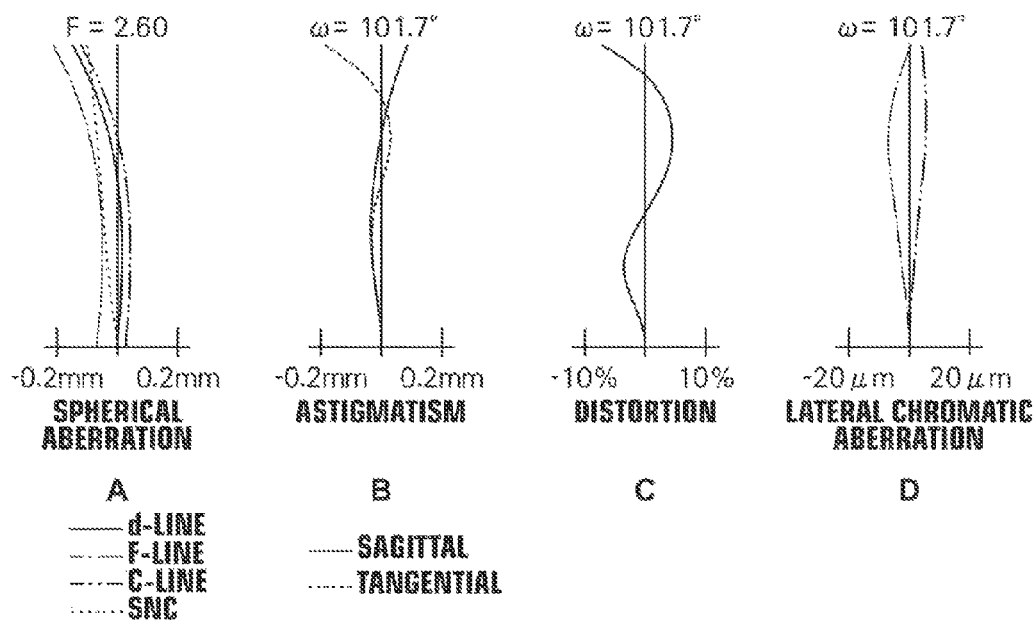

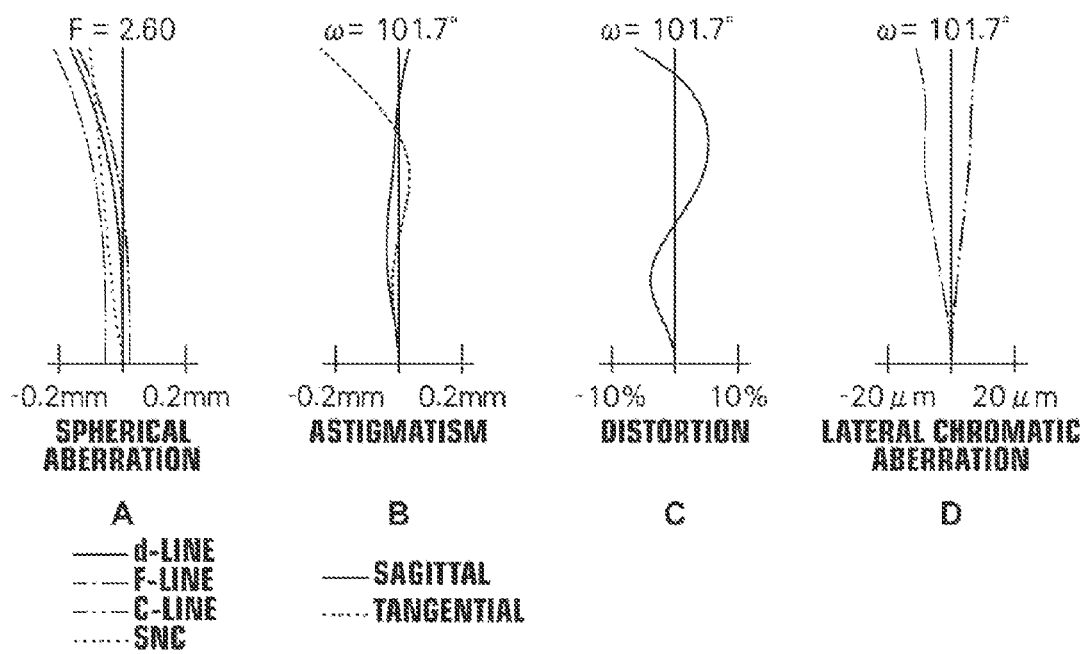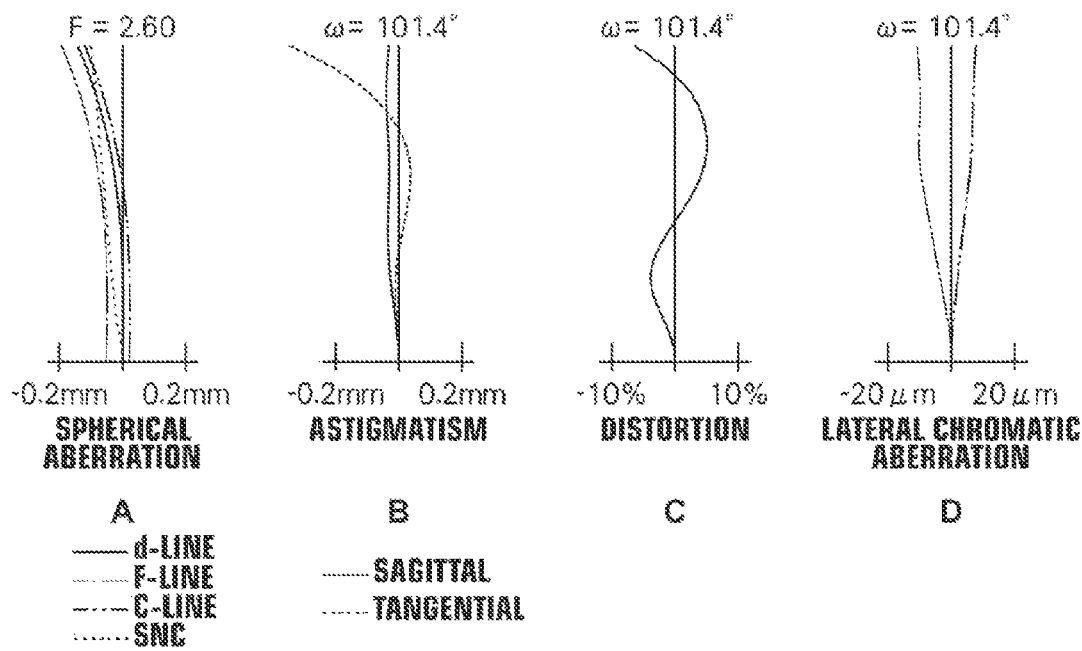

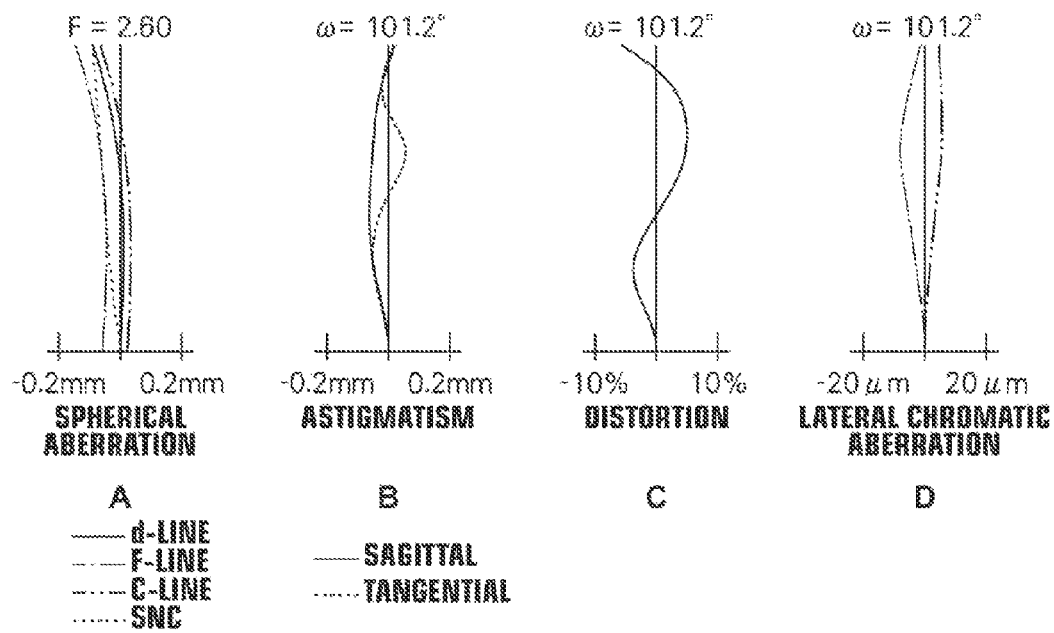
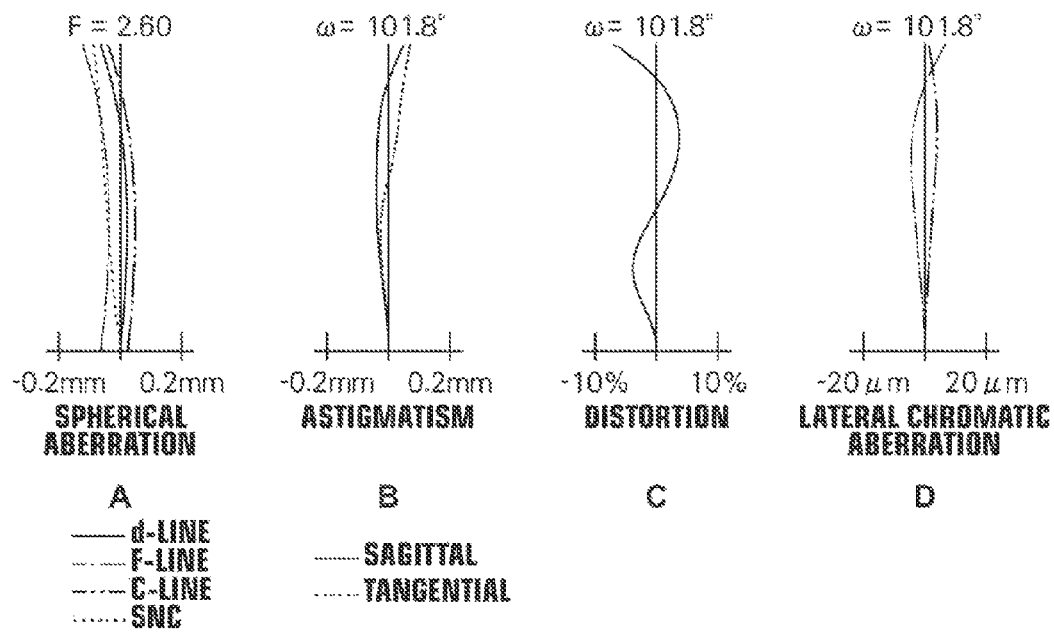

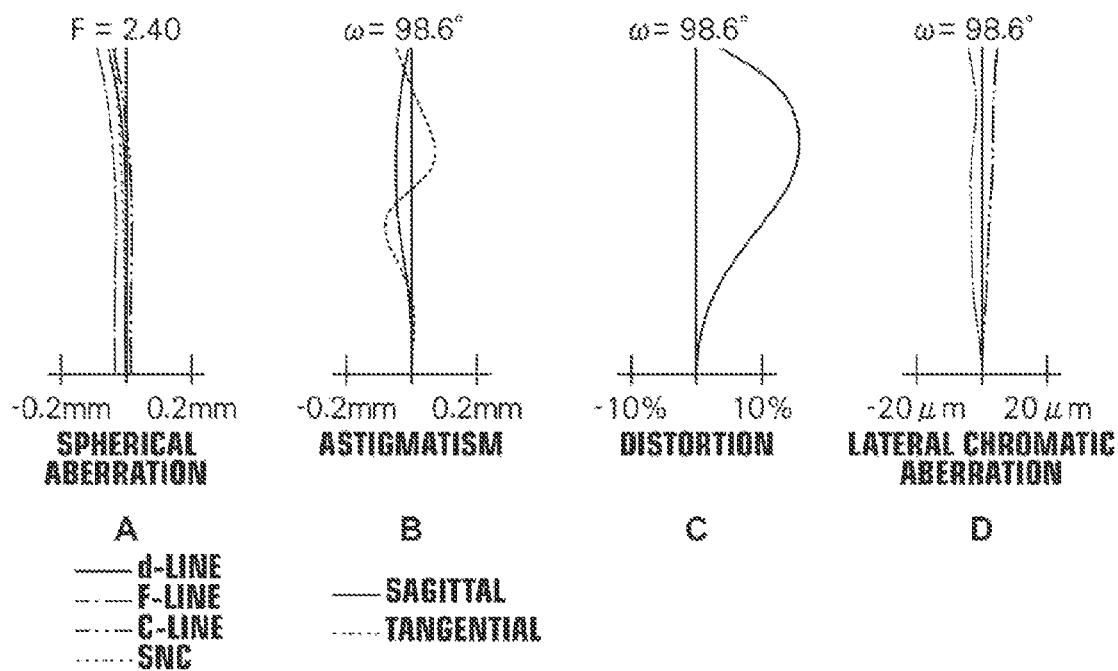
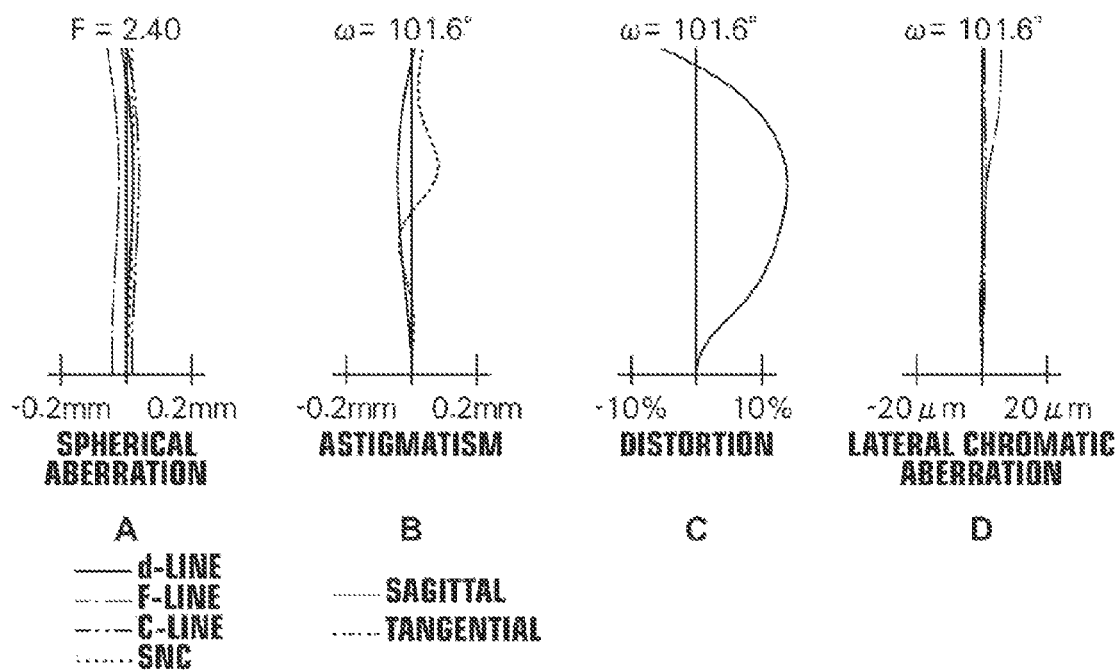

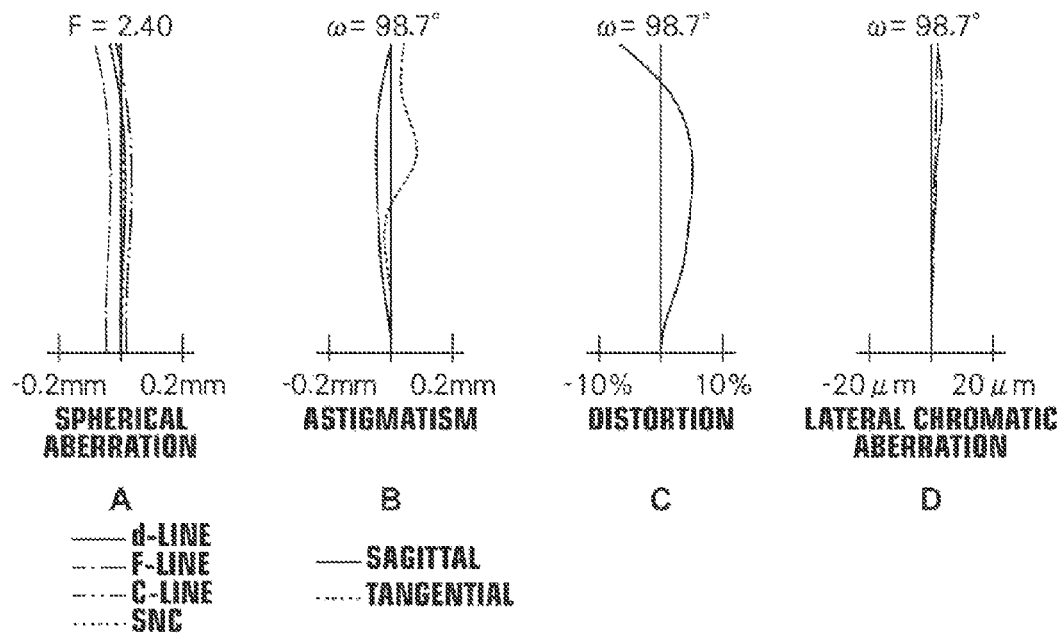
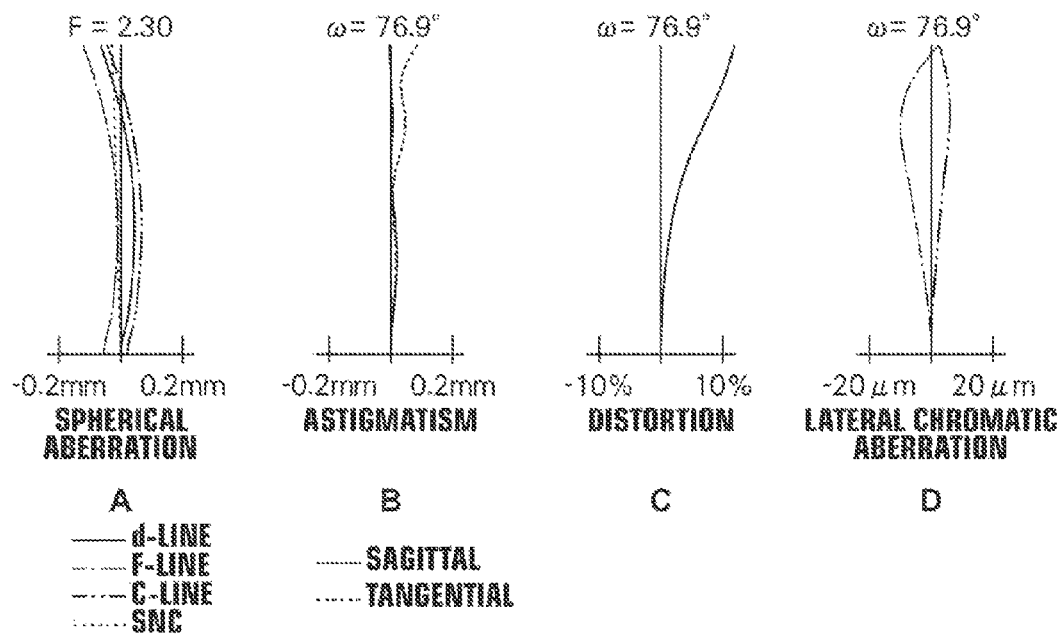

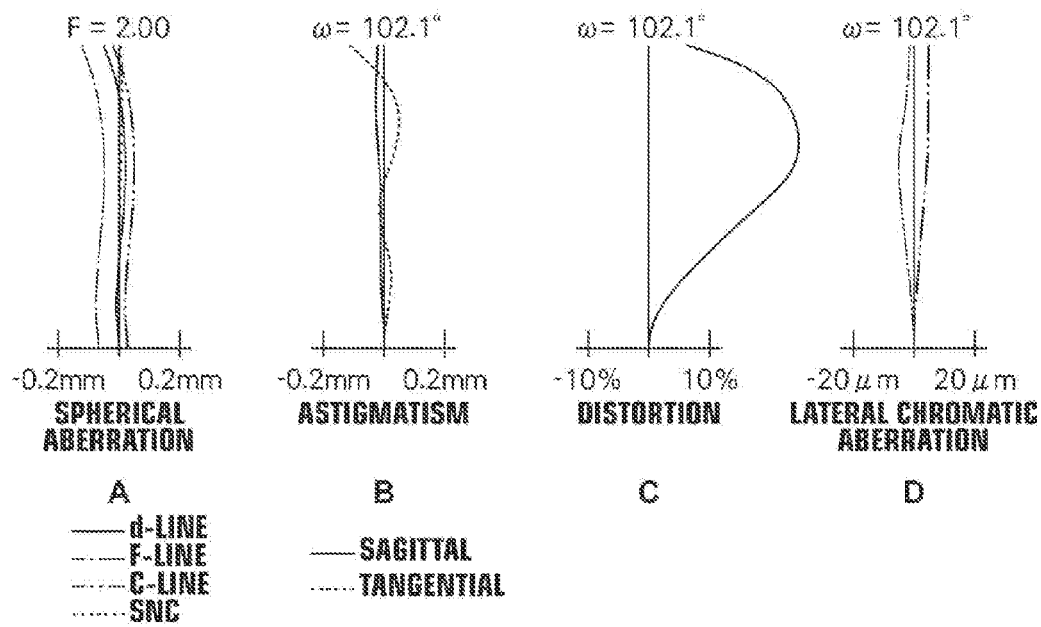
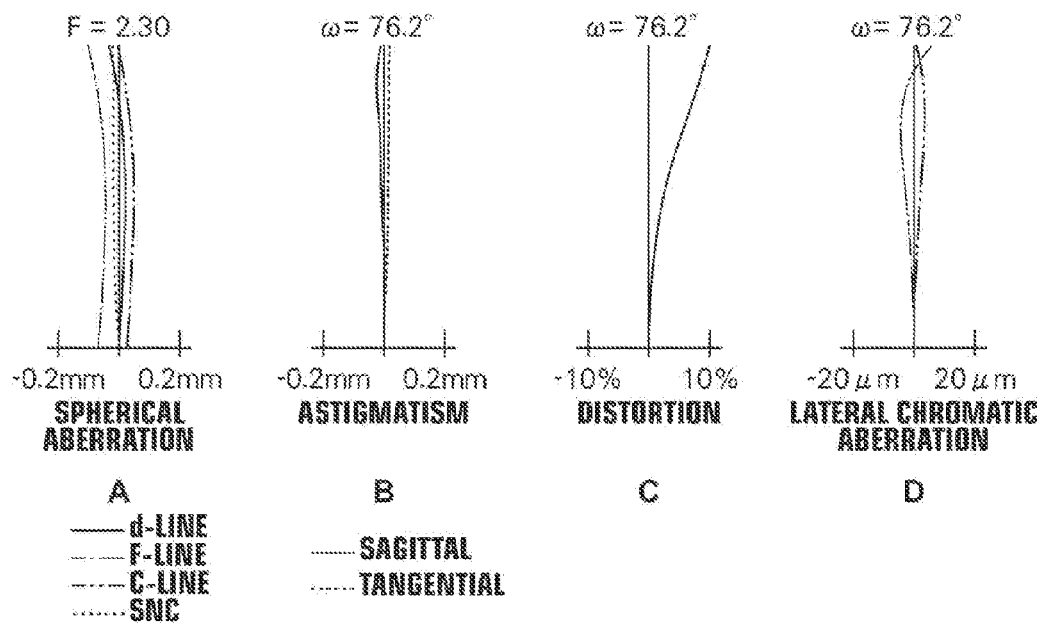

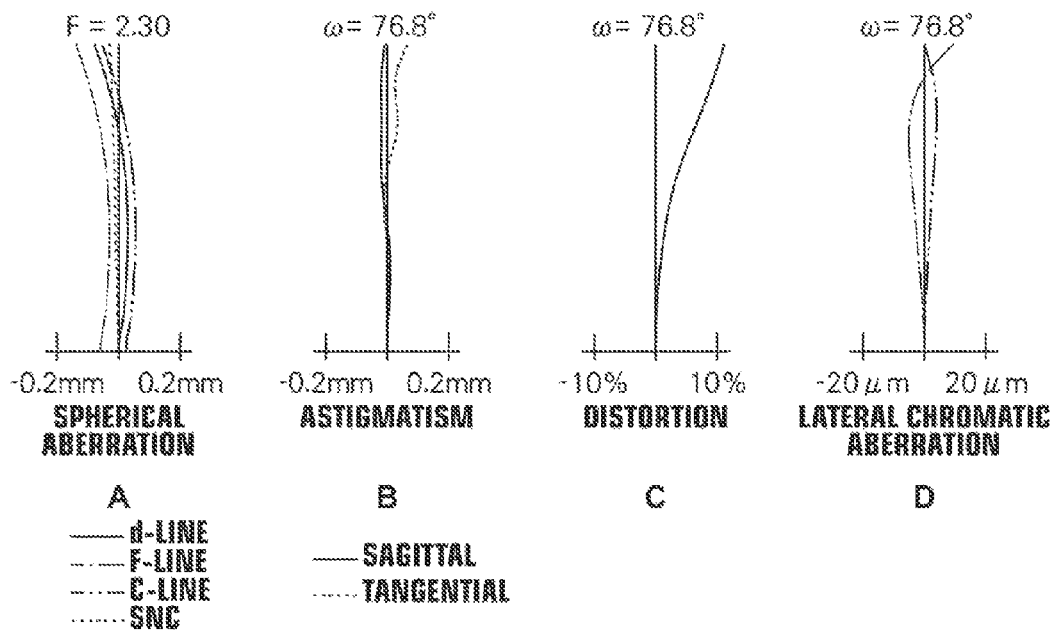
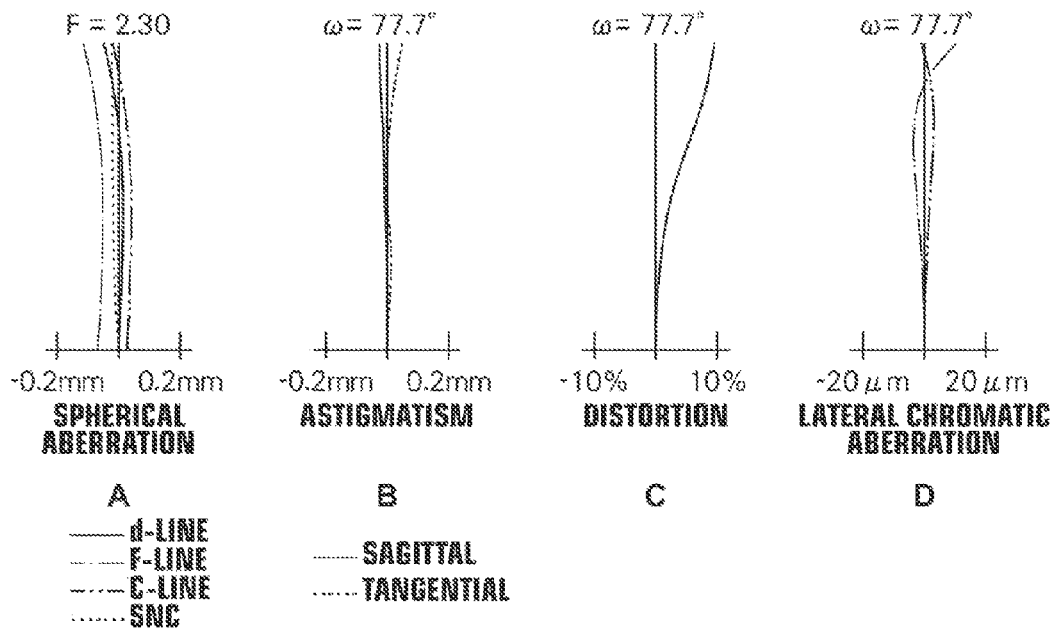

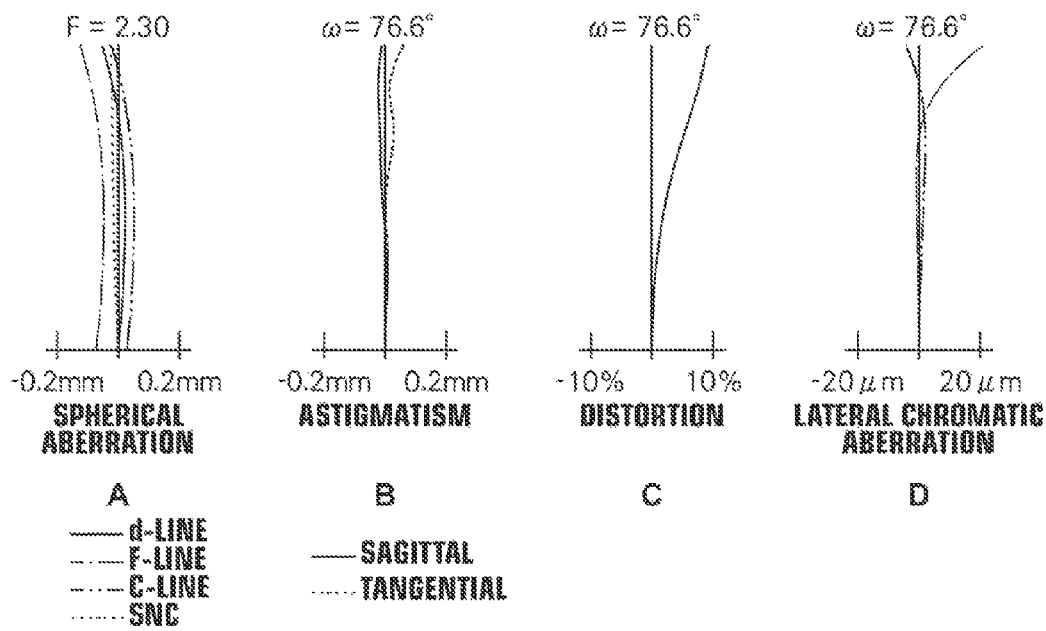
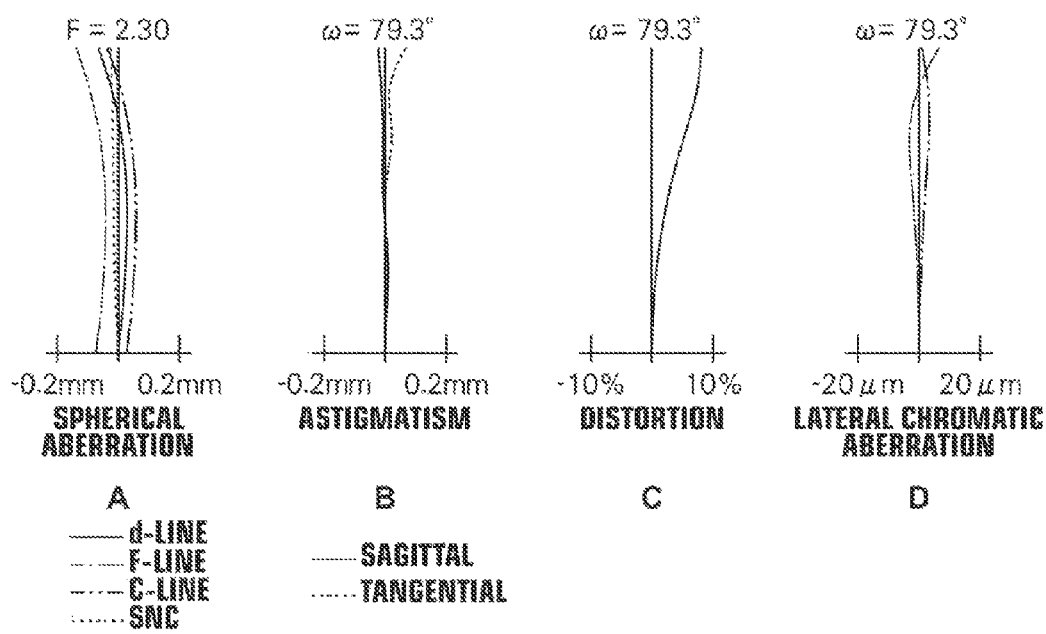

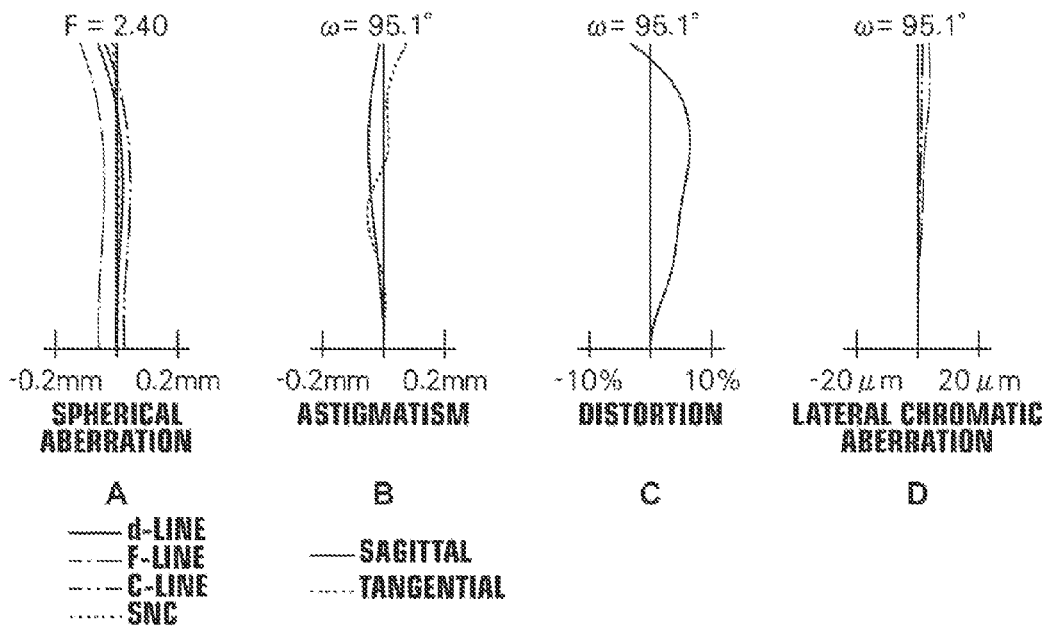
FIG.52 EXAMPLE 21
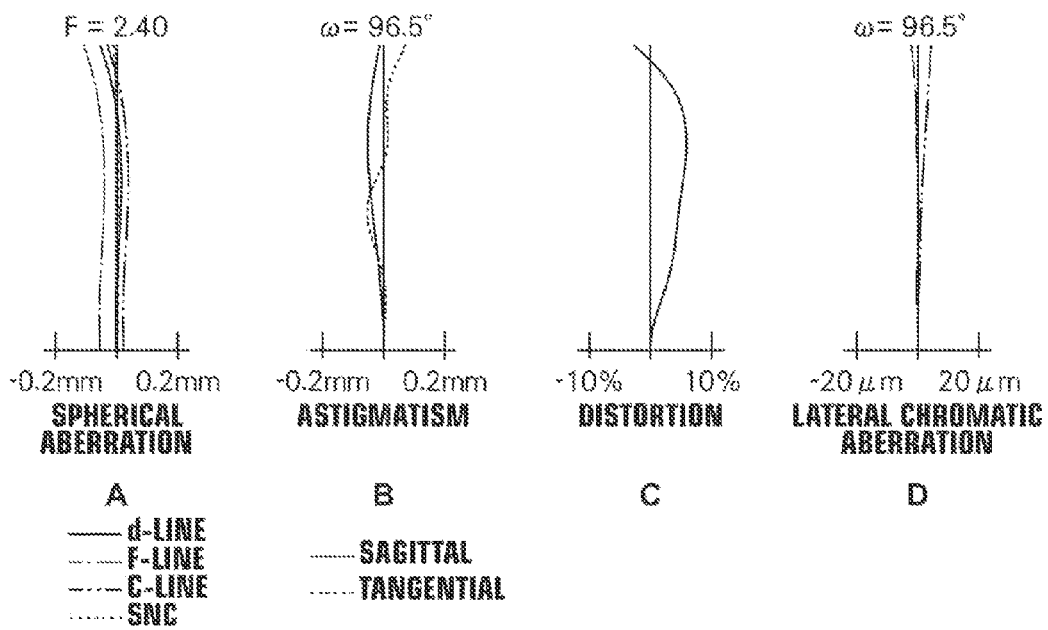
FIG.53 EXAMPLE 22

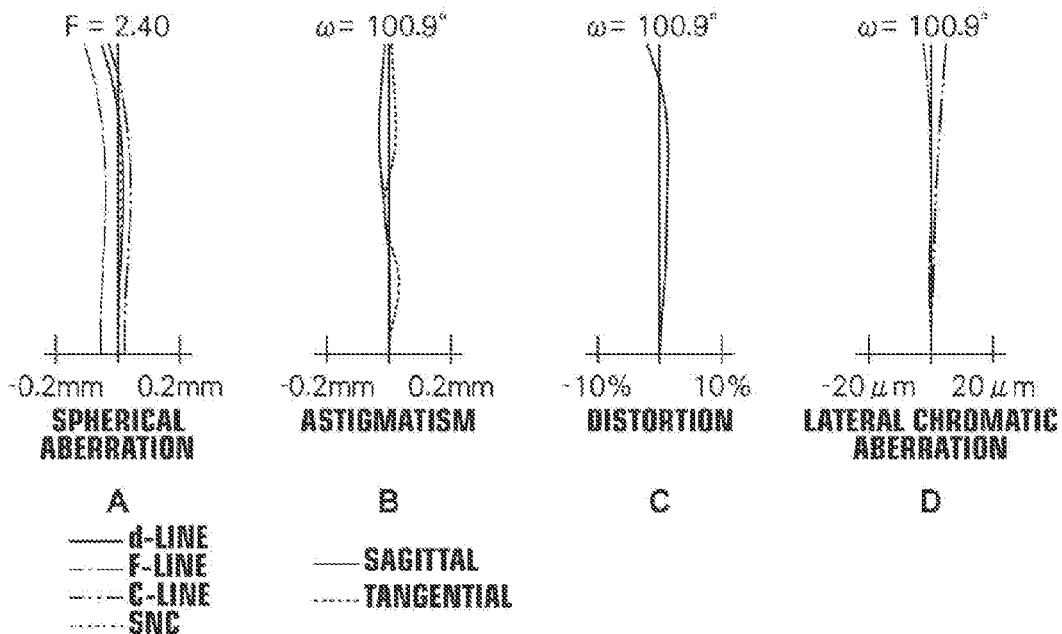
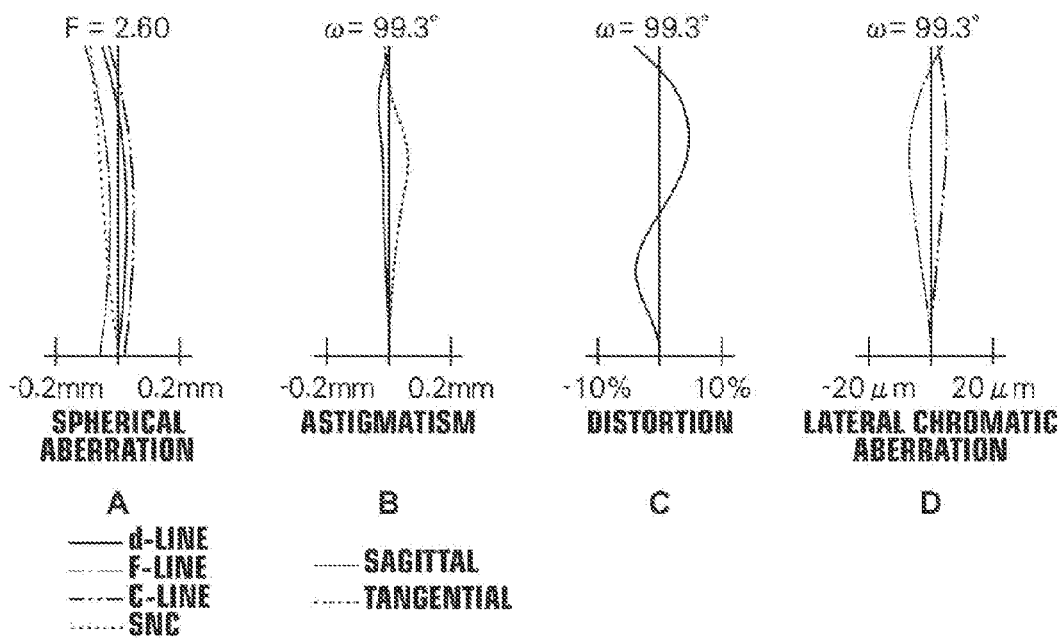

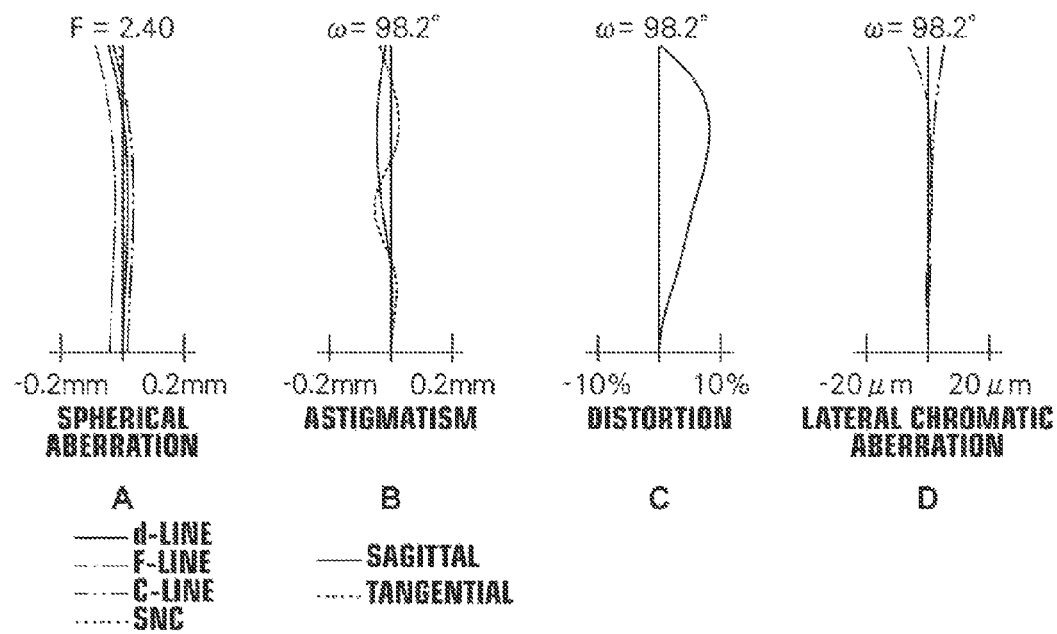
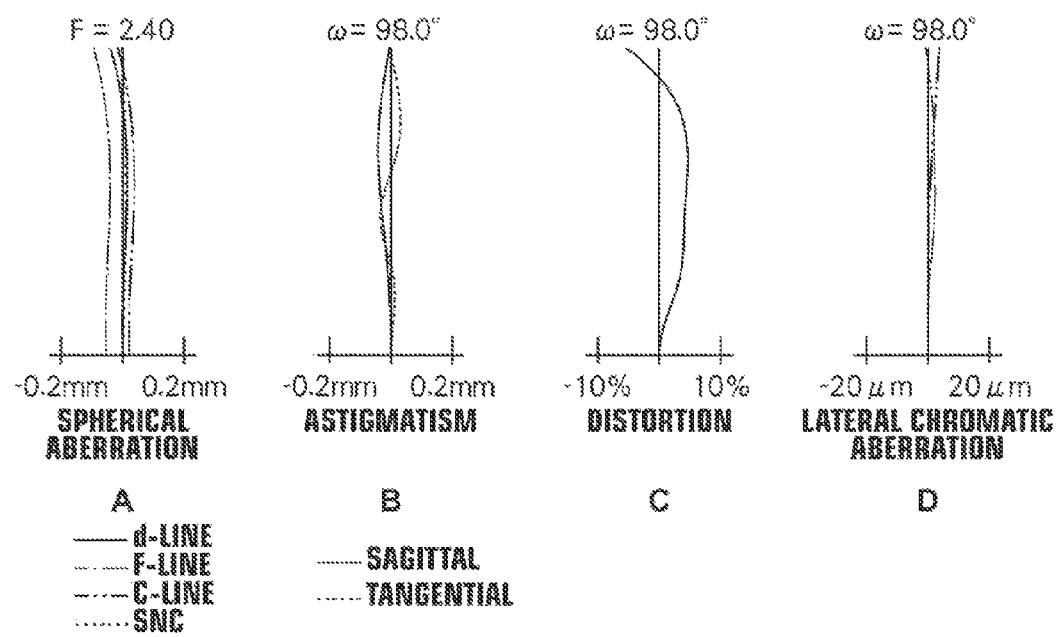

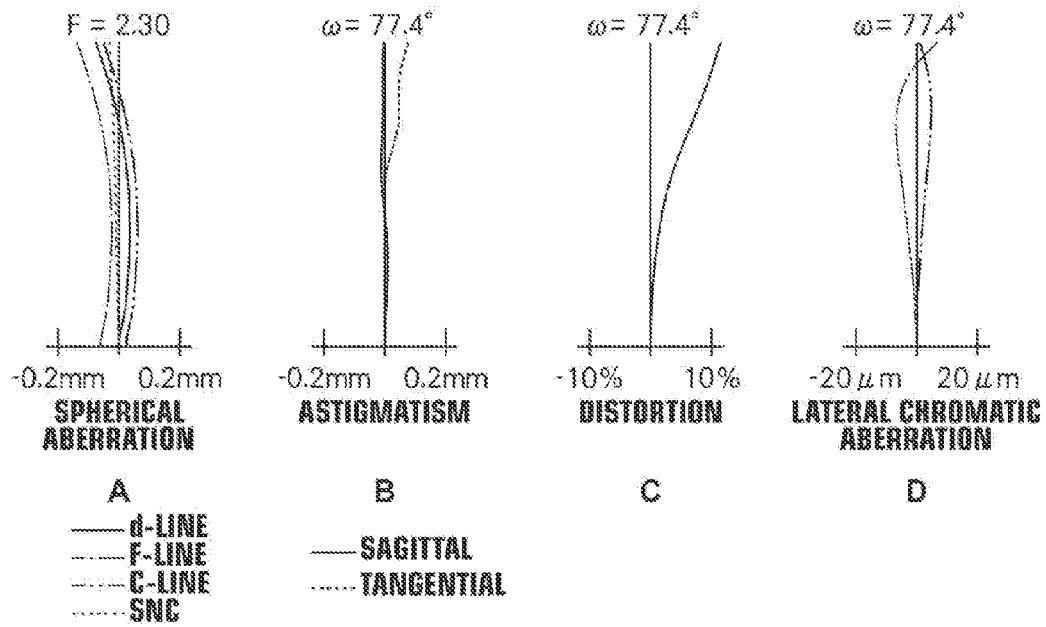
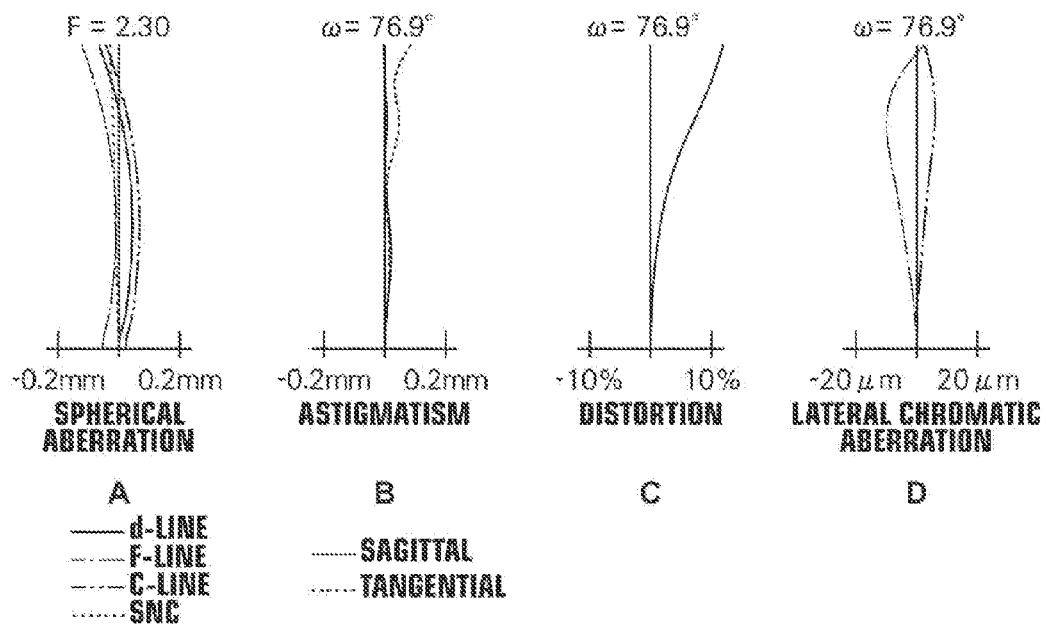

IMAGING LENS AND IMAGING DEVICE

BACKGROUND OF THE INVENTION

1. Field of the Invention

The present invention relates to an imaging lens and an imaging apparatus. In particular, the present invention relates to an imaging lens appropriate for use in an in-vehicle camera, a camera for a mobile terminal, a surveillance camera, or the like using an imaging device, such as a CCD (Charge Coupled Device) and a CMOS (Complementary Metal Oxide Semiconductor). Further, the present invention relates to an imaging apparatus including the imaging lens.

2. Description of the Related Art

In recent years, the size of an imaging device, such as a CCD and a CMOS, became small, and the resolution of the imaging device became high. Consequently, the size of the body of imaging equipment including such an imaging device became small. Therefore, reduction in the size of an imaging lens to be mounted on the imaging equipment is also needed in addition to high optical performance of the imaging lens. Meanwhile, lenses mounted on an in-vehicle camera, a surveillance camera and the like need to be structurable at low cost and in small size, and to achieve a wide angle of view and high performance.

An imaging lens composed of a relatively small number of lenses, and which has been conventionally known in the aforementioned fields, is disclosed, for example, in U.S. Pat. No. 7,280,289 (Patent Document 1), Japanese Unexamined Patent Publication No. 2011-065132 (Patent Document 2), and Taiwanese Utility Model Registration No. 390459 (Patent Document 3). Patent Documents 1 through 3 disclose imaging lenses, each composed of four lens elements including an aspherical lens.

SUMMARY OF THE INVENTION

Meanwhile, requirements for an imaging lens to be mounted on an in-vehicle camera, a surveillance camera or the like have become tougher every year. Therefore, further reduction in the size and the cost of the imaging lens, a wider angle of view, and higher performance are needed.

In view of the foregoing circumstances, it is an object of the present invention to provide an imaging lens that can achieve small size, low cost, a wide angle of view, and high performance, and which does not have any restriction on an imaging device to be used. Further, it is another object of the present invention to provide an imaging apparatus including the imaging lens.

A first imaging lens of the present invention is an imaging lens comprising:
a negative first lens;
a negative second lens;
a third lens of a plano-convex shape having a convex surface directed toward an object side or of a positive meniscus shape having a convex surface directed toward the object side; and
a fourth lens of a plano-convex shape having a convex surface directed toward an image side or of a positive meniscus shape having a convex surface directed toward the image side, which are arranged in this order from the object side,
wherein the following conditional formula (1) is satisfied:

$$2.25 < vd2/vd3 \qquad (1),$$ where $vd2$: an Abbe number of a material of the second lens for d-line, and
$vd3$: an Abbe number of a material of the third lens for d-line.

A second imaging lens of the present invention is an imaging lens comprising:
a negative first lens;
a negative second lens;
a third lens of a plano-convex shape having a convex surface directed toward an object side or of a positive meniscus shape having a convex surface directed toward the object side; and
a fourth lens of a plano-convex shape having a convex surface directed toward an image side or of a positive meniscus shape having a convex surface directed toward the image side, which are arranged in this order from the object side,
wherein the following conditional formula (2) is satisfied:

$$0.09 < Nd3 - Nd2 \qquad (2),$$ where $Nd2$: a refractive index of a material of the second lens for d-line, and
$Nd3$: a refractive index of a material of the third lens for d-line.

A third imaging lens of the present invention is an imaging lens comprising:
a negative first lens;
a negative second lens;
a third lens of a plano-convex shape having a convex surface directed toward an object side or of a positive meniscus shape having a convex surface directed toward the object side; and
a fourth lens of a plano-convex shape having a convex surface directed toward an image side or of a positive meniscus shape having a convex surface directed toward the image side, which are arranged in this order from the object side,
wherein the following conditional formula (8) is satisfied:

$$8.0 < L/f < 13.9 \qquad (8),$$ where $L$: a distance from a vertex of an object-side surface of the first lens to an image plane, and
$f$: a focal length of an entire system.

A fourth imaging lens of the present invention is an imaging lens comprising:
a negative first lens;
a negative second lens of a biconcave shape;
a third lens of a plano-convex shape having a convex surface directed toward an object side or of a positive meniscus shape having a convex surface directed toward the object side; and
a fourth lens of a plano-convex shape having a convex surface directed toward an image side or of a positive meniscus shape having a convex surface directed toward the image side, which are arranged in this order from the object side,
wherein the following conditional formula (9) is satisfied:

$$1.0 < Bf/f < 3.0 \qquad (9),$$ where $Bf$: a distance from a vertex of an image-side surface of a most-image-side lens to an image plane (a distance in air), and
$f$: a focal length of an entire system.

Further, in the first through fourth imaging lenses of the present invention, it is desirable that the following conditional formulas (3) through (7), (10) through (20), (3-1) through (7-1), (11-1), (12-1) and (12-2) are satisfied. A desirable mode may include one of the structures of the following conditional formulas (3) through (7), (10) through (20), (3-1) through (7-1), (11-1), (12-1) and (12-2), or arbitrary two or more of them in combination:

$$1.0 < |f2/f| < 2.6 \qquad (3);$$

$$1.0 < |f2/f| < 2.7 \qquad (3-1);$$

$1.0<D2/f<2.5$ (4);

$1.0<D2/f<2.8$ (4-1);

$1.5<f3/f<3.0$ (5);

$1.5<f3/f<4.6$ (5-1);

$0.75(R8-R9)/(R8+R9)\leq 1.0$ (6);

$0.60(R8-R9)/(R8+R9)\leq 1.0$ (6-1);

$6.2<|R8/f|$ (7);

$4.5<|R8/f|$ (7-1);

$1.5<(D4+D5)/f<3.3$ (10);

$3.1<R4/f$ (11);

$R4/f<1.3$ (11-1);

$-160<(R3-R4)/(R3+R4)<0.85$ (12);

$-160<(R3-R4)/(R3+R4)<-1.0$ (12-1);

$0.2<(R3-R4)/(R3+R4)<0.85$ (12-2);

$8<R1/f<50$ (13);

$2<R6/f$ (14);

$0.5<D3/f<5.0$ (15);

$0.1(R1-R2)/(R1+R2)\leq 1.0$ (16);

$0.2<R1/L<3.0$ (17);

$-1.0(R5-R6)/(R5+R6)\leq -0.1$ (18);

$-0.8<f/f123<0.8$ (19); and $1\leq f34/f\leq 10$ (20), where f: a focal length of an entire system,
f2: a focal length of a second lens,
f3: a focal length of a third lens,
R1: a curvature radius of an object-side surface of a first lens,
R2: a curvature radius of an image-side surface of the first lens,
R3: a curvature radius of an object-side surface of the second lens,
R4: a curvature radius of an image-side surface of the second lens,
R5: a curvature radius of an object-side surface of the third lens,
R6: a curvature radius of an image-side surface of the third lens,
R8: a curvature radius of an object-side surface of a fourth lens,
R9: a curvature radius of an image-side surface of the fourth lens,
D2: a distance on an optical axis between the first lens and the second lens,
D3: a center thickness of the second lens,
D4: a distance in air on an optical axis between the second lens and the third lens,
D5: a center thickness of the third lens
f123: a combined focal length of the first lens, the second lens and the third lens, and
f34: a combined focal length of the third lens and the fourth lens.

In the present invention, when an aspherical surface is included, the signs of the surface shape of a lens, such as a convex surface, a concave surface, a flat surface, biconcave, meniscus, biconvex, plano-convex and plano-concave, and the refractive power of a lens, such as a positive lens and a negative lens, will be considered in a paraxial region unless otherwise mentioned. Further, in the present invention, the sign of a curvature radius is positive when the shape of a surface is convex toward the object side, and the sign of a curvature radius is negative when the shape of a surface is convex toward the image side.

In the first through fourth imaging lenses of the present invention, it is desirable that a material constituting the third lens is polycarbonate.

An imaging apparatus of the present invention includes at least one of the first through fourth imaging lenses of the present invention.

According to the first imaging lens of the present invention, the arrangement of power in the entire system, the shapes of the surfaces of the third lens and the fourth lens, and the like are appropriately set, and conditional formula (1) is satisfied in the lens system including at least four lenses. Therefore, it is possible to achieve small size, low cost, and a wide angle of view. Further, it is possible to realize an imaging lens having high optical performance in which curvature of field, a spherical aberration, a coma aberration, distortion and a lateral chromatic aberration are excellently corrected, and an excellent image is obtainable also in a peripheral portion of an image formation area.

According to the second imaging lens of the present invention, the arrangement of power in the entire system, the shapes of the surfaces of the third lens and the fourth lens, and the like are appropriately set, and conditional formula (2) is satisfied in the lens system including at least four lenses. Therefore, it is possible to achieve small size, low cost, and a wide angle of view. Further, it is possible to realize an imaging lens having high optical performance in which curvature of field, a spherical aberration, a coma aberration, distortion and a lateral chromatic aberration are excellently corrected, and an excellent image is obtainable also in a peripheral portion of an image formation area.

According to the third imaging lens of the present invention, the arrangement of power in the entire system, the shapes of the surfaces of the third lens and the fourth lens, and the like are appropriately set, and conditional formula (8) is satisfied in the lens system including at least four lenses. Therefore, it is possible to achieve small size, low cost, and a wide angle of view. Further, it is possible to realize an imaging lens having high optical performance in which curvature of field, a spherical aberration, a coma aberration, and distortion are excellently corrected, and an excellent image is obtainable also in a peripheral portion of an image formation area.

According to the fourth imaging lens of the present invention, the arrangement of power in the entire system, the shapes of the surfaces of the second lens, the third lens and the fourth lens, and the like are appropriately set, and conditional formula (9) is satisfied in the lens system including at least four lenses. Therefore, it is possible to achieve small size, low cost, and a wide angle of view. Further, it is possible to realize an imaging lens having high optical performance in which curvature of field, a spherical aberration, a coma aberration, and distortion are excellently corrected, and an excellent image is obtainable also in a peripheral portion of an image formation area.

The imaging apparatus of the present invention includes the imaging lens of the present invention. Therefore, the imaging apparatus is structurable in small size and at low cost. Further, the imaging apparatus has a sufficiently wide angle of view, and can obtain an excellent image with high resolution by using an imaging device.

BRIEF DESCRIPTION OF THE DRAWINGS

FIG. 3 is a diagram for explaining the surface shape of a second lens, and the like;

FIG. 4 is a cross section illustrating the lens structure of an imaging lens in Example 1 of the present invention;

FIG. 5 is a cross section illustrating the lens structure of an imaging lens in Example 2 of the present invention;

FIG. 6 is a cross section illustrating the lens structure of an imaging lens in Example 3 of the present invention;

FIG. 7 is a cross section illustrating the lens structure of an imaging lens in Example 4 of the present invention;

FIG. 8 is a cross section illustrating the lens structure of an imaging lens in Example 5 of the present invention;

FIG. 9 is a cross section illustrating the lens structure of an imaging lens in Example 6 of the present invention;

FIG. 10 is a cross section illustrating the lens structure of an imaging lens in Example 7 of the present invention;

FIG. 11 is a cross section illustrating the lens structure of an imaging lens in Example 8 of the present invention;

FIG. 12 is a cross section illustrating the lens structure of an imaging lens in Example 9 of the present invention;

FIG. 13 is a cross section illustrating the lens structure of an imaging lens in Example 10 of the present invention;

FIG. 14 is a cross section illustrating the lens structure of an imaging lens in Example 11 of the present invention;

FIG. 15 is a cross section illustrating the lens structure of an imaging lens in Example 12 of the present invention;

FIG. 16 is a cross section illustrating the lens structure of an imaging lens in Example 13 of the present invention;

FIG. 17 is a cross section illustrating the lens structure of an imaging lens in Example 14 of the present invention;

FIG. 18 is a cross section illustrating the lens structure of an imaging lens in Example 15 of the present invention;

FIG. 19 is a cross section illustrating the lens structure of an imaging lens in Example 16 of the present invention;

FIG. 20 is a cross section illustrating the lens structure of an imaging lens in Example 17 of the present invention;

FIG. 21 is a cross section illustrating the lens structure of an imaging lens in Example 18 of the present invention;

FIG. 22 is a cross section illustrating the lens structure of an imaging lens in Example 19 of the present invention;

FIG. 23 is a cross section illustrating the lens structure of an imaging lens in Example 20 of the present invention;

FIG. 24 is a cross section illustrating the lens structure of an imaging lens in Example 21 of the present invention;

FIG. 25 is a cross section illustrating the lens structure of an imaging lens in Example 22 of the present invention;

FIG. 26 is a cross section illustrating the lens structure of an imaging lens in Example 23 of the present invention;

FIG. 27 is a cross section illustrating the lens structure of an imaging lens in Example 24 of the present invention;

FIG. 28 is a cross section illustrating the lens structure of an imaging lens in Example 25 of the present invention;

FIG. 29 is a cross section illustrating the lens structure of an imaging lens in Example 26 of the present invention;

FIG. 32, Sections A through D are aberration diagrams of the imaging lens in Example 1 of the present invention;

FIG. 33 Sections A through D are aberration diagrams of the imaging lens in Example 2 of the present invention;

FIG. 34, Sections A through D are aberration diagrams of the imaging lens in Example 3 of the present invention;

FIG. 35, Sections A through D are aberration diagrams of the imaging lens in Example 4 of the present invention;

FIG. 36, Sections A through D are aberration diagrams of the imaging lens in Example 5 of the present invention;

FIG. 37, Sections A through D are aberration diagrams of the imaging lens in Example 6 of the present invention;

FIG. 38, Sections A through D are aberration diagrams of the imaging lens in Example 7 of the present invention;

FIG. 39, Sections A through D are aberration diagrams of the imaging lens in Example 8 of the present invention;

FIG. 40, Sections A through D are aberration diagrams of the imaging lens in Example 9 of the present invention;

FIG. 41, Sections A through D are aberration diagrams of the imaging lens in Example 10 of the present invention;

FIG. 42, Sections A through D are aberration diagrams of the imaging lens in Example 11 of the present invention;

FIG. 43, Sections A through D are aberration diagrams of the imaging lens in Example 12 of the present invention;

FIG. 44, Sections A through D are aberration diagrams of the imaging lens in Example 13 of the present invention;

FIG. 45, Sections A through D are aberration diagrams of the imaging lens in Example 14 of the present invention;

FIG. 46, Sections A through D are aberration diagrams of the imaging lens in Example 15 of the present invention;

FIG. 47, Sections A through D are aberration diagrams of the imaging lens in Example 16 of the present invention;

FIG. 48, Sections A through D are aberration diagrams of the imaging lens in Example 17 of the present invention;

FIG. 49, Sections A through D are aberration diagrams of the imaging lens in Example 18 of the present invention;

FIG. 50, Sections A through D are aberration diagrams of the imaging lens in Example 19 of the present invention;

FIG. 51, Sections A through D are aberration diagrams of the imaging lens in Example 20 of the present invention;

FIG. 52, Sections A through D are aberration diagrams of the imaging lens in Example 21 of the present invention;

FIG. 53, Sections A through D are aberration diagrams of the imaging lens in Example 22 of the present invention;

FIG. 54, Sections A through D are aberration diagrams of the imaging lens in Example 23 of the present invention;

FIG. 55, Sections A through D are aberration diagrams of the imaging lens in Example 24 of the present invention;

FIG. 56, Sections A through D are aberration diagrams of the imaging lens in Example 25 of the present invention;

FIG. 57, Sections A through D are aberration diagrams of the imaging lens in Example 26 of the present invention;

FIG. 58, Sections A through D are aberration diagrams of the imaging lens in Example 27 of the present invention;

FIG. 59, Sections A through D are aberration diagrams of the imaging lens in Example 28 of the present invention.

DESCRIPTION OF THE PREFERRED EMBODIMENTS

Embodiments of the present invention will be described in detail with reference to drawings.

Embodiments of Imaging Lens

Figure 1:
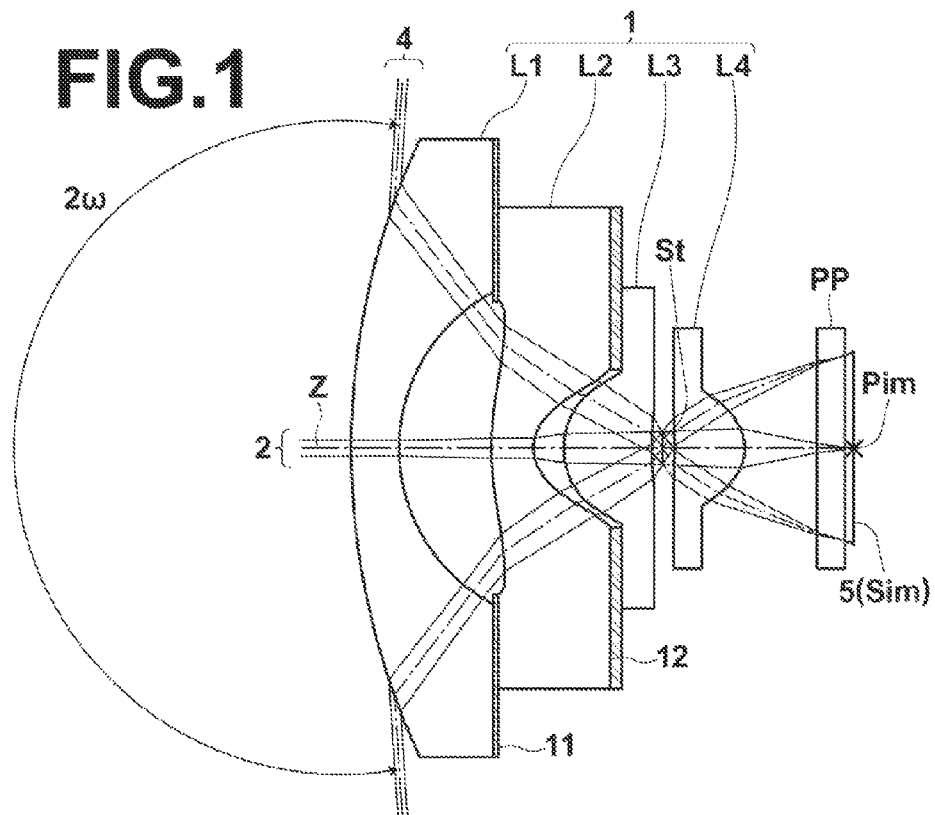
FIG. 1 is a diagram illustrating the structure of an imaging lens according to an embodiment of the present invention, and optical paths.

First, imaging lenses according to embodiments of the present invention will be described with reference to FIG. 1 and FIG. 2. FIG. 1 is a diagram illustrating the structure of an imaging lens 1 according to an embodiment of the present invention, and optical paths. The imaging lens 1 illustrated in FIG. 1 corresponds to an imaging lens in Example 3 of the present invention, which will be described later. The imaging lens 1 illustrated in FIG. 1 includes structures according to the first through third embodiments of the present invention, which will be described next.

Figure 2:
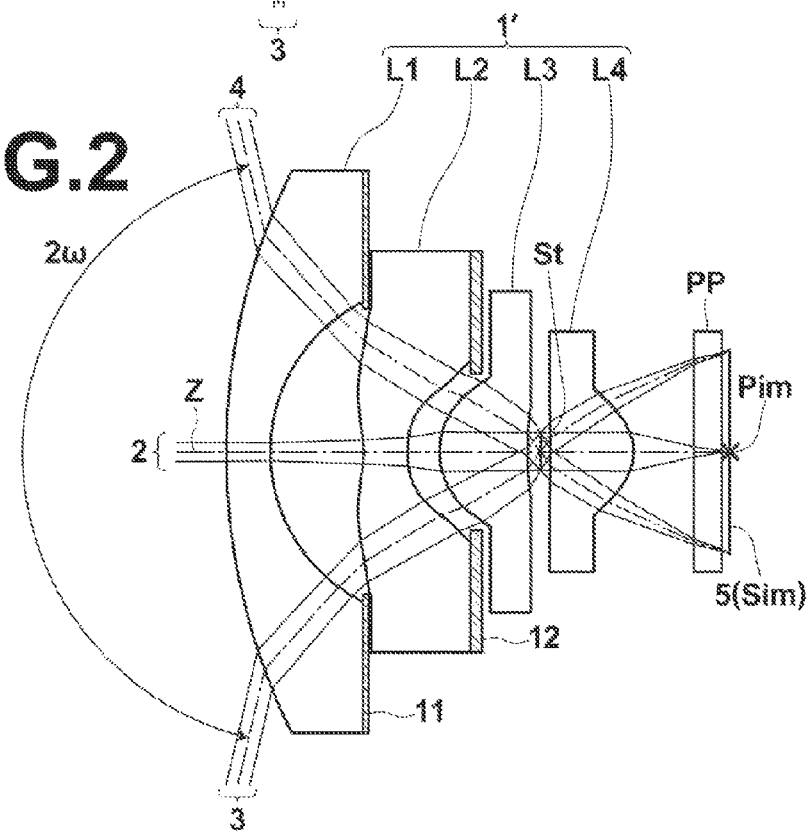
FIG. 2 is a diagram illustrating the structure of an imaging lens according to another embodiment of the present invention, and optical paths.
Figure 30:
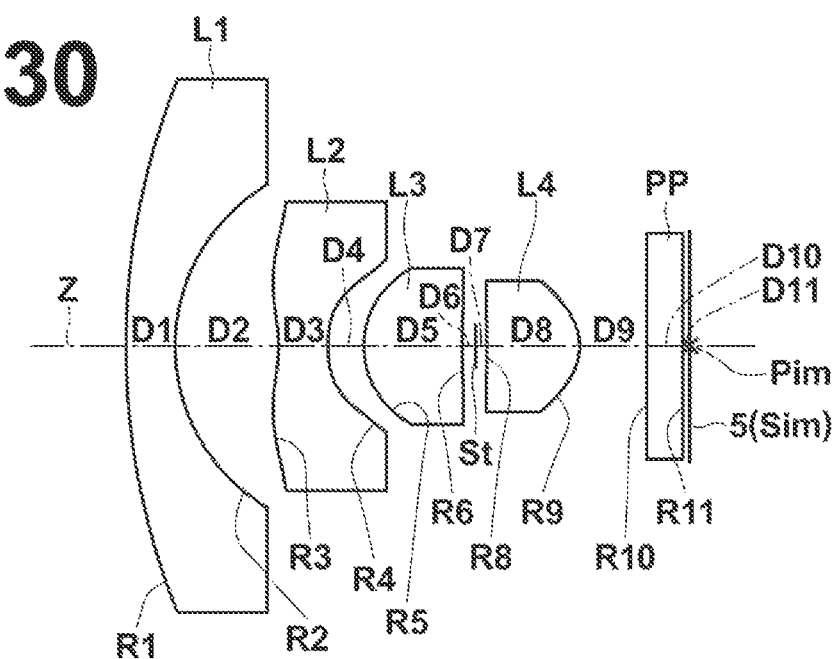
FIG. 30 is a cross section illustrating the lens structure of an imaging lens in Example 27 of the present invention.
Figure 31:
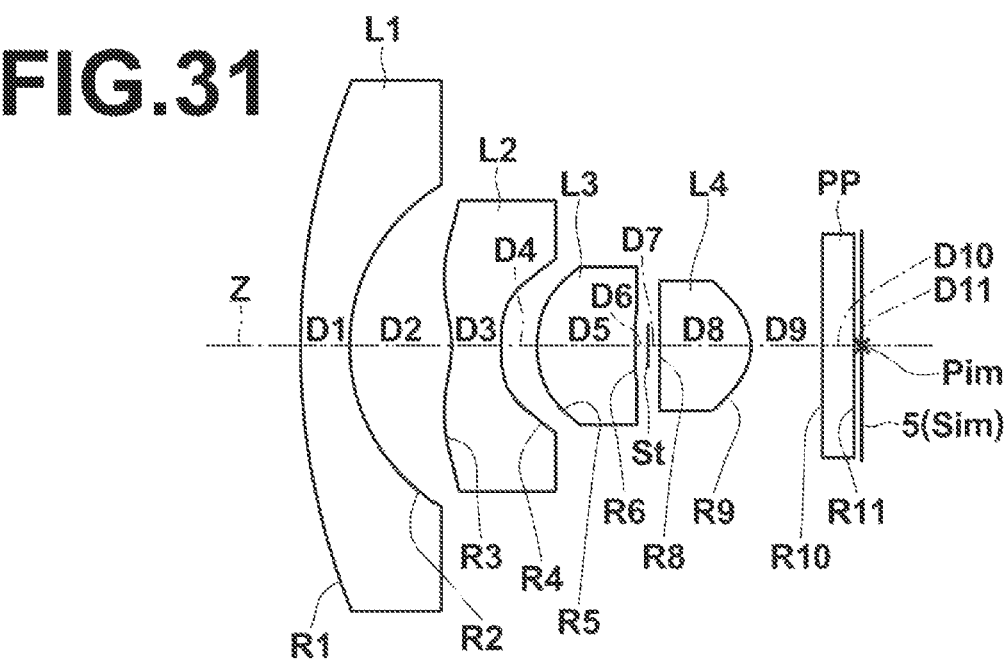
FIG. 31 is a cross section illustrating the lens structure of an imaging lens in Example 28 of the present invention.

FIG. 2 is a diagram illustrating the structure of an imaging lens 1' according to another embodiment of the present invention, and optical paths. The imaging lens 1' illustrated in FIG. 2 corresponds to an imaging lens in Example 17 of the present invention, which will be described later. The imaging lens 1' illustrated in FIG. 2 includes a structure according to a fourth embodiment of the present invention, which will be described next, in addition to the structures according to the first through third embodiments of the present invention.

In FIG. 1 and FIG. 2, the left side is the object side and the right side is the image side, and axial rays 2 from an object point at infinity, and off-axial rays 3, 4 at full angle of view 2ω are also illustrated. In FIG. 1 and FIG. 2, application of the imaging lens 1, 1' to an imaging apparatus is taken into consideration, and an imaging device 5 arranged at image plane Sim including image point Pim of the imaging lens 1, 1' is also illustrated. The imaging device 5 converts an optical image formed by the imaging lens 1, 1' into electrical signals. For example, a CCD image sensor, a CMOS image sensor, or the like may be used as the imaging device 5.

When the imaging lens 1, 1' is applied to an imaging apparatus, it is desirable to set a cover glass, and a low-pass filter or an infrared ray cut filter, or the like based on the structure of a camera on which the lens is mounted. FIG. 1 and FIG. 2 illustrate an example in which parallel-flat-plate-shaped optical member PP, which is assumed to be such elements, is arranged between the most-image-side lens and the imaging device 5 (image plane Sim).

First, the structure of the first embodiment of the present invention will be described. An imaging lens according to the first embodiment of the present invention includes negative first lens L1, negative second lens L2, third lens L3 of a plano-convex shape having a convex surface directed toward an object side or of a positive meniscus shape having a convex surface directed toward the object side, and fourth lens L4 of a plano-convex shape having a convex surface directed toward an image side or of a positive meniscus shape having a convex surface directed toward the image side, which are arranged in this order from the object side. In the example illustrated in FIG. 1, aperture stop St is arranged between third lens L3 and fourth lens L4. In FIG. 1, aperture stop St does not represent the shape nor the size of aperture stop St, but the position of aperture stop St on optical axis Z.

This imaging lens consists of four lenses, which are a small number of lenses. Therefore, it is possible to reduce the cost and the total length of the imaging lens in the optical axis direction. Further, since both of first lens L1 and second lens L2, which are two lenses arranged on the object side, are negative lenses, it is possible to easily widen the angle of view of the entire lens system. Further, since there are two negative lenses, correction of various aberrations to be performed by a negative lens or lenses can be divided and allocated to the two lenses. Therefore, it is possible to effectively perform correction. Similarly, since there are also two positive lenses, i.e., third lens L3 and fourth lens L4, on the image side, convergence action for forming an image on an image plane and correction of various aberrations to be performed by a positive lens or lenses can be divided and allocated to the two lenses. Therefore, it is possible to effectively perform correction.

When both of third lens L3 and fourth lens L4 are positive lenses, it is possible to excellently correct curvature of field and a spherical aberration. Further, when third lens L3 has a plano-convex shape having a convex surface directed toward an object side or a positive meniscus shape having a convex surface directed toward the object side, and fourth lens L4 has a plano-convex shape having a convex surface directed toward an image side or a positive meniscus shape having a convex surface directed toward the image side, it is possible to excellently correct curvature of field and a coma aberration.

The imaging lens according to the first embodiment of the present invention satisfies the following conditional foimula:

$$2.25 < vd2/vd3 \quad (1),\text{ where}$$

vd2: an Abbe number of a material of second lens L2 for d-line, and vd3: an Abbe number of a material of third lens L3 for d-line.

When the lower limit of conditional formula (1) is satisfied, it is possible to easily correct a lateral chromatic aberration.

Next, the structure of the second embodiment of the present invention will be described. An imaging lens according to the second embodiment of the present invention includes negative first lens L1, negative second lens L2, third lens L3 of a plane-convex shape having a convex surface directed toward an object side or of a positive meniscus shape having a convex surface directed toward the object side, and fourth lens L4 of a plane-convex shape having a convex surface directed toward an image side or of a positive meniscus shape having a convex surface directed toward the image side, which are arranged in this order from the object side.

This imaging lens consists of four lenses, which are a small number of lenses. Therefore, it is possible to reduce the cost and the total length of the imaging lens in the optical axis direction. Further, since both of first lens L1 and second lens L2, which are two lenses arranged on the object side, are negative lenses, it is possible to easily widen the angle of view of the entire lens system. Further, since there are two negative lenses, correction of various aberrations to be performed by a negative lens or lenses can be divided and allocated to the two lenses. Therefore, it is possible to effectively perform correction. Similarly, since there are also two positive lenses, i.e., third lens L3 and fourth lens IA, on the image side, convergence action for forming an image on an image plane and correction of various aberrations to be performed by a positive lens or lenses can be divided and allocated to the two lenses. Therefore, it is possible to effectively perform correction.

When both of third lens L3 and fourth lens L4 are positive lenses, it is possible to excellently correct curvature of field and a spherical aberration. Further, when third lens L3 has a plano-convex shape having a convex surface directed toward an object side or a positive meniscus shape having a convex surface directed toward the object side, and fourth lens IA has a plano-convex shape having a convex surface directed toward an image side or a positive meniscus shape having a convex surface directed toward the image side, it is possible to excellently correct curvature of field and a coma aberration.

The imaging lens according to the second embodiment of the present invention satisfies the following conditional formula (2):

$$0.09 < Nd3 - Nd2 \quad (2),\text{ where}$$

Nd2: a refractive index of a material of second lens L2 for d-line, and

Nd3: a refractive index of a material of third lens L3 for d-line.

When the lower limit of conditional formula (2) is satisfied, it is possible to increase the refractive index of third lens L3. Therefore, it is possible to easily increase the power of third lens L3, and to easily correct a lateral chromatic aberration and curvature of field, or it is possible to prevent the refractive index of second lens L2 from becoming too high, and to prevent the Abbe number of the material of second lens L2 from becoming too small. Therefore, correction of chromatic aberrations becomes easy.

Next, the structure of the third embodiment of the present invention will be described. An imaging lens according to the third embodiment of the present invention includes negative first lens L1, negative second lens L2, third lens L3 of a plano-convex shape having a convex surface directed toward an object side or of a positive meniscus shape having a convex surface directed toward the object side, and fourth lens L4 of a plano-convex shape having a convex surface directed toward an image side or of a positive meniscus shape having a convex surface directed toward the image side, which are arranged in this order from the object side.

This imaging lens consists of four lenses, which are a small number of lenses. Therefore, it is possible to reduce the cost and the total length of the imaging lens in the optical axis direction. Further, since both of first lens L1 and second lens L2, which are two lenses arranged on the object side, are negative lenses, it is possible to easily widen the angle of view of the entire lens system.

Further, since there are two negative lenses, correction of various aberrations to be performed by a negative lens or lenses can be divided and allocated to the two lenses. Therefore, it is possible to effectively perform correction. Similarly, since there are also two positive lenses, i.e., third lens L3 and fourth lens L4, on the image side, convergence action for forming an image on an image plane and correction of various aberrations to be performed by a positive lens or lenses can be divided and allocated to the two lenses. Therefore, it is possible to effectively perform correction.

When both of third lens L3 and fourth lens L4 are positive lenses, it is possible to excellently correct curvature of field and a spherical aberration. Further, when third lens L3 has a plano-convex shape having a convex surface directed toward an object side or a positive meniscus shape having a convex surface directed toward the object side, and fourth lens L4 has a plano-convex shape having a convex surface directed toward an image side or a positive meniscus shape having a convex surface directed toward the image side, it is possible to excellently correct curvature of field and a coma aberration.

The imaging lens according to the third embodiment of the present invention satisfies the following conditional formula (8):

$$8.0 < L/f < 13.9 \quad (8),\text{ where}$$

L: a distance from a vertex of an object-side surface of first lens L1 to an image plane, and f: a focal length of an entire system.

When the upper limit of conditional formula (8) is satisfied, it is possible to easily reduce the size of the lens system. If the value is lower than the lower limit of conditional formula (8), a focal length becomes too long, and it becomes difficult to achieve a wide angle of view, or distortion becomes too large by widening an angle of view. Further, an image in a peripheral area is formed in small size, or the size of the lens system becomes too small. Consequently, the thickness of each lens and a distance between lenses become small. Therefore, production becomes difficult, and that causes an increase in cost.

Next, the structure of the fourth embodiment of the present invention will be described. An imaging lens according to the fourth embodiment of the present invention includes negative first lens L1, negative second lens L2 of a biconcave shape, third lens L3 of a plano-convex shape having a convex surface directed toward an object side or of a positive meniscus shape having a convex surface directed toward the object side, and fourth lens L4 of a plano-convex shape having a convex surface directed toward an image side or of a positive meniscus shape having a convex surface directed toward the image side, which are arranged in this order from the object side.

This imaging lens consists of four lenses, which are a small number of lenses. Therefore, it is possible to reduce the cost and the total length of the imaging lens in the optical axis direction. Further, since both of first lens L1 and second lens L2, which are two lenses arranged on the object side, are negative lenses, it is possible to easily widen the angle of view of the entire lens system. Further, since there are two negative lenses, correction of various aberrations to be performed by a negative lens or lenses can be divided and allocated to the two lenses. Therefore, it is possible to effectively perform correction. Similarly, since there are also two positive lenses, i.e., third lens L3 and fourth lens L4, on the image side, convergence action for forming an image on an image plane and correction of various aberrations to be performed by a positive lens or lenses can be divided and allocated to the two lenses. Therefore, it is possible to effectively perform correction.

Since second lens L2 has a biconcave shape, it is possible to easily widen an angle of view. Further, it is possible to easily correct curvature of field, distortion and a spherical aberration. Here, second lens L2 may have a plano-concave shape.

When both of third lens L3 and fourth lens L4 are positive lenses, it is possible to excellently correct curvature of field and a spherical aberration. Further, when third lens L3 has a plano-convex shape having a convex surface directed toward an object side or a positive meniscus shape having a convex surface directed toward the object side, and fourth lens L4 has a plano-convex shape having a convex surface directed toward an image side or a positive meniscus shape having a convex surface directed toward the image side, it is possible to excellently correct curvature of field and a coma aberration.

The imaging lens according to the fourth embodiment of the present invention satisfies the following conditional formula (9):

$$1.0 < Bf/f < 3.0 \quad (9),\text{ where}$$

Bf: a distance from a vertex of an image-side surface of a most-image-side lens to an image plane (a distance in air), and f: a focal length of an entire system.

If the value exceeds the upper limit of conditional formula (9), the size of the lens system becomes large. If the value is lower than the lower limit of conditional formula (9), a distance between the lens system and the imaging device becomes too short, and it becomes difficult to insert various filters, a cover glass or the like between the lens system and the imaging device, and a usable imaging device is restricted.

The imaging lens according to the first through fourth embodiments of the present invention may include at least one of structures of the other embodiments, or at least one of desirable structures of the other embodiments. For example, the imaging lens according to the first embodiment may include the structure of the second embodiment, or the imaging lens according to the second embodiment may include a desirable structure described as the structure of the first embodiment.

Next, the action and effect of the imaging lenses according to the first through fourth embodiments of the present invention will be described by giving structures to be desirably included in the imaging lenses. As a desirable mode, an imaging lens may include one of the following structures, or arbitrary two or more of them in combination.

It is desirable that the following conditional formula (3) is satisfied:

$$1.0 < |f2/f| < 2.6 \qquad (3),$$ where f: a focal length of an entire system, and
f2: a focal length of second lens L2.

When the upper limit of conditional formula (3) is satisfied, it is possible to easily increase the power of second lens L2. Therefore, it is possible to easily widen an angle of view, and also to easily reduce the size of the lens system. If the value is lower than the lower limit of conditional formula (3), the power of second lens L2 becomes too strong, and rays are sharply bent by second lens L2. Therefore, correction of distortion becomes difficult, or correction of curvature of field becomes difficult.

When second lens L2 has a negative meniscus shape having a convex surface directed toward the object side, it is desirable that the following conditional formula (3-1) is satisfied:

$$1.0 < |f2/f| < 2.7 \qquad (3-1).$$

When second lens L2 has a negative meniscus shape having a convex surface directed toward the object side, it is possible to easily reduce the size of the lens system in the diameter direction. Therefore, even if the upper limit is 2.7, it is possible to easily reduce the size of the lens system in the diameter direction. If the value is lower than the lower limit of conditional formula (3-1), the power of second lens L2 becomes too strong, and rays are sharply bent at the second lens L2. Therefore, correction of distortion becomes difficult, or correction of curvature of field becomes difficult. Second lens L2 may have a plano-concave shape.

It is desirable that the following conditional formula (4) is satisfied:

$$1.0 < D2/f < 2.5 \qquad (4),$$ where f: a focal length of an entire system, and
D2: a distance on an optical axis between first lens L1 and second lens L2.

When the upper limit of conditional formula (4) is satisfied, it is possible to reduce the size of the lens system. If the value is lower than the lower limit of conditional formula (4), a distance between first lens L1 and second lens L2 becomes short, and the surface shape of the object-side surface of second lens L2 is restricted.

Therefore, correction of curvature of field and distortion becomes difficult.

When second lens L2 has a biconcave shape, it is desirable that the following conditional formula (4-1) is satisfied:

$$1.0 < D2/f < 2.8 \qquad (4-1).$$

When second lens L2 has a biconcave shape, it is possible to easily widen an angle of view, and to easily correct curvature of field, distortion and a spherical aberration. Further, when second lens L2 has a biconcave shape, it is possible to easily locate points at an effective diameter edge on the object-side surface of second lens L2 further to the object side, compared with a case in which second lens L2 has a meniscus shape having a convex surface directed toward the object side. Therefore, even if the upper limit is 2.8, it is possible to easily correct curvature of field while preventing the size of the lens system from becoming large. If the value is lower than the lower limit of conditional formula (4-1), a distance between first lens L1 and second lens L2 becomes short, and the surface shape of the object-side surface of second lens L2 is restricted. Therefore, correction of curvature of field and distortion becomes difficult. Here, second lens L2 may have a plano-concave shape.

It is desirable that the following conditional formula (5) is satisfied:

$$1.5 < f3/f < 3.0 \qquad (5),$$ where f: a focal length of an entire system, and
f3: a focal length of third lens L3.

When the upper limit of conditional formula (5) is satisfied, it is possible to prevent the power of third lens L3 from becoming too weak, and to easily correct curvature of field and a lateral chromatic aberration. If the value is lower than the lower limit of conditional formula (5), the power of third lens L3 becomes too strong, and a back focus becomes too short, or the power of third lens L3 becomes too strong and an allowable amount of production error of eccentricity becomes too small. Therefore, production becomes difficult.

When second lens L2 has a biconcave shape, it is desirable that the following conditional formula (5-1) is satisfied:

$$1.5 < f3/f < 4.6 \qquad (5-1).$$

When second lens L2 has a biconcave shape, it is possible to easily widen an angle of view, and to easily correct curvature of field, distortion and a spherical aberration. Further, When second lens L2 has a biconcave shape, it is possible to easily correct curvature of field. Therefore, even if the upper limit is 4.6, it is possible to excellently correct curvature of field. If the value is lower than the lower limit of conditional formula (5-1), the power of third lens L3 becomes too strong, and a back focus becomes too short, or the power of third lens L3 becomes too strong, and an allowable amount of production error of eccentricity becomes too small. Therefore, production becomes difficult. Here, second lens L2 may have a plano-concave shape.

It is desirable that the following conditional formula (6) is satisfied:

$$0.75 \leq (R8-R9)/(R8+R9) \qquad (6),$$ where

R8: a curvature radius of an object-side surface of fourth lens L4, and
R9: a curvature radius of an image-side surface of fourth lens L4.

When the upper limit and the lower limit of conditional formula (6) are satisfied, fourth lens L4 can have a plano-convex shape having a convex surface directed toward an image side or a meniscus shape having a convex surface directed toward the image side. Therefore, it is possible to excellently correct curvature of field and a spherical aberration. When the upper limit of conditional formula (6) is satisfied, the object-side surface of fourth lens L4 can be a flat surface or a concave surface. Therefore, it is possible to prevent the power of fourth lens L4 from becoming too strong, and to easily provide a long back focus. When the lower limit of conditional formula (6) is satisfied, it is possible to prevent the curvature radius of the image-side surface of fourth lens L4 from becoming too small, and to prevent the power of fourth lens L4 from becoming too weak. It is possible to easily suppress the angle of incidence of rays entering a sensor in a peripheral portion of an imaging device, or to prevent the curvature radius of the object-side surface from becoming too large. Therefore, correction of a spherical aberration becomes easy.

When second lens L2 has a biconcave shape, it is desirable that the following conditional formula (6-1) is satisfied:

$$0.60 < (R8-R9)/(R8+R9) \qquad (6\text{-}1).$$

When second lens L2 has a biconcave shape, it is possible to easily widen an angle of view. Further, correction of curvature of field, distortion and a spherical aberration becomes easy. Further, when second lens L2 has a biconcave shape, it is possible to easily increase the power of second lens L2, and second lens L2 can sharply bend rays. Therefore, it is possible to reduce the angle of incidence of rays entering fourth lens L4. Therefore, even if the lower limit is 0.60, it is possible to suppress the angle of incidence of rays entering a sensor in a peripheral area. When the upper limit and the lower limit of conditional formula (6-1) are satisfied, fourth lens L4 can have a plano-convex shape having a convex surface directed toward an image side or a meniscus shape having a convex surface directed toward the image side. Therefore, it is possible to excellently correct curvature of field and a spherical aberration. When the upper limit of conditional formula (6-1) is satisfied, the object-side surface of fourth lens L4 can be a flat surface or a concave surface. Therefore, it is possible to prevent the power of fourth lens L4 from becoming too strong, and to easily provide a long back focus. Here, second lens L2 may have a plano-concave shape.

It is desirable that the following conditional formula (7) is satisfied:

$$6.2 < |R8/f| \qquad (7),$$

where

R8: a curvature radius of an object-side surface of fourth lens L4, and f: a focal length of an entire system.

When the lower limit of conditional formula (7) is satisfied, correction of a spherical aberration becomes easy.

When second lens L2 has a biconcave shape, it is desirable that the following conditional formula (7-1) is satisfied:

$$4.5 < |R8/f| \qquad (7\text{-}1).$$

When second lens L2 has a biconcave shape, it is possible to easily widen an angle of view, and to easily correct curvature of field, distortion and a spherical aberration. Further, when second lens L2 has a biconcave shape, correction of a spherical aberration is easy, and even if the lower limit is 4.5, it is possible to achieve excellent resolution performance. Here, second lens L2 may have a plano-concave shape.

When second lens L2 has a biconcave shape, it is desirable the following conditional formula (10) is satisfied:

$$1.5 < (D4+D5)/f < 3.3 \qquad (10),$$

where

D4: a distance in air on an optical axis between second lens L2 and third lens L3, D5: a center thickness of third lens L3, and f: a focal length of an entire system.

When second lens L2 has a biconcave shape, it is possible to easily widen an angle of view, and to easily correct curvature of field, distortion and a spherical aberration. When conditional formula (10) is satisfied, a spherical aberration, distortion and a coma aberration are excellently corrected. Further, it is possible to provide a long back focus, and to widen an angle of view, and to achieve sufficient performance. When the upper limit of conditional formula (10) is satisfied, it is possible to easily reduce the diameter of a most-object-side negative lens, and to easily reduce the total lens length. Therefore, reduction in size becomes easy. When the lower limit of conditional formula (10) is satisfied, correction of a spherical aberration and a coma aberration becomes easy. Further, a lens with a small F-number is easily obtainable. Here, second lens L2 may have a plano-concave shape.

When second lens L2 has a biconcave shape, it is desirable that the following conditional formula (11) is satisfied:

$$3.1 < R4/f \qquad (11),$$

where

R4: a curvature radius of an image-side surface of second lens L2, and f: a focal length of an entire system.

When second lens L2 has a biconcave shape, it is possible to easily widen an angle of view, and to easily correct curvature of field, distortion and a spherical aberration. Further, when the lower limit of conditional formula (11) is satisfied while second lens L2 has a biconcave shape, it is possible to prevent the curvature radius of the image-side surface of second lens L2 from becoming small, and to easily correct curvature of field and a spherical aberration, or it is possible to suppress the power of second lens L2. Therefore, it is possible to prevent rays from being sharply bent by this lens, and correction of distortion becomes easy.

When second lens L2 has a meniscus lens shape having a convex surface directed toward the object side, it is desirable that the following conditional formula (11-1) is satisfied:

$$R4/f < 1.3 \qquad (11\text{-}1).$$

When second lens L2 has a meniscus shape having a convex surface directed toward the object side, it is possible to reduce the size of the lens system in the diameter direction while achieving a wide angle of view. Further, If the value exceeds the upper limit of conditional formula (11-1) while second lens L2 has a meniscus shape having a convex surface directed toward the object side, the power of second lens L2 becomes too weak, and it becomes difficult to widen an angle of view and to correct distortion. Here, second lens L2 may be a plano-concave lens.

It is desirable that the following conditional formula (12) is satisfied:

$$-160 < (R3-R4)/(R3+R4) < 0.85 \qquad (12),$$

where

R3: a curvature radius of an object-side surface of second lens L2, and

R4: a curvature radius of an image-side surface of second lens L2.

When the upper limit of conditional formula (12) is satisfied, it is possible to easily reduce the curvature radius of the object-side surface of a meniscus shape having a convex surface directed toward the object side, and to easily reduce the size of the lens system. When the lower limit of conditional formula (12) is satisfied, it is possible to easily reduce the absolute value of the curvature radius of the object-side surface of second lens L2, compared with the absolute value of the curvature radius of the image-side surface of second lens L2, in a biconcave lens. Therefore, correction of curvature of field, a coma aberration and a spherical aberration becomes easy.

When second lens L2 has a biconcave shape, it is desirable that the following conditional formula (12-1) is satisfied:

$$-160<(R3-R4)/(R3+R4)<-1.0 \quad (12\text{-}1).$$

When the upper limit is −1.0, it is possible to obtain, as second lens L2, a biconcave lens the absolute value of the curvature radius of the object-side surface of which is less than the absolute value of the curvature radius of the image-side surface thereof. Therefore, correction of curvature of field and distortion becomes easy. When the lower limit of conditional formula (12-1) is satisfied, it is possible to easily reduce the absolute value of the curvature radius of the object-side surface of second lens L2, compared with the absolute value of the curvature radius of the image-side surface of second lens L2, in the biconcave lens. Therefore, correction of curvature of field, a coma aberration and a spherical aberration becomes easy.

When second lens L2 has a meniscus shape having a convex surface directed toward the object side, it is desirable that the following conditional formula (12-2) is satisfied:

$$0.2<(R3-R4)/(R3+R4)<0.85 \quad (12\text{-}2).$$

When the lower limit is 0.2 while second lens L2 has a meniscus shape having a convex surface directed toward the object side, it is possible to easily increase the power of second lens L2, and correction of curvature of field and distortion becomes easy. When the upper limit of conditional formula (12-2) is satisfied, it is possible to easily reduce the curvature radius of the object-side surface of the meniscus shape having a convex surface directed toward the object side. Therefore, it is possible to easily reduce the size of the lens system.

It is desirable that the following conditional formula (13) is satisfied:

$$8<R1/f<50 \quad (13), \text{ where}$$

R1: a curvature radius of an object-side surface of first lens L1, and f: a focal length of an entire system.

If the value exceeds the upper limit of conditional formula (13), the curvature radius of the object-side surface of first lens L1 becomes large, and rays are sharply bent at this surface. Therefore, correction of distortion becomes difficult. If the value is lower than the lower limit of conditional formula (13), the curvature radius of the object-side surface of first lens L1 becomes too small, and it becomes difficult to widen an angle of view.

It is desirable that the following conditional formula (14) is satisfied:

$$2<R6/f \quad (14), \text{ where}$$

R6: a curvature radius of an image-side surface of third lens L3, and f: a focal length of an entire system.

If the value is lower than the lower limit of conditional formula (14), the power of third lens L3 becomes weak, and correction of curvature of field, a spherical aberration and a lateral chromatic aberration becomes difficult.

It is desirable that the following conditional formula (15) is satisfied:

$$0.5<D3/f<5.0 \quad (15), \text{ where}$$

D3: a center thickness of second lens L2, and f: a focal length of an entire system.

If the value exceeds the upper limit of conditional formula (15), the size of the lens system becomes large. If the value is lower than the lower limit of conditional formula (15), the center thickness of second lens L2 becomes small, and a ratio of the thickness of a peripheral portion of second lens L2 to the thickness of a central portion of second lens L2 becomes large, and formation of the lens becomes difficult.

It is desirable that the following conditional formula (16) is satisfied:

$$0.1\le(R1-R2)/(R1+R2)\le 1.0 \quad (16), \text{ where}$$

R1: a curvature radius of an object-side surface of first lens L1, and

R2: a curvature radius of an image-side surface of first lens L1.

If the value exceeds the upper limit of conditional formula (16), the object-side surface of first lens L1 becomes a concave surface, and rays are sharply bent at this surface. Therefore, correction of distortion becomes difficult, or an angle of incidence of peripheral rays entering the lens surface becomes large, and a reflection loss becomes large. Therefore, the peripheral area becomes dark. If the value is lower than the lower limit of conditional formula (16), the curvature radius of the object-side surface of first lens L1 and the curvature radius of the image-side surface of first lens L1 become close to each other, and the power of first lens L1 becomes weak. Therefore, it becomes difficult to widen the angle of view.

It is desirable that the following conditional formula (17) is satisfied:

$$0.2<R1/L<3.0 \quad (17), \text{ where}$$

R1: a curvature radius of an object-side surface of first lens L1, and

L: a distance from a vertex of an object-side surface of first lens L1 to an image plane.

If the value exceeds the upper limit of conditional formula (17), the curvature radius of the object-side surface of first lens L1 becomes too large, and rays are sharply bent at this surface. Therefore, correction of distortion becomes difficult. If the value is lower than the lower limit of conditional formula (17), the total length becomes too long, and it becomes difficult to reduce the size, or the curvature radius of the object-side surface of first lens L1 becomes too small, and it becomes difficult to widen an angle of view.

It is desirable that the following conditional formula (18) is satisfied:

$$-1.0\le(R5-R6)/(R5+R6)\le -0.1 \quad (18), \text{ where}$$

R5: a curvature radius of an object-side surface of third lens L3, and

R6: a curvature radius of an image-side surface of third lens L3.

If the value exceeds the upper limit of conditional formula (18), the absolute value of the curvature radius of the object-side surface and the absolute value of the curvature radius of the image-side surface become close to each other, and the power of third lens L3 becomes weak. Therefore, correction of a lateral chromatic aberration and a spherical aberration becomes difficult. When the lower limit of conditional formula (18) is satisfied, third lens L3 can have a plano-convex shape having a convex surface directed toward the object side, or a meniscus shape having a convex surface directed toward the object side. Therefore, correction of curvature of field and a coma aberration becomes easy.

It is desirable that the following conditional formula (19) is satisfied:

$$-0.8<f/f123<0.8 \quad (19), \text{ where}$$

f: a focal length of an entire system, and f123: a combined focal length of first lens L1, second lens L2 and third lens L3.

If the value exceeds the upper limit of conditional formula (19), the combined power of first lens L1, second lens L2 and third lens L3 becomes too strong positive power. Specifically, the positive power of third lens L3 becomes too strong, and aback focus becomes short, or the negative power of first lens L1 and second lens L2 becomes weak, and it becomes difficult to widen an angle of view, or the size of the lens becomes large. If the value is lower than the lower limit of conditional formula (19), the negative power of first lens L1 and second lens L2 becomes too strong, and correction of curvature of field becomes difficult, or the positive power of third lens L3 becomes too weak, and correction of curvature of field and a lateral chromatic aberration becomes difficult.

It is desirable that the following conditional formula (20) is satisfied:

$$1 \leq f34/f \leq 10 \quad (20),\text{ where}$$

f34: a combined focal length of third lens L3 and fourth lens L4, and f: a focal length of an entire system.

If the value exceeds the upper limit of conditional formula (20), the combined power of third lens L3 and fourth lens L4 becomes weak, and correction of curvature of field and a lateral chromatic aberration becomes difficult. Further, it becomes difficult to suppress an angle of incidence of rays entering an imaging device. If the value is lower than the lower limit of conditional formula (20), the combined power of third lens L3 and fourth lens L4 becomes too strong, and it becomes difficult to secure a back focus.

With respect to each of the aforementioned conditional formulas, it is desirable to satisfy the following condition in which an upper limit is further added, or in which a lower limit or an upper limit is modified. Further, a desirable mode may satisfy a conditional formula composed of a modified value of a lower limit and a modified value of an upper limit, as will be described next, in combination. Desirable modified examples of conditional formulas will be described next, as examples. However, the modified examples of conditional formulas are not limited to those represented by the following expressions, but may be a combination of the described modified values.

It is desirable that a modified value of the lower limit of conditional formula (1) is 2.3. Then, it is possible to further enhance the aforementioned action and effect. Further, 2.35 is more desirable to further enhance the action and effect. It is desirable to set an upper limit of conditional formula (1), and 2.8 is desirable as the value of the upper limit. When the upper limit is satisfied, it is possible to prevent the Abbe number of second lens L2 from becoming too large, and to easily increase the refractive index of second lens L2. Therefore, it becomes possible to easily widen an angle of view, and to easily correct distortion, or it becomes possible to suppress the cost of material by preventing the Abbe number of third lens L3 from becoming too small. Further, it is more desirable that the upper limit is 2.7 to widen an angle of view, and to correct distortion, and to suppress the cost of material. Further, 2.6 is even more desirable.

Therefore, for example, it is more desirable that the following conditional formulas (1-2) through (1-6) are satisfied:

$$2.3 < vd2/vd3 \quad (1\text{-}2);$$

$$2.35 < vd2/vd3 \quad (1\text{-}3);$$

$$2.25 < vd2/vd3 < 2.8 \quad (1\text{-}4);$$

$$2.3 < vd2/vd3 < 2.7 \quad (1\text{-}5);\text{ and}$$

$$2.35 < vd2/vd3 < 2.6 \quad (1\text{-}6).$$

It is desirable that the lower limit of conditional formula (2) is greater than or equal to 0.10. Then, correction of chromatic aberrations and curvature of field becomes easier. It is desirable to set the upper limit of conditional formula (2), and 0.16 is desirable as the upper limit value. Then, it becomes possible to easily increase the refractive index of second lens L2. Therefore, it becomes possible to easily widen an angle of view, and to easily correct distortion, or it becomes possible to prevent the refractive index of third lens L3 from becoming high, and to easily suppress the cost of the material of third lens L3. Further, 0.14 is more desirable as the upper limit value of conditional formula (2), and 0.11 is even more desirable to more easily widen an angle of view, and to more easily correct distortion, and to more easily suppress cost.

Therefore, for example, it is more desirable that the following conditional formulas (2-1) through (2-4) are satisfied:

$$0.10 \leq Nd3-Nd2 \quad (2\text{-}1);$$

$$0.09 < Nd3-Nd2 < 0.16 \quad (2\text{-}2);$$

$$0.10 \leq Nd3-Nd2 < 0.14 \quad (2\text{-}3);\text{ and}$$

$$0.10 \leq Nd3-Nd2 < 0.11 \quad (2\text{-}4).$$

As a modified value of the lower limit of conditional formula (3) and conditional formula (3-1), 1.2 is desirable. Then, it is possible to enhance the aforementioned action and effect. Further, 1.5 is more desirable to further enhance the action and effect, and 1.7 is even more desirable, and 1.8 is still even more desirable. Further, 1.9 is more desirable. As a modified value of the upper limit of conditional formula (3) and conditional formula (3-1), 2.4 is desirable. Then, it is possible to further enhance the aforementioned action and effect. Further, 2.2 is more desirable to further enhance the action and effect, and 2.19 is even more desirable, and 2.18 is still even more desirable. Further, 2.15 is more desirable.

Therefore, for example, it is more desirable that the following conditional formulas (3-2) through (3-8) are satisfied:

$$1.2 < |f2/f| < 2.7 \quad (3\text{-}2);$$

$$1.2 < |f2/f| < 2.6 \quad (3\text{-}3);$$

$$1.5 < |f2/f| < 2.4 \quad (3\text{-}4);$$

$$1.7 < |f2/f| < 2.2 \quad (3\text{-}5);$$

$$1.8 < |f2/f| < 2.19 \quad (3\text{-}6);$$

$$1.9 < |f2/f| < 2.18 \quad (3\text{-}7);\text{ and}$$

$$1.9 < |f2/f| < 2.6 \quad (3\text{-}8).$$

As a modified value of the lower limit of conditional formula (4), 1.5 is desirable. Then, it is possible to further enhance the aforementioned action and effect. Further, 2 is more desirable to further enhance the action and effect, and 2.04 is even more desirable. As a modified value of the upper limit of conditional formula (4), 2.4 is desirable. Then, it is possible to further enhance the aforementioned action and effect. Further, 2.2 is more desirable to further enhance the action and effect.

Therefore, for example, it is more desirable that the following conditional formulas (4-2) through (4-4) are satisfied:

$$1.5 < D2/f < 2.5 \quad (4\text{-}2);$$

$$2 < D2/f < 2.4 \quad (4\text{-}3); \text{ and}$$

$$2.04 < D2/f < 2.2 \quad (4\text{-}4).$$

As a modified value of the lower limit of conditional formula (4-1), 1.5 is desirable. Then, it is possible to further enhance the aforementioned action and effect. Further, 2 is more desirable to further enhance the action and effect, and 2.04 is even more desirable. As a modified value of the upper limit of conditional formula (4-1), 2.7 is desirable. Then, it is possible to further enhance the aforementioned action and effect. Further, 2.5 is more desirable to further enhance the action and effect, and 2.3 is even more desirable.

Therefore, for example, it is more desirable that the following conditional formulas (4-5) through (4-8) are satisfied:

$$1.5 < D2/f < 2.8 \quad (4\text{-}5);$$

$$1.5 < D2/f < 2.7 \quad (4\text{-}6);$$

$$1.5 < D2/f < 2.5 \quad (4\text{-}7); \text{ and}$$

$$2 < D2/f < 2.3 \quad (4\text{-}8).$$

As a modified value of the lower limit of conditional formula (5), 2 is desirable. Then, it is possible to further enhance the aforementioned action and effect. Further, 2.2 is more desirable to further enhance the action and effect, and 2.5 is even more desirable. As a modified value of the upper limit of conditional formula (5), 2.95 is desirable. Then, it is possible to further enhance the aforementioned action and effect. Further, 2.9 is more desirable to further enhance the action and effect, and 2.88 is even more desirable, and 2.8 is still even more desirable.

Therefore, for example, it is more desirable that the following conditional formulas (5-6) through (5-8) are satisfied:

$$2.0 < f3/f < 2.95 \quad (5\text{-}6);$$

$$2.2 < f3/f < 2.9 \quad (5\text{-}7); \text{ and}$$

$$2.5 < f3/f < 2.88 \quad (5\text{-}8).$$

As a modified value of the lower limit of conditional formula (5-1), 2 is desirable. Then, it is possible to further enhance the aforementioned action and effect. Further, 2.2 is more desirable to further enhance the action and effect, and 2.5 is even more desirable. As a modified value of the upper limit of conditional formula (5-1), 4.4 is desirable. Then, it is possible to further enhance the aforementioned action and effect. Further, 4.2 is more desirable to further enhance the action and effect, and 3.5 is even more desirable, and 3.2 is still even more desirable.

Therefore, for example, it is more desirable to satisfy the following conditional formulas (5-2) through (5-5):

$$1.5 < f3/f < 4.4 \quad (5\text{-}2);$$

$$1.5 < f3/f < 4.2 \quad (5\text{-}3);$$

$$1.5 < f3/f < 3.5 \quad (5\text{-}4); \text{ and}$$

$$2.2 < f3/f < 3.2 \quad (5\text{-}5).$$

As a modified value of the lower limit of conditional formula (6), 0.78 is desirable. Then, it is possible to further enhance the aforementioned action and effect. Further, 0.81 is more desirable to further enhance the action and effect. As a modified value of the upper limit of conditional formula (6), 0.99 is desirable. Then, it is possible to more easily provide a long back focus. Further, 0.95 is more desirable to provide a longer back focus.

Therefore, for example, it is more desirable that the following conditional formulas (6-2) and (6-3) are satisfied:

$$0.78 \le (R8-R9)/(R8+R9) \le 0.99 \quad (6\text{-}2); \text{ and}$$

$$0.81 \le (R8-R9)/(R8+R9) \le 0.95 \quad (6\text{-}3).$$

As a modified value of the lower limit of conditional formula (6-1), 0.65 is desirable. Then, it is possible to further enhance the aforementioned action and effect. Further, 0.7 is more desirable to further enhance the action and effect. As a modified value of the upper limit of conditional formula (6-1), 0.99 is desirable. Then, it is possible to more easily provide a long back focus. Further, 0.95 is more desirable to provide a longer back focus.

Therefore, for example, it is more desirable that the following conditional formulas (6-4) through (6-6) are satisfied:

$$0.65 (R8-R9)/(R8+R9) \le 1.0 \quad (6\text{-}4);$$

$$0.7 \le (R8-R9)/(R8+R9) \le 1.0 \quad (6\text{-}5); \text{ and}$$

$$0.65 \le (R8-R9)/(R8+R9) \le 0.99 \quad (6\text{-}6).$$

As a modified value of the lower limit of conditional formula (7), 7 is desirable. Then, it is possible to further enhance the aforementioned action and effect. Further, 10 is more desirable to further enhance the action and effect, and 15 is even more desirable, and 20 is still even more desirable. It is desirable to set an upper limit of conditional formula (7). As the upper limit value of conditional formula (7), 10000 is desirable. When this is satisfied, correction of curvature of field and a coma aberration becomes easy. Further, it is more desirable that the upper limit value is 1000 to easily correct curvature of field and a coma aberration, and 500 is even more desirable.

Therefore, for example, it is more desirable to satisfy the following conditional formulas (7-2) through (7-5):

$$7.0 < |R8/f| \quad (7\text{-}2);$$

$$7.0 < |R8/f| < 10000 \quad (7\text{-}3);$$

$$10 < |R8/f| < 1000 \quad (7\text{-}4); \text{ and}$$

$$15 < |R8/f| < 500 \quad (7\text{-}5).$$

As a modified value of the lower limit of conditional formula (7-1), 5 is desirable. Then, it is possible to further enhance the aforementioned action and effect. Further, 6 is more desirable to further enhance the action and effect, and 6.5 is even more desirable. It is desirable to set an upper limit of conditional formula (7-1). As the upper limit value of conditional formula (7-1), 10000 is desirable. When this is satisfied, correction of curvature of field and a coma aberration becomes easy. Further, it is more desirable that the upper limit value is 1000 to more easily correct curvature of field and a coma aberration, and 500 is even more desirable.

Therefore, for example, it is desirable that the following conditional formulas (7-6) through (7-9) are satisfied:

$$5 < |R8/f| \quad (7\text{-}6);$$

$$5 < |R8/f| < 10000 \quad (7\text{-}7);$$

$$6 < |R8/f| < 1000 \quad (7\text{-}8); \text{ and}$$

$$6.5 < |R8/f| < 500 \quad (7\text{-}9).$$

As a modified value of the lower limit of conditional formula (8), 9 is desirable. Then, it is possible to further enhance the aforementioned action and effect. Further, 10 is more desirable to further enhance the action and effect, and 10.5 is even more desirable. As a modified value of the upper limit of conditional formula (8), 13.8 is desirable. Then, it is possible to further enhance the aforementioned action and effect. Further, 13.5 is more desirable to further enhance the action and effect, and 13 is even more desirable, and 12 is still even more desirable.

Therefore, for example, it is more desirable that the following conditional formulas (8-1) through (8-4) are satisfied:

$$9.0<L/f<13.8 \quad (8\text{-}1);$$

$$9.0<L/f<13.5 \quad (8\text{-}2);$$

$$10<L/f<13 \quad (8\text{-}3); \text{ and}$$

$$10.5<L/f<12 \quad (8\text{-}4).$$

As a modified value of the lower limit of conditional formula (9), 1.5 is desirable. Then, it is possible to further enhance the aforementioned action and effect. Further, 1.7 is more desirable to further enhance the action and effect. As a modified value of the upper limit of conditional formula (9), 2.8 is desirable. Then, it is possible to further enhance the aforementioned action and effect. Further, 2.5 is more desirable to further enhance the action and effect, and 2.35 is even more desirable.

Therefore, for example, it is more desirable that the following conditional formulas (9-1) through (9-3) are satisfied:

$$1.5<Bf/f<2.8 \quad (9\text{-}1);$$

$$1.5<Bf/f<2.5 \quad (9\text{-}2); \text{ and}$$

$$1.7<Bf/f<2.3 \quad (9\text{-}3).$$

As a modified value of the lower limit of conditional formula (10), 2 is desirable. Then, it is possible to further enhance the aforementioned action and effect. Further, 2.3 is more desirable to further enhance the action and effect, and 2.5 is even more desirable. As a modified value of the upper limit of conditional formula (10), 3.2 is desirable. Then, it is possible to further enhance the aforementioned action and effect. Further, 3 is more desirable to further enhance the action and effect, and 2.9 is even more desirable.

Therefore, for example, it is more desirable that the following conditional formulas (10-1) through (10-3) are satisfied:

$$2.0<(D4+D5)/f<3.2 \quad (10\text{-}1);$$

$$2.3<(D4+D5)/f<3 \quad (10\text{-}2); \text{ and}$$

$$2.5<(D4+D5)/f<2.9 \quad (10\text{-}3).$$

As a modified value of the lower limit of conditional formula (11), 3.2 is desirable. Then, it is possible to further enhance the aforementioned action and effect. Further, 3.3 is more desirable to further enhance the action and effect, and 3.5 is even more desirable, and 3.8 is still even more desirable. It is desirable to set an upper limit value of conditional formula (11). As the upper limit value, 50 is desirable. Then, it is possible to prevent the curvature radius of the image-side surface of second lens L2 from becoming too large, and correction of distortion becomes easy. Further, 20.0 is more desirable, as the upper limit value, to more easily correct distortion, and 10.0 is even more desirable, and 8 is still even more desirable. Further, 6 is more desirable.

Therefore, for example, it is more desirable that the following conditional formulas (11-2) through (11-6) are satisfied:

$$3.1<R4/f<50.0 \quad (11\text{-}2);$$

$$3.2<R4/f<20.0 \quad (11\text{-}3);$$

$$3.3<R4/f<10.0 \quad (11\text{-}4);$$

$$3.5<R4/f<8.0 \quad (11\text{-}5); \text{ and}$$

$$3.8<R4/f<6.0 \quad (11\text{-}6).$$

It is desirable to set a lower limit value of conditional formula (11-1). As the lower limit value, 0.1 is desirable. Then, correction of curvature of field becomes easy. Further, it is more desirable that the lower limit value is 0.5 to more easily correct curvature of field, and 0.7 is even more desirable, and 0.8 is still even more desirable. As a modified value of the upper limit of conditional formula (11-1), 1.2 is desirable. Then, it is possible to further enhance the action and effect. Further, 1.1 is even more desirable to further enhance the action and effect, and 1 is still even more desirable.

Therefore, for example, it is more desirable that the following conditional formulas (11-7) through (11-10) are satisfied:

$$0.1<R4/f<1.3 \quad (11\text{-}7);$$

$$0.5<R4/f<1.2 \quad (11\text{-}8);$$

$$0.7<R4/f<1.1 \quad (11\text{-}9); \text{ and}$$

$$0.8<R4/f<1 \quad (11\text{-}10).$$

As a modified value of the lower limit of conditional formula (12), −30 is desirable. Then, it is possible to further enhance the aforementioned action and effect. Further, −20 is more desirable to further enhance the action and effect, and −10 is even more desirable, and −8 is still even more desirable. As a modified value of the upper limit of conditional formula (12), 0.82 is desirable. Then, it is possible to further enhance the action and effect. Further, 0.8 is more desirable to further enhance the action and effect, and 1 is even more desirable.

Therefore, for example, it is more desirable that the following conditional formulas (12-3) through (12-6) are satisfied:

$$-30<(R3-R4)/(R3+R4)<0.85 \quad (12\text{-}3);$$

$$-20<(R3-R4)/(R3+R4)<0.82 \quad (12\text{-}4);$$

$$-10<(R3-R4)/(R3+R4)<0.8 \quad (12\text{-}5); \text{ and}$$

$$-8<(R3-R4)/(R3+R4)<1 \quad (12\text{-}6).$$

As a modified value of the upper limit of conditional formula (12-1), −1.1 is desirable. Then, it is possible to easily prevent the curvature radius of the image-side surface from becoming too large, and the curvature radius of the object-side surface from becoming too small. Further, it is possible to easily correct curvature of field and distortion. Further, −1.5 is more desirable to further enhance the action and effect, and −2.0 is even more desirable. A modified value of the lower limit of conditional formula (12-1) may be considered in a similar manner to conditional formula (12).

Therefore, for example, it is more desirable that the following conditional formulas (12-7) and (12-8) are satisfied:

$$-160<(R3-R4)/(R3+R4)<-1.1 \quad (12\text{-}7); \text{ and}$$

$$-30<(R3-R4)/(R3+R4)<-1.5 \quad (12\text{-}8).$$

As a modified value of the lower limit of conditional formula (12-2), 0.3 is desirable. Then, it is possible to further enhance the action and effect. Further, 0.5 is more desirable to further enhance the action and effect, and 0.7 is even more desirable. A modified value of the upper limit of conditional formula (12-2) may be considered in a similar manner to conditional formula (12).

Therefore, for example, it is more desirable that the following conditional formulas (12-9) and (12-10) are satisfied:

$$0.3<(R3-R4)/(R3+R4)<0.85 \quad (12\text{-}9); \text{ and}$$

$$0.5<(R3-R4)/(R3+R4)<0.82 \quad (12\text{-}10).$$

As a modified value of the lower limit of conditional formula (13), 10 is desirable. Then, it is possible to further enhance the aforementioned action and effect. Further, 12 is more desirable to further enhance the action and effect, and 13 is even more desirable. As a modified value of the upper limit of conditional formula (13), 35 is desirable. Then, it is possible to further enhance the aforementioned action and effect. Further, 30 is more desirable to further enhance the action and effect, and 26 is even more desirable.

Therefore, for example, it is more desirable that the following conditional formulas (13-1) through (13-3) are satisfied:

$$10<R1/f<35 \quad (13\text{-}1);$$

$$12<R1/f<30 \quad (13\text{-}2); \text{ and}$$

$$13<R1/f<26 \quad (13\text{-}3).$$

As a modified value of the lower limit of conditional formula (14), 6 is desirable. Then, it is possible to further enhance the aforementioned action and effect. Further, 20 is more desirable to further enhance the action and effect, and 30 is even more desirable, and 35 is still even more desirable. It is desirable to set an upper limit of conditional formula (14). As the value of the upper limit, 5000 is desirable. Then, it is possible to easily correct curvature of field and a coma aberration. Further, 1000 is more desirable as the upper limit value to excellently correct curvature of field and a coma aberration, and 100 is even more desirable, and 70 is still even more desirable.

Therefore, for example, it is more desirable that the following conditional formulas (14-1) through (14-5) are satisfied:

$$2<R6/f<5000 \quad (14\text{-}1);$$

$$6<R6/f<5000 \quad (14\text{-}2);$$

$$20<R6/f<1000 \quad (14\text{-}3);$$

$$30<R6/f<100 \quad (14\text{-}4); \text{ and}$$

$$35<R6/f<70 \quad (14\text{-}5).$$

As a modified value of the lower limit of conditional formula (15), 0.7 is desirable. Then, it is possible to further enhance the action and effect. Further, 0.8 is more desirable to further enhance the action and effect, and 0.9 is even more desirable. As a modified value of the upper limit of conditional formula (15), 2 is desirable. Then, it is possible to further enhance the action and effect. Further, 1.8 is more desirable to further enhance the action and effect, and 1.5 is even more desirable.

Therefore, for example, it is more desirable that the following conditional formulas (15-1) through (15-3) are satisfied:

$$0.7<D3/f<2.0 \quad (15\text{-}1);$$

$$0.8<D3/f<1.8 \quad (15\text{-}2); \text{ and}$$

$$0.9<D3/f<1.5 \quad (15\text{-}3).$$

As a modified value of the lower limit of conditional formula (16), 0.4 is desirable. Then, it is possible to further enhance the action and effect. Further, 0.5 is more desirable to further enhance the action and effect, and 0.55 is even more desirable. As a modified value of the upper limit of conditional formula (16), 0.7 is desirable. Then, it is possible to more easily correct distortion. Further, 0.68 is more desirable to more easily correct distortion.

Therefore, for example, it is more desirable that the following conditional formulas (16-1) through (16-3) are satisfied:

$$0.4 \le (R1-R2)/(R1+R2) \le 1.0 \quad (16\text{-}1);$$

$$0.5 \le (R1-R2)/(R1+R2) \le 0.7 \quad (16\text{-}2); \text{ and}$$

$$0.55 \le (R1-R2)/(R1+R2) \le 0.68 \quad (16\text{-}3).$$

As a modified value of the lower limit of conditional formula (17), 0.5 is desirable. Then, it is possible to further enhance the action and effect. Further, 1 is more desirable to further enhance the action and effect, and 1.1 is even more desirable, and 1.2 is still even more desirable. As a modified value of the upper limit of conditional formula (17), 2 is desirable. Then, it is possible to further enhance the action and effect. Further, 1.7 is more desirable to further enhance the action and effect, and 1.5 is even more desirable.

Therefore, for example, it is more desirable that the following conditional formulas (17-1) through (17-4) are satisfied:

$$0.5<R1/L<3.0 \quad (17\text{-}1);$$

$$1.0<R1/L<2.0 \quad (17\text{-}2);$$

$$1.1<R1/L<1.7 \quad (17\text{-}3); \text{ and}$$

$$1.2<R1/L<1.5 \quad (17\text{-}4).$$

As a modified value of the upper limit of conditional formula (18), −0.2 is desirable. Then, it is possible to further enhance the action and effect. Further, −0.4 is more desirable to further enhance the action and effect, and −0.6 is even more desirable, and −0.7 is still even more desirable.

Therefore, for example, it is more desirable that the following conditional formulas (18-1) through (18-4) are satisfied:

$$-1.0 \le (R5-R6)/(R5+R6) \le 0.2 \quad (18\text{-}1);$$

$$-1.0 \le (R5-R6)/(R5+R6) \le -0.4 \quad (18\text{-}2);$$

$$-1.0 \le (R5-R6)/(R5+R6) \le -0.6 \quad (18\text{-}3); \text{ and}$$

$$-1.0 \le (R5-R6)/(R5+R6) \le -0.7 \quad (18\text{-}4).$$

As a modified value of the lower limit of conditional formula (19), −0.6 is desirable. Then, it is possible to further enhance the action and effect. Further, −0.5 is more desirable to further enhance the action and effect, and −0.3 is even more desirable. As a modified value of the upper limit of conditional formula (19), 0.5 is desirable. Then, it is possible to further enhance the action and effect. Further, 0.3 is more desirable to further enhance the action and effect, and 0.1 is even more desirable.

Therefore, for example, it is more desirable that the following conditional formulas (19-1) through (19-3) are satisfied:

$$-0.6 < f/f123 < 0.5 \quad (19\text{-}1);$$

$$-0.5 < f/f123 < 0.3 \quad (19\text{-}2); \text{ and}$$

$$-0.3 < f/f123 < 0.1 \quad (19\text{-}3).$$

As a modified value of the lower limit of conditional formula (20), 1.5 is desirable. Then, it is possible to further enhance the action and effect. Further, 2 is more desirable to further enhance the action and effect. As a modified value of the upper limit of conditional formula (20), 8 is desirable. Then, it is possible to further enhance the action and effect. Further, 6.5 is more desirable to further enhance the action and effect.

Therefore, for example, it is more desirable that the following conditional formulas (20-1) and (20-2) are satisfied:

$$1.5 f34/f \leq 8 \quad (20\text{-}1); \text{ and}$$

$$2.0 f34/f \leq 6.5 \quad (20\text{-}2).$$

It is desirable that an aperture stop is arranged between third lens L3 and fourth lens L4. It is possible to reduce the size of the entire system by arranging the aperture stop between third lens L3 and fourth lens L4.

It is desirable that the Abbe numbers of the materials of first lens L1, second lens L2 and fourth lens L4 for d-line are larger than or equal to 40. Then, it is possible to suppress generation of chromatic aberrations, and to achieve excellent resolution performance.

It is desirable that the Abbe number of the material of third lens L3 is less than or equal to 40. Then, it is possible to excellently correct a lateral chromatic aberration. Further, it is more desirable that the Abbe number is less than or equal to 30, and less than or equal to 28 is even more desirable, and less than or equal to 25 is still even more desirable.

When the Abbe number of the material of first lens L1 for d-line is $vd1$, and the Abbe number of the material of second lens L2 for d-line is $vd2$, it is desirable that $vd1/vd2$ is greater than or equal to 0.7. Then, it is possible to suppress generation of chromatic aberrations, and to achieve excellent resolution performance. Further, it is more desirable that $vd1/vd2$ is greater than or equal to 0.8.

When the Abbe number of the material of first lens L1 for d-line is $vd1$, and the Abbe number of the material of third lens L3 for d-line is $vd3$, it is desirable that $vd1/vd3$ is greater than or equal to 1.95. Then, it is possible to excellently correct a longitudinal chromatic aberration and a lateral chromatic aberration. Further, it is more desirable that $vd1/vd3$ is greater than or equal to 2.00 to more excellently correct a longitudinal chromatic aberration and a lateral chromatic aberration, and greater than or equal to 2.05 is even more desirable.

When the Abbe number of the material of first lens L1 for d-line is $vd1$, and the Abbe number of the material of third lens L3 for d-line is $vd3$, it is desirable that $vd1/vd3$ is less than or equal to 2.5. Then, it is possible to prevent the Abbe number of third lens L3 from becoming too small, and to easily lower the cost of the material of third lens L3, or since it is possible to suppress the Abbe number of first lens L1, it is possible to increase the refractive index of first lens L1, and to easily increase the power of first lens L1. Further, it is possible to easily reduce the size of the lens system, and to easily correct distortion. Further, it is more desirable that $vd1/vd3$ is less than or equal to 2.40 to more easily reduce the size of the lens system, and to more easily correct distortion, and less than or equal to 2.20 is even more desirable.

When the Abbe number of the material of third lens L3 for d-line is $vd3$, and the Abbe number of the material of fourth lens L4 for d-line is $vd4$, it is desirable that $vd4/vd3$ is greater than or equal to 2.1. Then, it is possible to excellently correct a longitudinal chromatic aberration and a lateral chromatic aberration. Further, it is more desirable that $vd4/vd3$ is greater than or equal to 2.2 to more excellently correct a longitudinal chromatic aberration and a lateral chromatic aberration, and greater than or equal to 2.30 is even more desirable, and greater than or equal to 2.35 is still even more desirable.

When the Abbe number of the material of second lens L2 for d-line is $vd2$, and the Abbe number of the material of fourth lens L4 for d-line is $vd4$, it is desirable that $vd2/vd4$ is greater than or equal to 0.8 and less than or equal to 1.2. When this condition is satisfied, it is possible to suppress generation of chromatic aberrations, and to achieve excellent resolution performance.

It is desirable that the refractive index of the material of first lens L1 for d-line is lower than or equal to 1.88. Then, it is possible to easily lower the cost of the material of first lens L1. Further, since the material having a low refractive index is used, a material having a large Abbe number becomes selectable. Therefore, correction of chromatic aberrations becomes easy. Further, it becomes possible to easily achieve excellent resolution performance. Further, it is more desirable that the refractive index is lower than or equal to 1.85 to more excellently correct chromatic aberrations, and lower than or equal to 1.80 is even more desirable.

It is desirable that the refractive index of the material of first lens L1 for d-line is higher than or equal to 1.60. Then, it is possible to easily increase the power of first lens L1. Therefore, it becomes possible to easily widen an angle of view, and to easily process. Further, correction of distortion becomes easy. Further, it is more desirable that the refractive index is higher than or equal to 1.65 to more easily widen an angle of view, and to easily process, and to easily correct distortion, and higher than or equal to 1.70 is even more desirable.

It is desirable that the refractive index of the material of second lens L2 for d-line is lower than or equal to 1.70. Then, it is possible to lower the cost of the material of second lens L2. Further, if a material has a high refractive index, an Abbe number becomes small. Therefore, chromatic aberrations become large, and it becomes difficult to achieve excellent resolution performance. Further, it is more desirable that the refractive index is lower than or equal to 1.65 to lower the cost of the material of second lens L2, and lower than or equal to 1.60 is even more desirable.

It is desirable that the refractive index of the material of second lens L2 for d-line is higher than or equal to 1.50. Then, it is possible to easily increase the power of second lens L2, and to easily correct distortion. Further, since it is possible to easily increase the power of second lens L2, it is possible to easily reduce the size of the lens system.

It is desirable that the refractive index of the material of third lens L3 for d-line is lower than or equal to 1.75. Then, it is possible to lower the cost of the material of third lens L3. Further, it is more desirable that the refractive index is lower than or equal to 1.70 to lower the cost of the material of third lens L3, and lower than or equal to 1.68 is even more desirable, and lower than or equal to 1.65 is still even more desirable.

It is desirable that the refractive index of the material of third lens L3 for d-line is higher than or equal to 1.50. When the refractive index of the material of third lens L3 is increased in this manner, it is possible to easily increase the power of third lens L3. Therefore, correction of a lateral chromatic aberration and curvature of field becomes easy. Further, it is more desirable that the refractive index is higher than or equal to 1.55, and higher than or equal to 1.60 is even more desirable, and higher than or equal to 1.63 is still even more desirable.

It is desirable that the refractive index of the material of fourth lens L4 for d-line is lower than or equal to 1.70. Then, it is possible to lower the cost of the material of fourth lens L4. Further, if a material has a high refractive index, an Abbe number becomes small. Therefore, chromatic aberrations become large, and it becomes difficult to achieve excellent resolution performance. Further, it is more desirable that the refractive index of the material of fourth lens L4 for d-line is lower than or equal to 1.65 to more easily suppress the cost of the material, and to more easily correct chromatic aberrations, and lower than or equal to 1.60 is even more desirable.

It is desirable that the refractive index of the material of fourth lens L4 for d-line is higher than or equal to 1.50. When the refractive index of the material of fourth lens L4 is increased in this manner, it is possible to easily increase the power of fourth lens L4. When the power of fourth lens L4 is increased, fourth lens L4 can easily correct a spherical aberration. Further, since it becomes easy to sharply bend rays at fourth lens L4, it is possible to easily suppress an angle of incidence of peripheral rays entering an imaging device. Therefore, it becomes possible to easily suppress shading.

When the refractive index of the material of first lens L1 for d-line is Nd1, and the refractive index of the material of second lens L2 for d-line is Nd2, it is desirable that Nd1/Nd2 is greater than or equal to 0.95 and less than or equal to 1.3. If the value is lower than the lower limit of this condition, it becomes difficult to allocate negative power to first lens L1 and second lens L2 in a well-balanced manner, and correction of distortion becomes difficult, or Nd2 becomes too high, and the Abbe number of second lens L2 becomes small. Therefore, correction of a lateral chromatic aberration becomes difficult. If the value exceeds the upper limit of this condition, it becomes difficult to allocate negative power to first lens L1 and second lens L2 in a well-balanced manner, and correction of distortion becomes difficult. As a modified value of the lower limit, 1.0 is desirable, and 1.05 is more desirable. As a modified value of the upper limit, 1.2 is desirable, and 1.15 is more desirable. Here, a condition composed of a modified value of the lower limit and a modified value of the upper limit in combination may be satisfied.

When the refractive index of the material of second lens L2 for d-line is Nd2, and the refractive index of the material of third lens L3 for d-line is Nd3, it is desirable that Nd3/Nd2 is greater than or equal to 1.0 and less than or equal to 1.2. When the value satisfies the lower limit of this condition, it becomes possible to prevent the refractive index of the material of third lens L3 from becoming too low. The power of third lens L3 becomes weak, and correction of curvature of field and a lateral chromatic aberration becomes easy. When the value satisfies the upper limit of this condition, it is possible to prevent the refractive index of the material of third lens L3 from becoming high. Therefore, it is possible to easily prevent the cost of third lens L3 from becoming high, or it is possible to prevent the refractive power of the material of second lens L2 from becoming low. Therefore, it is possible to prevent the power of second lens L2 from becoming weak. Further, it becomes possible to appropriately maintain a balance between the negative power of first lens L1 and the negative power of second lens L2, and correction of distortion becomes easy, or it becomes possible to easily reduce the size of the lens system.

When the refractive index of the material of first lens L1 for d-line is Nd1, and the refractive index of the material of fourth lens L4 for d-line is Nd4, it is desirable that Nd1/Nd4 is greater than or equal to 0.95 and less than or equal to 1.3. When the value satisfies the lower limit of this condition, it becomes possible to prevent the value of Nd1 from becoming small, and to prevent the power of first lens L1 from becoming weak. Therefore, it becomes possible to easily widen an angle of view, or to easily reduce the size of the lens system, or it becomes possible to prevent the refractive index of the material of fourth lens L4 from becoming high, and to prevent the Abbe number of the material of fourth lens L4 from becoming small. Therefore, correction of chromatic aberrations becomes easy. When the value satisfies the upper limit of this condition, it is possible to prevent the power of first lens L1 from becoming too strong, and correction of distortion becomes easy, or it is possible to prevent the power of fourth lens L4 from becoming too weak. Therefore, correction of a spherical aberration becomes easy, or since it becomes easy to sharply bend rays at fourth lens L4, it becomes possible to easily suppress an angle of incidence of peripheral rays entering an imaging device. Hence, it becomes possible to easily suppress shading. As a modified value of the lower limit of this condition, 1.0 is desirable.

It is desirable that the object-side surface of second lens L2 is an aspherical surface. In such a case, it is possible to easily reduce the size of the lens system, and to easily widen an angle of view, or excellent correction of curvature of field and distortion becomes easy.

It is desirable that the image-side surface of second lens L2 is an aspherical surface. Then, it is possible to excellently correct curvature of field and distortion.

It is desirable that the image-side surface of third lens L3 is an aspherical surface. Then, it is possible to excellently correct curvature of field.

It is desirable that the object-side surface of fourth lens L4 is an aspherical surface. Then, it is possible to excellently correct a spherical aberration and curvature of field.

It is desirable that the image-side surface of fourth lens L4 is an aspherical surface. Then, it is possible to excellently correct a spherical aberration, curvature of field and distortion.

It is desirable that the object-side surface of second lens L2 is an aspherical surface. It is desirable that the object-side surface of second lens L2 has a shape having positive power at the center and weaker positive power at an effective diameter edge, compared with the center, or a shape having positive power at the center and negative power at the effective diameter edge. When second lens L2 has such a shape, it is possible to reduce the size of the lens system, and to widen an angle of view, and to excellently correct curvature of field at the same time.

Here, the phrase "effective diameter of a surface" means the diameter of a circle composed of outermost points (paints farthest from an optical axis) in the direction of the diameter when points of intersection of all rays contributing to image formation and a lens surface are considered. Further, the term "effective diameter edge" means the outermost points. When a system is rotationally symmetric with respect to an optical axis, a figure composed of the outermost points is a circle. However, when a system is not rotationally symmetric, a figure composed of the outermost points is not a circle in some cases. In such a case, an equivalent circle may be considered, and the diameter of the equivalent circle may be regarded as an effective diameter.

With respect to the shape of an aspherical surface, when a point on an i-th lens surface is Xi, and an intersection of a normal at the point and an optical axis is Pi, a length of Xi–Pi (|Xi–Pi|) is defined as the absolute value |RXi| of a curvature radius at point Xi, and Pi is defined as the center of curvature at point Xi. Further, an intersection of the i-th lens surface and the optical axis is Q1. At this time, power at point Xi is defined based on whether point Pi is located on the object side or on the image side with respect to point Q1. When point Xi is a point on the object-side surface, if point Pi is located on the image side of point Q1, power at point Xi is defined as positive power, but if point Pi is located on the object side of point Q1, power at point Xi is defined as negative power. When point Xi is a point on the image-side surface, if point Pi is located on the object side of point Q1, power at point Xi is defined as positive power, but if point Pi is located on the image side of point Q1, power at point Xi is defined as negative power.

Here, with reference to FIG. 3, the shape of the object-side surface of second lens L2 will be described. FIG. 3 is a diagram illustrating optical paths of the imaging lens 1 illustrated in FIG. 1. In FIG. 3, point Q3 is the center of the object-side surface of second lens L2, which is an intersection of the object-side surface of second lens L2 and optical axis Z. Point X3 in FIG. 3 is a point on an effective diameter edge on the object-side surface of second lens L2, which is an intersection of an outermost ray 6 included in off-axial rays 3 and the object-side surface of second lens L2.

At this time, an intersection of a normal to the lens surface at point X3 and optical axis Z is point P3, as illustrated in FIG. 3, and segment X3–P3 connecting point X3 and point P3 is defined as curvature radius RX3 at point X3, and the length |X3–P3| of segment X3–P3 is defined as absolute value |RX3| of curvature radius RX3. In other words, |X3–P3|=|RX3|. Further, a curvature radius at point Q3, in other words, a curvature radius at the center of the object-side surface of second lens L2 is R3, and the absolute value of the curvature radius is |R3| (not illustrated in FIG. 3)

The expression that the object-side surface of second lens L2 "has positive power at the center" means that a paraxial region including point Q3 has a convex shape. Further, the expression that the object-side surface of second lens L2 has "a shape having weaker positive power at an effective diameter edge, compared with the center" means a shape in which point P3 is located on the image side of point Q3, and absolute value |RX3| of a curvature radius at point X3 is greater than absolute value |R3| of a curvature radius at point Q3.

In FIG. 3, for the purpose of understanding, circle CQ3, which passes point Q3 with the radius of |R3|, and the center of which is a point on an optical axis, is drawn with a two dot dashed line. Further, a part of circle CX3, which passes point X3 with the radius of |RX3|, and the center of which is a point on the optical axis, is drawn with a broken line. Circle CX3 is larger than circle CQ3, and |R3|<|RX3| is clearly illustrated.

The expression that the object-side surface of second lens L2 has "a shape having negative power at the effective diameter edge" means a shape in which point P3 is located on the object side of point Q3.

The object-side surface of second lens L2 may have a shape having negative power at the center and weaker negative power at an effective diameter edge, compared with the center, or a shape having negative power at the center and positive power at the effective diameter edge. When the object-side surface of second lens L2 has such a shape, it is possible to excellently correct curvature of field and distortion.

The shape of the object-side surface of second lens L2 may be considered, as follows, in a manner similar to the aforementioned shape explained with reference to FIG. 3. The expression that "has negative power at the center" means that a paraxial region including point Q3 has a concave shape. Further, the expression that the object-side surface of second lens L2 has "a shape having weaker negative power at an effective diameter edge, compared with the center" means a shape in which point P3 is located on the object side of point Q3, and absolute value |RX3| of a curvature radius at point X3 is greater than absolute value |R3| of a curvature radius at point Q3. Further, the expression that the object-side surface of second lens L2 has "a shape having positive power at the effective diameter edge" means a shape in which point P3 is located on the image side of point Q3.

It is desirable that the image-side surface of second lens L2 is an aspherical surface. It is desirable that the image-side surface of second lens L2 has a shape having negative power at the center and weaker negative power at an effective diameter edge, compared with the center. When second lens L2 has such a shape, it is possible to excellently correct distortion and curvature of field.

The shape of the image-side surface of second lens L2 may be considered, as follows, in a manner similar to the shape of the object-side of second lens L2 explained with reference to FIG. 3. In a lens cross section, when an effective diameter edge on the image-side surface of second lens L2 is point X4, and an intersection of a normal at the point and optical axis Z is point P4, segment X4–P4 connecting point X4 and point P4 is defined as a curvature radius at point X4, and the length |X4–P4| of the segment connecting point X4 and point P4 is defined as absolute value |RX4| of the curvature radius at point X4. Therefore, |X4–P4|=|RX4|. Further, an intersection of the image-side surface of second lens L2 and optical axis Z, in other words, the center of the image-side surface of second lens L2 is point Q4, and the absolute value of a curvature radius at point Q4 is |R4|.

The expression that the image-side surface of second lens L2 has "a shape having negative power at the center and weaker negative power at an effective diameter edge, compared with the center" means a shape in which a paraxial region including point Q4 has a concave shape, and point P4 is located on the image side of point Q4, and absolute value |RX4| of a curvature radius at point X4 is greater than absolute value |R4| of a curvature radius at point Q4.

The image-side surface of second lens L2 may have a shape having negative power at the center and stronger negative power at a point of 50% of an effective diameter, compared with the center. When the image-side surface of second lens L2 has such a shape, it is possible to excellently correct curvature of field and distortion. The phrase "a point of 50% of an effective diameter" means a point on a lens surface, the coordinate of which in the diameter direction of the lens surface (a coordinate in a direction perpendicular to an optical axis) is a distance of 50% of the effective diameter of the lens from the center of the lens.

The expression that the image-side surface of second lens L2 has "a shape having negative power at the center and stronger negative power at a point of 50% of an effective diameter, compared with the center" means that when a point of 50% of an effective diameter on the image-side surface of second lens L2 is X4', and an intersection of a normal at the point and optical axis Z is P4' in a lens cross section, a paraxial region including point Q4 has a concave shape, and point P4' is located on the image side of point Q4, and absolute value |RX4'| of a curvature radius at point X4' is less than absolute value |R4| of a curvature radius at point Q4.

Further, the image-side surface of second lens L2 may have a shape having weaker power at an effective diameter edge, compared with a point of 50% of the effective diameter. When the image-side surface of second lens L2 has such a shape, it is possible to excellently correct curvature of field and distortion.

The expression "a shape having weaker power at an effective diameter edge, compared with a point of 50% of the effective diameter" means a shape in which absolute value |RX4| of a curvature radius at point X4 is greater than absolute value |RX4'| of a curvature radius at point X4'.

The image-side surface of second lens L2 may have a shape having negative power both at a point of 50% of the effective diameter and at the effective diameter edge, and in which the negative power is weaker at the effective diameter edge, compared with the point of 50% of the effective diameter. When the image-side surface of second lens L2 has such a shape, it is possible to excellently correct curvature of field and distortion.

The expression of "a shape having negative power both at a point of 50% of the effective diameter and at the effective diameter edge, and in which the negative power is weaker at the effective diameter edge, compared with the point of 50% of the effective diameter" means a shape in which both of point P4 and point P4', which are centers of curvature of point X4 and point X4', are located on the image side of point Q4, and that the absolute value |RX4| of a curvature radius at point X4 is greater than the absolute value |RX4'| of a curvature radius at point X4'.

Second lens L2 may have a meniscus shape having a convex surface directed toward the object side. In such a case, it is possible to easily correct curvature of field, while reducing the size of the lens system. When second lens L2 has a meniscus shape having a convex surface directed toward the object side, it is desirable that the object-side surface of second lens has positive power at the center, and weaker positive power at an effective diameter edge, compared with the center, or negative power at the effective diameter edge. Then, it is possible to reduce the size of the lens system, and to widen an angle of view, and to excellently correct curvature of field at the same time.

Second lens L2 may have a biconcave shape. In such a case, it is possible to easily correct curvature of field and distortion, while reducing the size of the lens system, and widening an angle of view. When second lens L2 has a biconcave shape, it is desirable that the object-side surface of second lens L2 has a shape having negative power at the center, and weaker negative power at the effective diameter edge, compared with the center. Then, it is possible to widen an angle of view, and to excellently correct curvature of field and distortion at the same time. When second lens L2 has a biconcave shape, the object-side surface of second lens L2 may have a shape having negative power at the center, and positive power at the effective diameter edge. In such a case, it is possible to widen an angle of view, and to excellently correct curvature of field and distortion at the same time.

It is desirable that the object-side surface of third lens L3 is an aspherical surface. It is desirable that the object-side surface of third lens L3 has a shape having positive power at the center, and stronger positive power at a point of 50% of the effective diameter, compared with the center. When the object-side surface of third lens L3 has such a shape, it is possible to excellently correct curvature of field and a lateral chromatic aberration.

The shape of the object-side surface of third lens L3 may be considered, as follows, in a manner similar to the shape of the object-side of second lens L2 explained with reference to FIG. 3. In a lens cross section, when a point of 50% of an effective diameter on the object-side surface of third lens L3 is point X5', and an intersection of a normal at the point and optical axis Z is point P5', segment X5'-P5' connecting point X5' and point P5' is defined as a curvature radius at point X5', and the length |X5'-P5'| of the segment connecting point X5' and point P5' is defined as absolute value |RX5'| of the curvature radius at point X5'. Therefore, |X5'-P5'|=|RX5'|. Further, an intersection of the object-side surface of third lens L3 and optical axis Z, in other words, the center of the object-side surface of third lens L3 is point Q5, and the absolute value of a curvature radius at point Q5 is |R5|.

The expression that the object-side surface of third lens L3 has "a shape having positive power at the center and stronger positive power at a point of 50% of an effective diameter, compared with the center" means a shape in which a paraxial region including point Q5 has a convex shape, and point P5' is located on the image side of point Q5, and the absolute value |RX5'| of a curvature radius at point X5' is less than absolute value |R5| of a curvature radius at point Q5.

The object-side surface of third lens L3 may have a shape having weaker power at a point on an effective diameter edge, compared with a point of 50% of the effective diameter. When the object-side surface of third lens L3 has such a shape, it is possible to excellently correct curvature of field and a lateral chromatic aberration.

In a lens cross section, when a point on an effective diameter edge on the object-side surface of third lens L3 is point X5, and an intersection of a normal at the point and optical axis Z is point P5, segment X5–P5 connecting point X5 and point P5 is defined as a curvature radius at point X5, and the length |X5–P5| of the segment connecting point X5 and point P5 is defined as absolute value |RX5| of the curvature radius at point X5.

The expression of "a shape having weaker power at a point on an effective diameter edge, compared with a point of 50% of the effective diameter" means a shape in which absolute value |RX5| of a curvature radius at point X5 is greater than absolute value |RX5'| of a curvature radius at point X5'.

Further, the object-side surface of third lens L3 may have a shape having positive power both at a point of 50% of an effective diameter and at a point on the effective diameter edge. When the object-side surface of third lens L3 has such a shape, it is possible to excellently correct curvature of field and a lateral chromatic aberration.

The expression of "a shape having positive power both at a point of 50% of an effective diameter and at a point on the effective diameter edge" means that both of point P5 and point P5' are located on the image side of point Q5.

The object-side surface of third lens L3 may have a shape having positive power at the center, and including, between the center and the effective diameter edge, a point at which positive power is stronger, compared with the center. When the object-side surface of third lens L3 has such a shape, it is possible to excellently correct curvature of field and a lateral chromatic aberration.

The shape of the object-side surface of third lens L3 may be considered, as follows, in a manner similar to the shape of the object-side of second lens L2 explained with reference to FIG. 3. In a lens cross section, when a point between the center of the object-side surface of third lens L3 and the effective diameter edge is point X5", and an intersection of a normal at the X5" and optical axis Z is point P5", segment X5"-P5" connecting point X5" and point P5" is defined as a curvature radius at point X5", and the length |X5"-P5"| of the segment connecting point X5" and point P5" is defined as absolute value |RX5"| of the curvature radius at point X5".

The expression of "a shape having positive power at the center, and including, between the center and the effective diameter edge, a point at which positive power is stronger, compared with the center" means that a paraxial region including point Q5 has a convex shape, and that point P5" is located on the image side of point Q5, and that point X5", at which absolute value |RX5"| of a curvature radius is less than absolute value |R5| of a curvature radius at point Q5, is present.

It is desirable that the image-side surface of third lens L3 is an aspherical surface. It is desirable that the image-side surface of third lens L3 has a shape having negative power at the center, and stronger negative power at an effective diameter edge, compared with the center, or a shape having a flat surface at the center and negative power at the effective diameter edge. When the image-side surface of third lens L3 has such a shape, it is possible to excellently correct curvature of field.

The shape of the image-side surface of third lens L3 may be considered, as follows, in a manner similar to the shape of the object-side of second lens L2 explained with reference to FIG. 3. In a lens cross section, when an effective diameter edge on the image-side surface of third lens L3 is point X6, and an intersection of a normal at the point and optical axis Z is point P6, segment X6–P6 connecting point X6 and point P6 is defined as a curvature radius at point X6, and the length |X6–P6| of the segment connecting point X6 and point P6 is defined as absolute value |RX6| of the curvature radius at point X6. Therefore, |X6–P6|=|RX6|. Further, an intersection of the image-side surface of third lens L3 and optical axis Z, in other words, the center of the image-side surface of third lens L3 is point Q6, and the absolute value of a curvature radius at point Q6 is |R6|.

The expression that the image-side surface of third lens L3 has "a shape having negative power at the center, and stronger negative power at an effective diameter edge, compared with the center" means a shape in which a paraxial region including point Q6 has a concave shape, and point P6 is located on the image side of point Q6, and absolute value |RX6| of a curvature radius at point X6 is less than absolute value |R6| of a curvature radius at point Q6.

Further, the expression of "a shape having a flat surface at the center and negative power at the effective diameter edge" means a shape in which a paraxial region including point Q6 is a flat surface, and point P6 is located on the image side of point Q6.

It is desirable that the object-side surface of fourth lens L4 is an aspherical surface. It is desirable that the object-side surface of fourth lens L4 has a shape having negative power at the center, and stronger negative power at an effective diameter edge, compared with the center, or a shape having a flat surface at the center and negative power at the effective diameter edge. When fourth lens L4 has such a shape, it is possible to excellently correct a spherical aberration and curvature of field.

The shape of the object-side surface of fourth lens L4 may be considered, as follows, in a manner similar to the shape of the object-side of second lens L2 explained with reference to FIG. 3. In a lens cross section, when an effective diameter edge on the object-side surface of fourth lens L4 is point X8, and an intersection of a normal at the point and optical axis Z is point P8, segment X8–P8 connecting point X8 and point P8 is defined as a curvature radius at point X8, and the length |X8–P8| of the segment connecting point X8 and point P8 is defined as absolute value |RX8| of the curvature radius at point X8. Therefore, |X8–P8|=|RX8|. Further, an intersection of the object-side surface of fourth lens L4 and optical axis Z, in other words, the center of the object-side surface of fourth lens L4 is point Q8, and the absolute value of a curvature radius at point Q8 is |R8|.

The expression that the object-side surface of fourth lens L4 has "a shape having negative power at the center, and stronger negative power at an effective diameter edge, compared with the center" means a shape in which a paraxial region including point Q8 has a concave shape, and point P8 is located on the object side of point Q8, and absolute value |RX8| of a curvature radius at point X8 is less than absolute value |R8| of a curvature radius at point Q8.

Further, the expression of "a shape having a flat surface at the center and negative power at the effective diameter edge" means a shape in which a paraxial region including point Q8 is a flat surface, and point P8 is located on the object side of point Q8.

It is desirable that the image-side surface of fourth lens L4 is an aspherical surface. It is desirable that the image-side surface of fourth lens L4 has a shape having positive power at the center, and weaker positive power at an effective diameter edge, compared with the center. When fourth lens L4 has such a shape, it is possible to excellently correct a spherical aberration, curvature of field and distortion.

The shape of the image-side surface of fourth lens L4 may be considered, as follows, in a manner similar to the shape of the object-side of second lens L2 explained with reference to FIG. 3. In a lens cross section, when an effective diameter edge on the image-side surface of fourth lens L4 is point X9, and an intersection of a normal at the point and optical axis Z is point P9, segment X9–P9 connecting point X9 and point P9 is defined as a curvature radius at point X9, and the length |X9–P9| of the segment connecting point X9 and point P9 is defined as absolute value |RX9| of the curvature radius at point X9. Therefore, |X9–P9|=|RX9|. Further, an intersection of the image-side surface of fourth lens L4 and optical axis Z, in other words, the center of the image-side surface of fourth lens L4 is point Q9, and the absolute value of a curvature radius at point Q9 is |R9|.

The expression that the image-side surface of fourth lens L4 has "a shape having positive power at the center, and weaker positive power at an effective diameter edge, compared with the center" means a shape in which a paraxial region including point Q9 has a convex shape, and point P9 is located on the object side of point Q9, and absolute value |RX9| of a curvature radius at point X9 is greater than absolute value |R9| of a curvature radius at point Q9.

When each surface of the object-side surface of second lens L2 through the image-side surface of fourth lens L4 has an aspherical shape as described above, it is possible to excellently correct distortion in addition to a spherical aberration, curvature of field and a coma aberration.

It is desirable that first lens L1 has a positive meniscus shape. Then, it becomes possible to produce a wide angle lens exceeding, for example, 180 degrees. When first lens L1 is a biconcave lens, it is possible to easily increase the power of first lens L1. Therefore, it is possible to easily widen an angle of view. However, rays are sharply bent by first lens L1. Therefore, correction of distortion becomes difficult. Further, when the object-side surface is a concave surface, an angle of incidence of peripheral rays entering the lens surface becomes large. Therefore, when rays enter the surface, a reflection loss becomes large. Hence, a peripheral area becomes dark. Further, when an angle of incidence of a ray exceeds 180 degrees, the ray cannot enter the surface. Therefore, it is desirable that first lens L1 is a positive meniscus lens having a convex surface directed toward the object side to easily correct distortion while achieving a wide angle of view.

It is desirable that second lens L2 has a biconcave shape. When second lens L2 has a biconcave shape, it becomes possible to easily widen an angle of view, and to easily correct curvature of field, distortion and a spherical aberration. When second lens L2 has a biconcave shape, the absolute value of a curvature radius of the object-side surface may be less than the absolute value of a curvature radius of the image-side surface. When the absolute value of the curvature radius of the object-side surface is less than the absolute value of the curvature radius of the image-side surface, it becomes possible to easily correct curvature of field, a coma aberration and a spherical aberration in an excellent manner.

Second lens L2 may have a meniscus shape having a convex surface directed toward the object side. When second lens L2 has a meniscus shape having a convex surface directed toward the object side, it is possible to easily reduce the size of the lens system in the diameter direction while achieving a wide angle of view.

Second lens L2 may have a plano-concave shape having a flat surface directed toward the object side. In such a case, it is possible to easily reduce the diameter of the lens while excellently correcting curvature of field.

It is desirable that third lens L3 has a meniscus shape having a convex surface directed toward the object side. Then, it is possible to excellently correct curvature of field and a coma aberration.

Third lens L3 may have a plano-convex shape having a convex surface directed toward the object side in a paraxial region. In such a case, it is possible to excellently correct curvature of field and a coma aberration.

It is desirable that fourth lens L4 has a meniscus shape having a convex surface directed toward the image side. In such a case, it is possible to excellently correct a spherical aberration and curvature of field.

Fourth lens L4 may have a plano-convex shape having a convex surface directed toward the image side. In such a case, it is possible to excellently correct a spherical aberration and curvature of field.

It is desirable that the material of first lens L1 is glass. When an imaging lens is used in tough environment conditions, for example, such as use in an in-vehicle camera or a surveillance camera, the first lens L1, which is arranged on the most object side, needs to use a material resistant to a deterioration of a surface by wind and rain and a change in temperature by direct sun light, and resistant to chemicals, such as oils and fats and detergents. In other words, the material needs to be highly water-resistant, weather-resistant, acid-resistant, chemical-resistant, and the like. Further, in some cases, the material needs to be hard and not easily breakable. If the material of the first lens L1 is glass, it is possible to satisfy such needs. Alternatively, transparent ceramic may be used as the material of the first lens L1.

One or both of the surfaces of first lens L1 may be aspheric. When first lens L1 is a glass aspherical lens, it is possible to more excellently correct various aberrations.

Further, a protection means may be applied to the object-side surface of first lens L1 to increase the strength, scratch-resistance, and chemical-resistance of the surface. In that case, the material of first lens L1 may be plastic. The protection means may be a hard coating or a water-repellent coating.

It is desirable that a material of one of second lens L2, third lens L3 and fourth lens L4, or materials of arbitrary plural lenses of them in combination are plastic. When the material is plastic, it is possible to structure the lens system at low cost and at light weight. Further, when an aspherical surface is provided, it is possible to accurately produce the aspherical shape. Therefore, it is possible to produce a lens having excellent performance.

It is desirable that the material of second lens L2 is polyolefin. Polyolefin can produce a material having a low water absorption ratio, high transparency, low double refraction, and a large Abbe number. When the material of second lens L2 is polyolefin, it is possible to produce a lens a change in the shape of which by absorption of water is small, and which has high transparency and low double refraction. Further, since it is possible to produce the material having a large Abbe number, it is possible to suppress generation of a longitudinal chromatic aberration and a lateral chromatic aberration. Further, it is possible to produce a highly environment-resistant lens having excellent resolution performance.

It is desirable that the material of third lens L3 is polycarbonate. Polycarbonate has a small Abbe number. When polycarbonate is used in third lens L3, it is possible to excellently correct a lateral chromatic aberration.

It is desirable that the material of fourth lens L4 is polyolefin. Polyolefin can produce a material having a low water absorption ratio, high transparency, low double refraction, and a large Abbe number. When the material of fourth lens L4 is polyolefin, it is possible to produce a lens a change in the shape of which by absorption of water is small, and which has high transparency and low double refraction. Further, since it is possible to produce the material having a large Abbe number, it is possible to suppress generation of a longitudinal chromatic aberration and a lateral chromatic aberration. Further, it is possible to produce a highly environment-resistant lens having excellent resolution performance.

The material of second lens L2 and fourth lens L4 may be acrylic. Since acrylic is inexpensive, it is possible to lower the cost of the lens system by using acrylic.

When plastic material is used in at least one of second lens L2, third lens L3 and fourth lens L4, so-called nano composite material, in which particles smaller than the wavelength of light are mixed into plastic, may be used as the material. A material of one of second lens L2, third lens L3 and fourth lens L4, or materials of arbitrary plural lenses of them in combination may be glass. When the material is glass, it is possible to suppress a deterioration of performance caused by a change in temperature.

It is desirable that a glass transition temperature (Tg) of the material of at least one of first lens L1, second lens L2, third lens L3 and fourth lens L4 is higher than or equal to 145' C., and higher than or equal to 150° C. is more desirable. When a material the glass transition temperature of which is higher than or equal to 150° C. is used, it is possible to produce a lens having excellent heat-resistant characteristics.

Further, a filter that cuts ultraviolet light through blue light, or an IR (InfraRed) cut filter, which cuts infrared light, may be inserted between the lens system and the imaging device 5 based on the purpose of use of the imaging lens 1. Alternatively, a coating having properties similar to those of the aforementioned filter may be applied to a lens surface, or a material that absorbs ultraviolet light, blue light, infrared light or the like may be used as the material of one of the lenses.

FIG. 1 illustrates a case in which optical member PP, which is assumed to be various filters, is arranged between a lens system and the imaging device 5. Instead, the various filters may be arranged between lenses. Alternatively, a coating having an action similar to that of the various filters may be applied to a lens surface of one of the lenses included in the imaging lens.

Here, rays of light passing through the outside of the effective diameter between lenses may become stray light, and reach the image plane. Further, the stray light may become ghost. Therefore, it is desirable that a light shield means for blocking the stray light is provided, if necessary. The light shield means may be provided, for example, by applying an opaque paint to a portion of a lens in the outside of the effective diameter, or by providing there an opaque plate member. Alternatively, an opaque plate member, as a light shield means, may be provided in the optical path of rays that will become stray light. Alternatively, a hood-like member for blocking stray light may be provided further on the object side of the most-object-side lens. FIG. 1 illustrates an example in which light shield means 11, 12 are provided on the outside of the effective diameter on the image-side surface of first lens L1 and on the image-side surface of second lens L2, respectively. The position at which the light shield means is provided is not limited to the example illustrated in FIG. 1. The light shield means may be arranged on another lens or between lenses.

Further, a member, such as a stop, may be arranged between lenses to block peripheral rays in such a manner that relative illumination is within a practically acceptable range. The peripheral rays are rays from an object point that is not on optical axis Z, and pass through the peripheral portion of the entrance pupil of an optical system. When a member that blocks the peripheral rays is provided in this manner, it is possible to improve the image quality in the peripheral portion of the image formation area. Further, the member can reduce ghost by blocking light that generates the ghost.

In the imaging lenses according to the first through fourth embodiments, it is desirable that the lens system consists of only four lenses of first lens L1, second lens L2, third lens L3 and fourth lens L4. When the lens system consists of only four lenses, it is possible to lower the cost of the lens system.

An imaging apparatus according to an embodiment of the present invention includes the imaging lens according to an embodiment of the present invention. Therefore, it is possible to structure the imaging apparatus in small size and at low cost. Further, the imaging apparatus has a sufficiently wide angle of view, and can obtain an excellent image having high resolution by using an imaging device.

The imaging lens according to the first through fourth embodiments of the present invention may include at least one of structures of the other embodiments, or at least one of desirable structures of the other embodiments. For example, the imaging lens according to the first embodiment may include the structure of the second embodiment, or the imaging lens according to the second embodiment may include a desirable structure described as the structure of the first embodiment.

[Numerical Value Example of Imaging Lens]

Next, numerical value examples of imaging lenses of the present invention will be described. Lens cross sections of imaging lenses of Example 1 through Example 28 are illustrated in FIG. 4 through FIG. 31, respectively. In FIG. 4 through FIG. 31, the left side of the diagram is the object side, and the right side of the diagram is the image side. Further, aperture stop St, optical member PP and the imaging device 5, which is arranged on image plane Sim, are also illustrated in a similar manner to FIG. 1 and FIG. 2. In each diagram, aperture stop St does not represent the shape nor the size of aperture stop St but the position of aperture stop St on optical axis Z. In each example, signs Ri, Di (i=1, 2, 3, . . . ) in the lens cross section correspond to Ri, Di in lens data that will be described next.

Table 1 through Table 28 show lens data about the imaging lenses of Example 1 through Example 28, respectively. In each table, (A) shows basic lens data, and (B) shows various kinds of data, and (C) shows aspherical surface data.

In the basic lens data, column Si shows the surface number of the i-th surface (i=1, 2, 3, . . . ). The object-side surface of the most object-side composition element is the first surface, and surface numbers sequentially increase toward the image side. Column Ri shows the curvature radius of the i-th surface, and column Di shows a distance between the i-th surface and the (i+1)th surface on optical axis Z. Here, the sign of a curvature radius is positive when the shape of a surface is convex toward the object side, and the sign of a curvature radius is negative when the shape of a surface is convex toward the image side. Further, column Ndj shows the refractive index of the j-th optical element (j=1, 2, 3, . . . ) for d-line (wavelength is 587.6 nm). The most-object side lens is the first optical element, and the number j sequentially increases toward the image side. The column vdj shows the Abbe number of the j-th optical element for d-line. Here, the basic lens data include aperture stop St and optical member PP. In the column of the surface number, the term (St) is also written for a surface corresponding to aperture stop St.

In the basic lens data, mark "*" is attached to the surface number of an aspherical surface. The basic lens data show, as the curvature radius of an aspherical surface, the numerical value of a paraxial curvature radius (a curvature radius at the center). The aspherical surface data show the surface numbers of aspherical surfaces and aspherical surface coefficients related to the respective aspherical surfaces. In the aspherical surface data, "E-n" (n: integer) means "×10$^{-n}$", and "E+n" means "×10$^{n}$". Here, the aspherical surface coefficients are values of coefficients KA, RBm (m=3, 4, 5, . . . 20) in the following aspherical equation:

$$Zd = \frac{C \times Y^2}{1 + \sqrt{1 - KA \times C^2 \times Y^2}} + \sum_m RB_m Y^m, \quad \text{[Equation 1]}$$

where

Zd: depth of an aspherical surface (the length of a perpendicular from a point on the aspherical surface at height Y to a plane that contacts with the vertex of the aspherical surface and is perpendicular to the optical axis), Y: height (the length from the optical axis to the lens surface), C: paraxial curvature, and KA, RBm: aspherical surface coefficients (m=3, 4, 5, . . . 20).

In various kinds of data, Fno. is an F-number, and Bf (in Air) is a distance (corresponding to back focus, distance in air) on optical axis Z from the image-side surface of the most-image-side lens to image plane Sim, and L (in Air) is a distance (a back focus portion is a distance in air) on optical axis Z from the object-side surface of first lens L1 to image plane Sim, and f is the focal length of the entire system, and f1 is the focal length of first lens L1, and f2 is the focal length of second lens L2, and f3 is the focal length of third lens L3, and f34 is a combined focal length of third lens L3 and fourth lens L4, and f123 is a combined focal length of first lens L1, second lens L2 and third lens L3.

Tables 29 and 30 collectively show values corresponding to conditional formulas (1) through (20) for each example.

As the unit of each numerical value, "mm" is used for length. However, this unit is only an example. Since an optical system can be used by proportionally enlarging or reducing the optical system, other appropriate units may be used.

TABLE 1

EXAMPLE 1

(A)

| Si | Ri | Di | Ndj | vdj |
|---|---|---|---|---|
| 1 | 16.9265 | 1.4276 | 1.77250 | 49.6 |
| 2 | 4.3527 | 2.2012 | | |
| *3 | 7.6759 | 1.0500 | 1.53391 | 55.9 |
| *4 | 1.0480 | 0.8263 | | |
| *5 | 1.9864 | 2.2000 | 1.63360 | 23.6 |
| *6 | 1000.0000 | 0.2391 | | |
| 7(St) | ∞ | 0.2889 | | |
| *8 | −1000.0000 | 1.7501 | 1.53391 | 55.9 |
| *9 | −1.1131 | 1.2000 | | |
| 10 | ∞ | 0.7000 | 1.51680 | 64.2 |
| 11 | ∞ | 0.6545 | | |
| IMAGE PLANE | ∞ | | | |

(B)

| | |
|---|---|
| Fno | 2.6 |
| BF(in Air) | 2.32 |
| L(in Air) | 12.30 |
| f | 1.08 |
| f1 | −7.98 |
| f2 | −2.41 |
| f3 | 3.14 |
| f4 | 2.09 |
| f34 | 2.97 |
| f123 | −9.88 |

(C)

| SURFACE NUMBER | KA | RB3 | RB4 | RB5 | RB6 |
|---|---|---|---|---|---|
| 3 | 0.0000000E+00 | 1.0917669E−02 | −7.8958173E−03 | −3.3423152E−04 | 8.2541506E−05 |
| 4 | 0.0000000E+00 | 7.6280215E−02 | −3.1930964E−02 | 1.2828264E−02 | 9.9051649E−03 |
| 5 | 0.0000000E+00 | −2.2313486E−02 | 6.7134114E−02 | −1.5580962E−02 | −1.3434267E−04 |
| 6 | 0.0000000E+00 | 3.8241752E−02 | −5.5391519E−02 | 5.8997235E−02 | 1.0854623E−01 |
| 8 | 0.0000000E+00 | −3.8337251E−02 | −6.7423287E−02 | −2.6738181E−01 | 1.1800836E+00 |
| 9 | 0.0000000E+00 | −7.5371696E−02 | 9.4036237E−02 | −7.4788648E−02 | −1.3870291E−02 |

| | RB7 | RB8 | RB9 | RB10 | RB11 |
|---|---|---|---|---|---|
| 3 | 3.2156450E−05 | 6.7135998E−06 | 5.3327411E−07 | −1.6548650E−07 | −9.5669414E−08 |
| 4 | 9.4557558E−04 | −1.2019473E−03 | −9.2705266E−04 | −4.9291512E−04 | −1.9476422E−04 |
| 5 | 3.7322042E−03 | 1.5362683E−03 | −2.3546374E−06 | −2.8947379E−04 | −1.6266846E−04 |
| 6 | 8.0995170E−04 | −9.7719475E−02 | −5.6986103E−02 | −5.8655217E−02 | −2.0917184E−02 |
| 8 | −9.3597195E−01 | −1.1754780E+00 | −1.3669121E−01 | 2.7508992E+00 | 2.6574860E+00 |
| 9 | 2.0549125E−02 | 9.2088878E−03 | −2.3444904E−03 | −4.8909026E−03 | −3.1478131E−03 |

| | RB12 | RB13 | RB14 | RB15 | RB16 |
|---|---|---|---|---|---|
| 3 | −3.2521229E−08 | −7.0367660E−09 | −7.7693303E−10 | 3.2092798E−10 | 2.7850536E−10 |
| 4 | −2.9635319E−05 | 5.1396144E−05 | −6.1350390E−06 | −2.6281426E−06 | −6.7187873E−07 |
| 5 | −3.3963649E−05 | 5.7616996E−05 | 9.5788285E−07 | −1.6429810E−06 | −2.4802545E−06 |
| 6 | 1.6062322E−02 | 1.3200323E−01 | 1.4549135E−01 | 3.1627017E−02 | −6.9400047E−02 |
| 8 | −2.4187030E+00 | −4.4845308E+00 | −2.1773579E+00 | 1.4877129E+00 | 3.7827381E+00 |
| 9 | −6.5442043E−04 | 3.5812212E−04 | 5.5149146E−04 | 4.2539773E−04 | 2.0124978E−04 |

| | RB17 | RB18 | RB19 | RB20 |
|---|---|---|---|---|
| 3 | 1.3662203E−10 | 4.2815631E−11 | 2.6106935E−12 | −7.4839233E−12 |
| 4 | 5.9129031E−08 | 2.6842531E−07 | 2.6392422E−07 | 2.1576211E−07 |
| 5 | −1.9447676E−06 | −1.2247259E−06 | −2.7154630E−07 | 4.2258858E−07 |
| 6 | 1.6921584E−01 | −2.1987059E−01 | −9.6024239E−01 | 8.8070586E−01 |
| 8 | 8.2390345E+00 | 2.4455762E−01 | −1.9020265E+01 | 1.0361449E+01 |
| 9 | 3.7908012E−05 | −2.5975570E−05 | −4.5639461E−05 | 1.1767671E−05 |

TABLE 2

EXAMPLE 2

(A)

| Si | Ri | Di | Ndj | vdj |
|---|---|---|---|---|
| 1 | 17.0948 | 1.2500 | 1.77250 | 49.6 |
| 2 | 4.2306 | 2.8494 | | |
| *3 | −2.0000 | 1.2000 | 1.53391 | 55.9 |
| *4 | 2.6500 | 0.5405 | | |
| *5 | 1.5062 | 2.4630 | 1.63360 | 23.6 |
| *6 | 31.8875 | 0.2163 | | |
| 7(St) | ∞ | 0.2039 | | |
| *8 | −9.4728 | 1.7669 | 1.53391 | 55.9 |
| *9 | −0.9138 | 1.2000 | | |
| 10 | ∞ | 0.7000 | 1.51680 | 64.2 |
| 11 | ∞ | 0.1633 | | |
| IMAGE PLANE | ∞ | | | |

(B)

| | |
|---|---|
| Fno | 2.4 |
| BF(in Air) | 1.82 |
| L(in Air) | 12.31 |
| f | 0.86 |
| f1 | −7.60 |
| f2 | −1.96 |
| f3 | 2.42 |
| f4 | 1.77 |
| f34 | 4.10 |
| f123 | 26.40 |

(C)

| SURFACE NUMBER | KA | RB3 | RB4 | RB5 | RB6 |
|---|---|---|---|---|---|
| 3 | 0.0000000E+00 | 1.1334945E−01 | −1.4507862E−02 | −9.5514463E−04 | 3.7148790E−05 |
| 4 | 0.0000000E+00 | 1.1728516E−01 | 2.4672680E−02 | −5.4573448E−02 | 2.4021322E−02 |
| 5 | 0.0000000E+00 | 4.2717165E−02 | −4.5508020E−02 | 5.8331504E−02 | −1.4737229E−03 |
| 6 | 0.0000000E+00 | −1.7713407E−02 | 2.0814017E−01 | −2.4345834E−01 | 3.0091426E−02 |
| 8 | 0.0000000E+00 | −1.2476023E−02 | −1.8164355E−01 | −9.0190974E−01 | 4.2916337E+00 |
| 9 | 0.0000000E+00 | 9.9601822E−03 | −4.0304133E−02 | 2.0807324E−03 | −1.8216253E−02 |

| | RB7 | RB8 | RB9 | RB10 | RB11 |
|---|---|---|---|---|---|
| 3 | 4.8000623E−05 | 1.4635361E−05 | 2.3506368E−07 | −8.6889884E−07 | −3.1241921E−07 |
| 4 | 1.5507176E−02 | 3.3856392E−03 | −9.4243415E−04 | −1.3759257E−03 | −8.6041420E−04 |
| 5 | −2.8558086E−03 | −7.1137156E−04 | −7.8688470E−04 | −1.9583387E−04 | 5.2342104E−04 |
| 6 | 1.7870931E−01 | 7.8195817E−02 | −1.7099670E−01 | −3.4118778E−01 | −3.6976272E−01 |
| 8 | −4.3055865E+00 | −6.9143803E+00 | −4.9648705E−01 | 2.9393667E+01 | 3.4534008E+01 |
| 9 | 4.1551619E−02 | 1.0882724E−02 | −2.7166970E−02 | −3.1827094E−02 | −1.6988754E−02 |

| | RB12 | RB13 | RB14 | RB15 | RB16 |
|---|---|---|---|---|---|
| 3 | −7.9453523E−08 | 3.1870461E−09 | 7.7580020E−09 | 2.5617175E−09 | 1.0304234E−09 |
| 4 | −3.9633434E−04 | −1.1977045E−04 | −5.5763001E−07 | 2.1404784E−05 | 3.0059253E−05 |
| 5 | 2.2878692E−04 | 5.8968494E−05 | −5.2318370E−07 | −1.6126923E−05 | −1.6003118E−05 |
| 6 | −1.7895955E−01 | 3.2043808E−01 | 1.0011037E+00 | 1.1050060E+00 | 1.7575961E+00 |
| 8 | −5.0658686E+01 | −1.1486309E+02 | −7.0838829E+01 | 7.1182159E+01 | 2.3511043E+02 |
| 9 | 5.1177633E−03 | 1.8384912E−02 | 1.7833667E−02 | 9.4084004E−03 | −1.7346984E−03 |

| | RB17 | RB18 | RB19 | RB20 |
|---|---|---|---|---|
| 3 | −8.7641837E−11 | −1.0019449E−10 | −2.5402873E−11 | 7.4158627E−12 |
| 4 | 1.9002571E−05 | 6.9479840E−06 | −1.8080537E−06 | −2.7405872E−06 |
| 5 | −1.3815823E−05 | −1.2951481E−05 | −1.1302648E−06 | 4.5278555E−06 |
| 6 | −1.4295961E+00 | −1.8223785E+00 | −5.8353024E+00 | 5.4592087E+00 |
| 8 | 6.3509051E+02 | 1.8840079E+02 | −2.4737292E+03 | 1.4721354E+03 |
| 9 | −1.0121087E−02 | −1.0997146E−02 | −6.0838610E−03 | 1.0543097E−02 |

TABLE 3

EXAMPLE 3

(A)

| Si | Ri | Di | Ndj | vdj |
|---|---|---|---|---|
| 1 | 18.1421 | 1.1927 | 1.75500 | 52.3 |
| 2 | 4.4026 | 2.3000 | | |
| *3 | 7.5848 | 1.0500 | 1.53391 | 55.9 |
| *4 | 1.0393 | 0.7663 | | |
| *5 | 2.0231 | 2.2000 | 1.63360 | 23.6 |
| *6 | 200.0000 | 0.2512 | | |
| 7(St) | ∞ | 0.3103 | | |
| *8 | −200.0000 | 1.7500 | 1.53391 | 55.9 |
| *9 | −1.1469 | 1.8000 | | |
| 10 | ∞ | 0.7000 | 1.51680 | 64.2 |
| 11 | ∞ | 0.2194 | | |
| IMAGE PLANE | ∞ | | | |

(B)

| | |
|---|---|
| Fno | |
| BF(in Air) | 2.48 |
| L(in Air) | 12.30 |
| f | 1.12 |
| f1 | −8.00 |
| f2 | −2.39 |
| f3 | 3.21 |
| f4 | 2.15 |
| f34 | 3.00 |
| f123 | −7.51 |

(C)

| SURFACE NUMBER | KA | RB3 | RB4 | RB5 | RB6 |
|---|---|---|---|---|---|
| 3 | 0.0000000E+00 | 1.1307530E−02 | −7.8815462E−03 | −3.3672376E−04 | 8.1402090E−05 |
| 4 | 0.0000000E+00 | 7.2714007E−02 | −3.3688748E−02 | 1.2221147E−02 | 9.7097323E−03 |
| 5 | 0.0000000E+00 | −2.0682766E−02 | 6.7916715E−02 | −1.5507492E−02 | −1.6014178E−04 |
| 6 | 0.0000000E+00 | 4.1045646E−02 | −5.5745298E−02 | 5.5673320E−02 | 1.0550154E−01 |
| 8 | 1.4563150E−08 | −3.9239312E−02 | −6.6959670E−02 | −2.6654289E−01 | 1.1805884E+00 |
| 9 | 0.0000000E+00 | −8.0357995E−02 | 9.6965011E−02 | −7.2050933E−02 | −1.2240472E−02 |

| | RB7 | RB8 | RB9 | RB10 | RB11 |
|---|---|---|---|---|---|
| 3 | 3.1860047E−05 | 6.6562144E−06 | 5.2691285E−07 | −1.6428090E−07 | −9.4550765E−08 |
| 4 | 8.8837286E−04 | −1.2141359E−03 | −9.2555660E−04 | −4.8816907E−04 | −1.9010107E−04 |
| 5 | 3.7099546E−03 | 1.5270147E−03 | −3.7639686E−06 | −2.8795144E−04 | −1.6080100E−04 |
| 6 | 3.2189611E−03 | −8.3570394E−02 | −5.6986103E−02 | −5.8655217E−02 | −2.0917184E−02 |
| 8 | −9.3642060E−01 | −1.1775345E+00 | −1.4117211E−01 | 2.7508992E+00 | 2.6574860E+00 |
| 9 | 2.1315094E−02 | 9.4383036E−03 | −2.4138722E−03 | −5.1096583E−03 | −3.4280865E−03 |

| | RB12 | RB13 | RB14 | RB15 | RB16 |
|---|---|---|---|---|---|
| 3 | −3.2017908E−08 | −6.8602750E−09 | −7.2367949E−10 | 3.3474809E−10 | 2.8139829E−10 |
| 4 | −2.5891750E−05 | 5.4166093E−05 | −6.1350390E−06 | −2.6281426E−06 | −6.7187873E−07 |
| 5 | −3.2730193E−05 | 5.8086066E−05 | 9.5788285E−07 | −1.6429810E−06 | −2.4802545E−06 |
| 6 | 1.6062322E−02 | 1.3200323E−01 | 1.4549135E−01 | 3.1627017E−02 | −6.9400047E−02 |
| 8 | −2.4187030E+00 | −4.4845308E+00 | −2.1773579E+00 | 1.4877129E+00 | 3.7827381E+00 |
| 9 | −6.5442043E−04 | 3.5812212E−04 | 5.5149146E−04 | 4.2539773E−04 | 2.0124978E−04 |

| | RB17 | RB18 | RB19 | RB20 |
|---|---|---|---|---|
| 3 | 1.3700548E−10 | 4.2744794E−11 | 2.5138639E−12 | −7.5357307E−12 |
| 4 | 5.9129031E−08 | 2.6842531E−07 | 2.6392422E−07 | 2.1576211E−07 |
| 5 | −1.9447676E−06 | −1.2247259E−06 | −2.7154630E−07 | 4.2258858E−07 |
| 6 | 1.6921584E−01 | −2.1987059E−01 | −9.6024239E−01 | 8.8070586E−01 |
| 8 | 8.2390345E+00 | 2.4455762E−01 | −1.9020265E+01 | 1.0361449E+01 |
| 9 | 3.7908012E−05 | −2.5975570E−05 | −4.5639461E−05 | 1.1767671E−05 |

TABLE 4

EXAMPLE 4

(A)

| Si | Ri | Di | Ndj | vdj |
|---|---|---|---|---|
| 1 | 17.1000 | 1.4008 | 1.75500 | 52.3 |
| 2 | 4.5647 | 2.3838 | | |
| *3 | 6.6675 | 1.0500 | 1.53391 | 55.9 |
| *4 | 1.0044 | 0.9165 | | |
| *5 | 2.0634 | 2.2001 | 1.63360 | 23.6 |
| *6 | 84.3321 | 0.2470 | | |
| 7(St) | ∞ | 0.3180 | | |
| *8 | −53.9833 | 1.7185 | 1.53391 | 55.9 |
| *9 | −1.1917 | 0.1324 | | |
| 10 | ∞ | 0.7000 | 1.51680 | 64.2 |
| 11 | ∞ | 2.0025 | | |
| IMAGE PLANE | ∞ | | | |

(B)

| | |
|---|---|
| Fno | |
| BF(in Air) | 2.60 |
| L(in Air) | 12.83 |
| f | 1.16 |
| f1 | −8.66 |
| f2 | −2.37 |
| f3 | 3.30 |
| f4 | 2.26 |
| f34 | 2.99 |
| f123 | −8.30 |

(C)

| SURFACE NUMBER | KA | RB3 | RB4 | RB5 | RB6 |
|---|---|---|---|---|---|
| 3 | 0.0000000E+00 | 8.3544334E−03 | −8.0399905E−03 | −3.5020607E−04 | 8.1193344E−05 |
| 4 | 0.0000000E+00 | 6.3399166E−02 | −3.5075800E−02 | 1.3113222E−02 | 1.0315832E−02 |
| 5 | 0.0000000E+00 | −2.8151573E−02 | 6.7460203E−02 | −1.6055460E−02 | −1.5235655E−04 |
| 6 | 0.0000000E+00 | 2.6851062E−02 | −5.7769496E−02 | 7.4741896E−02 | 1.2817894E−01 |
| 8 | 2.3295782E−06 | −3.5604502E−02 | −6.9980713E−02 | −2.7259211E−01 | 1.1739710E+00 |
| 9 | 0.0000000E+00 | −7.0420978E−02 | 9.0961072E−02 | −7.6313938E−02 | −1.3456173E−02 |

| | RB7 | RB8 | RB9 | RB10 | RB11 |
|---|---|---|---|---|---|
| 3 | 3.2344606E−05 | 6.8771950E−06 | 6.0019733E−07 | −1.4322529E−07 | −8.9092136E−08 |
| 4 | 1.1727031E−03 | −1.0961944E−03 | −8.8259714E−04 | −4.7729000E−04 | −1.9213179E−04 |
| 5 | 3.7908081E−03 | 1.5626078E−03 | −5.3213384E−06 | −3.0216376E−04 | −1.7250228E−04 |
| 6 | 5.0708516E−03 | −1.2620216E−01 | −5.6986103E−02 | −5.8655217E−02 | −2.0917184E−02 |
| 8 | −9.4088045E−01 | −1.1762855E+00 | −1.2958015E−01 | 2.7508992E+00 | 2.6574860E+00 |
| 9 | 2.1593858E−02 | 1.0028951E−02 | −2.0630332E−03 | −5.1599284E−03 | −3.8565062E−03 |

| | RB12 | RB13 | RB14 | RB15 | RB16 |
|---|---|---|---|---|---|
| 3 | −3.0753119E−08 | −6.6083126E−09 | −6.8752684E−10 | 3.3445042E−10 | 2.7847959E−10 |
| 4 | −3.2342815E−05 | 4.6962341E−05 | −6.1350390E−06 | −2.6281426E−06 | −6.7187873E−07 |
| 5 | −3.6502972E−05 | 6.2100923E−05 | 9.5788285E−07 | −1.6429810E−06 | −2.4802545E−06 |
| 6 | 1.6062322E−02 | 1.3200323E−01 | 1.4549135E−01 | 3.1627017E−02 | −6.9400047E−02 |
| 8 | −2.4187030E+00 | −4.4845308E+00 | −2.1773579E+00 | 1.4877129E+00 | 3.7827381E+00 |
| 9 | −6.5442043E−04 | 3.5812212E−04 | 5.5149146E−04 | 4.2539773E−04 | 2.0124978E−04 |

| | RB17 | RB18 | RB19 | RB20 |
|---|---|---|---|---|
| 3 | 1.3546948E−10 | 4.2162782E−11 | 2.3311699E−12 | −7.5846738E−12 |
| 4 | 5.9129031E−08 | 2.6842531E−07 | 2.6392422E−07 | 2.1576211E−07 |
| 5 | −1.9447676E−06 | −1.2247259E−06 | −2.7154630E−07 | 4.2258858E−07 |
| 6 | 1.6921584E−01 | −2.1987059E−01 | −9.6024239E−01 | 8.8070586E−01 |
| 8 | 8.2390345E+00 | 2.4455762E−01 | −1.9020265E+01 | 1.0361449E+01 |
| 9 | 3.7908012E−05 | −2.5975570E−05 | −4.5639461E−05 | 1.1767671E−05 |

TABLE 5

EXAMPLE 5

(A)

| Si | Ri | Di | Ndj | vdj |
|---|---|---|---|---|
| 1 | 17.0207 | 1.4234 | 1.75500 | 52.3 |
| 2 | 4.5909 | 2.3833 | | |
| *3 | 6.2473 | 1.0500 | 1.53391 | 55.9 |
| *4 | 0.9751 | 0.9405 | | |
| *5 | 2.0638 | 2.2114 | 1.63360 | 23.6 |
| *6 | 74.0465 | 0.2382 | | |
| 7(St) | ∞ | 0.3497 | | |
| *8 | −57.6314 | 1.6222 | 1.53391 | 55.9 |
| *9 | −1.1976 | 0.1324 | | |
| 10 | ∞ | 0.7000 | 1.51680 | 64.2 |
| 11 | ∞ | 2.0267 | | |
| IMAGE PLANE | ∞ | | | |

(B)

| | |
|---|---|
| Fno | |
| BF(in Air) | 2.62 |
| L(in Air) | 12.84 |
| f | 1.16 |
| f1 | −8.76 |
| f2 | −2.33 |
| f3 | 3.31 |
| f4 | 2.27 |
| f34 | 2.95 |
| f123 | −7.94 |

(C)

| SURFACE NUMBER | KA | RB3 | RB4 | RB5 | RB6 |
|---|---|---|---|---|---|
| 3 | 0.0000000E+00 | 7.6624890E−03 | −8.0966037E−03 | −3.5823215E−04 | 7.9657722E−05 |
| 4 | 0.0000000E+00 | 6.0524431E−02 | −3.5629737E−02 | 1.2930807E−02 | 1.0242090E−02 |
| 5 | 0.0000000E+00 | −3.1263508E−02 | 6.7112598E−02 | −1.5990540E−02 | −1.1189915E−04 |
| 6 | 0.0000000E+00 | 2.6061875E−02 | −5.7974699E−02 | 7.5230168E−02 | 1.2911313E−01 |
| 8 | 2.3692269E−06 | −3.4846052E−02 | −7.0057188E−02 | −2.7371926E−01 | 1.1716935E+00 |
| 9 | 0.0000000E+00 | −7.1390276E−02 | 8.9616114E−02 | −7.7301441E−02 | −1.4068471E−02 |

| | RB7 | RB8 | RB9 | RB10 | RB11 |
|---|---|---|---|---|---|
| 3 | 3.1995629E−05 | 6.7910569E−06 | 5.7843900E−07 | −1.4862589E−07 | −9.0362838E−08 |
| 4 | 1.1420452E−03 | −1.1085655E−03 | −8.8731349E−04 | −4.7894484E−04 | −1.9264718E−04 |
| 5 | 3.8027565E−03 | 1.5624927E−03 | −8.4499718E−06 | −3.0480438E−04 | −1.7380119E−04 |
| 6 | 6.2069221E−03 | −1.2489403E−01 | −5.6986103E−02 | −5.8655217E−02 | −2.0917184E−02 |
| 8 | −9.4435994E−01 | −1.1810022E+00 | −1.3557646E−01 | 2.7508992E+00 | 2.6574860E+00 |
| 9 | 2.1243300E−02 | 9.8405226E−03 | −2.1562917E−03 | −5.1993522E−03 | −3.8667526E−03 |

| | RB12 | RB13 | RB14 | RB15 | RB16 |
|---|---|---|---|---|---|
| 3 | −3.1021938E−08 | −6.6529205E−09 | −6.8956263E−10 | 3.3733840E−10 | 2.8039932E−10 |
| 4 | −3.2480383E−05 | 4.6924958E−05 | −6.1350390E−06 | −2.6281426E−06 | −6.7187873E−07 |
| 5 | −3.6610331E−05 | 6.2780840E−05 | 9.5788285E−07 | −1.6429810E−06 | −2.4802545E−06 |
| 6 | 1.6062322E−02 | 1.3200323E−01 | 1.4549135E−01 | 3.1627017E−02 | −6.9400047E−02 |
| 8 | −2.4187030E+00 | −4.4845308E+00 | −2.1773579E+00 | 1.4877129E+00 | 3.7827381E+00 |
| 9 | −6.5442043E−04 | 3.5812212E−04 | 5.5149146E−04 | 4.2539773E−04 | 2.0124978E−04 |

| | RB17 | RB18 | RB19 | RB20 |
|---|---|---|---|---|
| 3 | 1.3635669E−10 | 4.2519963E−11 | 2.4642917E−12 | −7.5372645E−12 |
| 4 | 5.9129031E−08 | 2.6842531E−07 | 2.6392422E−07 | 2.1576211E−07 |
| 5 | −1.9447676E−06 | −1.2247259E−06 | −2.7154630E−07 | 4.2258858E−07 |
| 6 | 1.6921584E−01 | −2.1987059E−01 | −9.6024239E−01 | 8.8070586E−01 |
| 8 | 8.2390345E+00 | 2.4455762E−01 | −1.9020265E+01 | 1.0361449E+01 |
| 9 | 3.7908012E−05 | −2.5975570E−05 | −4.5639461E−05 | 1.1767671E−05 |

TABLE 6

EXAMPLE 6

(A)

| Si | Ri | Di | Ndj | νdj |
|---|---|---|---|---|
| 1 | 17.1712 | 1.3478 | 1.77250 | 49.6 |
| 2 | 4.4496 | 2.3491 | | |
| *3 | 7.7874 | 1.0500 | 1.53391 | 55.9 |
| *4 | 1.0278 | 0.9869 | | |
| *5 | 1.9024 | 2.2000 | 1.63360 | 23.6 |
| *6 | 46.9415 | 0.2202 | | |
| 7(St) | ∞ | 0.2885 | | |
| *8 | −8.0335 | 1.7094 | 1.53391 | 55.9 |
| *9 | −1.1313 | 2.0000 | | |
| 10 | ∞ | 0.7000 | 1.51680 | 64.2 |
| 11 | ∞ | 0.1639 | | |
| IMAGE PLANE | ∞ | | | |

(B)

| | |
|---|---|
| Fno | |
| BF(in Air) | 2.63 |
| L(in Air) | 12.78 |
| f | 1.14 |
| f1 | −8.15 |
| f2 | −2.34 |
| f3 | 3.07 |
| f4 | 2.27 |
| f34 | 3.08 |
| f123 | −13.87 |

(C)

| SURFACE NUMBER | KA | RB3 | RB4 | RB5 | RB6 |
|---|---|---|---|---|---|
| 3 | 0.0000000E+00 | 1.0448619E−02 | −7.8895626E−03 | −3.2866157E−04 | 8.4195883E−05 |
| 4 | 0.0000000E+00 | 7.0219039E−02 | −3.3363630E−02 | 1.2459589E−02 | 9.7990019E−03 |
| 5 | 0.0000000E+00 | −2.3872659E−02 | 6.9265022E−02 | −1.5028790E−02 | 5.3224312E−05 |
| 6 | 0.0000000E+00 | 4.2048630E−02 | −5.7213540E−02 | 5.5207564E−02 | 1.0379687E−01 |
| 8 | 3.7979476E−04 | −4.0834052E−02 | −6.9155646E−02 | −2.6875841E−01 | 1.1789547E+00 |
| 9 | 0.0000000E+00 | −7.3763205E−02 | 8.8324526E−02 | −7.7661012E−02 | −1.5064374E−02 |

| | RB7 | RB8 | RB9 | RB10 | RB11 |
|---|---|---|---|---|---|
| 3 | 3.2608232E−05 | 6.8356484E−06 | 5.6571319E−07 | −1.5715379E−07 | −9.3708278E−08 |
| 4 | 9.2076090E−04 | −1.2006455E−03 | −9.1882059E−04 | −4.8448136E−04 | −1.8818643E−04 |
| 5 | 3.7978461E−03 | 1.5509817E−03 | −9.0452787E−06 | −3.0359193E−04 | −1.7749292E−04 |
| 6 | −3.9130995E−03 | −1.0045903E−01 | −5.6986103E−02 | −5.8655217E−02 | −2.0917184E−02 |
| 8 | −9.3692768E−01 | −1.1763706E+00 | −1.3775330E−01 | 2.7508992E+00 | 2.6574860E+00 |
| 9 | 2.0010657E−02 | 8.8733484E−03 | −2.6386131E−03 | −5.1867270E−03 | −3.4470194E−03 |

| | RB12 | RB13 | RB14 | RB15 | RB16 |
|---|---|---|---|---|---|
| 3 | −3.2112934E−08 | −6.9801753E−09 | −7.8235600E−10 | 3.1185167E−10 | 2.7343674E−10 |
| 4 | −2.5094221E−05 | 5.4280058E−05 | −6.1350390E−06 | −2.6281426E−06 | −6.7187873E−07 |
| 5 | −4.6649010E−05 | 4.7933513E−05 | 9.5788285E−07 | −1.6429810E−06 | −2.4802545E−06 |
| 6 | 1.6062322E−02 | 1.3200323E−01 | 1.4549135E−01 | 3.1627017E−02 | −6.9400047E−02 |
| 8 | −2.4187030E+00 | −4.4845308E+00 | −2.1773579E+00 | 1.4877129E+00 | 3.7827381E+00 |
| 9 | −6.5442043E−04 | 3.5812212E−04 | 5.5149146E−04 | 4.2539773E−04 | 2.0124978E−04 |

| | RB17 | RB18 | RB19 | RB20 |
|---|---|---|---|---|
| 3 | 1.3443614E−10 | 4.1959314E−11 | 2.2926774E−12 | −7.5970200E−12 |
| 4 | 5.9129031E−08 | 2.6842531E−07 | 2.6392422E−07 | 2.1576211E−07 |
| 5 | −1.9447676E−06 | −1.2247259E−06 | −2.7154630E−07 | 4.2258858E−07 |
| 6 | 1.6921584E−01 | −2.1987059E−01 | −9.6024239E−01 | 8.8070586E−01 |
| 8 | 8.2390345E+00 | 2.4455762E−01 | −1.9020265E+01 | 1.0361449E+01 |
| 9 | 3.7908012E−05 | −2.5975570E−05 | −4.5639461E−05 | 1.1767671E−05 |

TABLE 7

EXAMPLE 7

(A)

| Si | Ri | Di | Ndj | νdj |
|---|---|---|---|---|
| 1 | 17.9831 | 1.1926 | 1.77250 | 49.6 |
| 2 | 4.4944 | 2.3289 | | |
| *3 | 7.2278 | 1.0500 | 1.53391 | 55.9 |
| *4 | 1.0716 | 0.7723 | | |
| *5 | 1.8947 | 2.2000 | 1.63360 | 23.6 |
| *6 | 8.4015 | 0.2200 | | |
| 7(St) | ∞ | 0.2532 | | |
| *8 | −90.3360 | 1.7500 | 1.53391 | 55.9 |
| *9 | −1.0817 | 2.0000 | | |
| 10 | ∞ | 0.7000 | 1.51680 | 64.2 |
| 11 | ∞ | 0.0733 | | |
| IMAGE PLANE | ∞ | | | |

(B)

| | |
|---|---|
| Fno | |
| BF(in Air) | 2.53 |
| L(in Air) | 12.30 |
| f | 1.13 |
| f1 | −8.07 |
| f2 | −2.51 |
| f3 | 3.41 |
| f4 | 2.04 |
| f34 | 3.03 |
| f123 | −4.75 |

(C)

| SURFACE NUMBER | KA | RB3 | RB4 | RB5 | RB6 |
|---|---|---|---|---|---|
| 3 | 0.0000000E+00 | 1.1345549E−02 | −7.8039979E−03 | −3.1666170E−04 | 8.6236004E−05 |
| 4 | 0.0000000E+00 | 7.4094380E−02 | −3.3863280E−02 | 1.2070403E−02 | 9.6302409E−03 |
| 5 | 0.0000000E+00 | −2.5341977E−02 | 7.0380656E−02 | −1.4447139E−02 | 2.7149284E−04 |
| 6 | 0.0000000E+00 | 3.5357028E−02 | −5.7787976E−02 | 5.8327060E−02 | 1.1040461E−01 |
| 8 | −4.8212381E−07 | −3.8302697E−02 | −6.6021312E−02 | −2.6595992E−01 | 1.1809180E+00 |
| 9 | 0.0000000E+00 | −7.6378791E−02 | 9.2751328E−02 | −7.5176012E−02 | −1.4099978E−02 |

| | RB7 | RB8 | RB9 | RB10 | RB11 |
|---|---|---|---|---|---|
| 3 | 3.3007640E−05 | 6.9237341E−06 | 5.8717569E−07 | −1.5152054E−07 | −9.2162159E−08 |
| 4 | 8.5489376E−04 | −1.2247661E−03 | −9.2670707E−04 | −4.8630763E−04 | −1.8793426E−04 |
| 5 | 3.8800737E−03 | 1.5829506E−03 | 3.6451951E−06 | −2.9871505E−04 | −1.7598368E−04 |
| 6 | 6.3491151E−03 | −8.6658889E−02 | −5.6986103E−02 | −5.8655217E−02 | −2.0917184E−02 |
| 8 | −9.3604876E−01 | −1.1767001E+00 | −1.3936407E−01 | 2.7508992E+00 | 2.6574860E+00 |
| 9 | 2.0218301E−02 | 8.7616606E−03 | −2.8579153E−03 | −5.4196055E−03 | −3.6562284E−03 |

| | RB12 | RB13 | RB14 | RB15 | RB16 |
|---|---|---|---|---|---|
| 3 | −3.1682181E−08 | −6.8600442E−09 | −7.4955210E−10 | 3.2051951E−10 | 2.7560036E−10 |
| 4 | −2.4281037E−05 | 5.5112092E−05 | −6.1350390E−06 | −2.6281426E−06 | −6.7187873E−07 |
| 5 | −4.6659469E−05 | 4.7241540E−05 | 9.5788285E−07 | −1.6429810E−06 | −2.4802545E−06 |
| 6 | 1.6062322E−02 | 1.3200323E−01 | 1.4549135E−01 | 3.1627017E−02 | −6.9400047E−02 |
| 8 | −2.4187030E+00 | −4.4845308E+00 | −2.1773579E+00 | 1.4877129E+00 | 3.7827381E+00 |
| 9 | −6.5442043E−04 | 3.5812212E−04 | 5.5149146E−04 | 4.2539773E−04 | 2.0124978E−04 |

| | RB17 | RB18 | RB19 | RB20 |
|---|---|---|---|---|
| 3 | 1.3493591E−10 | 4.2059718E−11 | 2.3050539E−12 | −7.5987389E−12 |
| 4 | 5.9129031E−08 | 2.6842531E−07 | 2.6392422E−07 | 2.1576211E−07 |
| 5 | −1.9447676E−06 | −1.2247259E−06 | −2.7154630E−07 | 4.2258858E−07 |
| 6 | 1.6921584E−01 | −2.1987059E−01 | −9.6024239E−01 | 8.8070586E−01 |
| 8 | 8.2390345E+00 | 2.4455762E−01 | −1.9020265E+01 | 1.0361449E+01 |
| 9 | 3.7908012E−05 | −2.5975570E−05 | −4.5639461E−05 | 1.1767671E−05 |

TABLE 8

EXAMPLE 8

(A)

| Si | Ri | Di | Ndj | vdj |
|---|---|---|---|---|
| 1 | 17.3970 | 1.3029 | 1.77250 | 49.6 |
| 2 | 4.4731 | 2.3410 | | |
| *3 | 7.9473 | 1.0500 | 1.53391 | 55.9 |
| *4 | 1.0911 | 0.6925 | | |
| *5 | 1.8627 | 2.2296 | 1.61400 | 25.5 |
| *6 | 15.2270 | 0.2200 | | |
| 7(St) | ∞ | 0.2665 | | |
| *8 | −83.4063 | 1.7500 | 1.53391 | 55.9 |
| *9 | −1.0853 | 1.9000 | | |
| 10 | ∞ | 0.5000 | 1.51680 | 64.2 |
| 11 | ∞ | 0.2163 | | |
| IMAGE PLANE | ∞ | | | |

(B)

| | |
|---|---|
| Fno | |
| BF(in Air) | 2.45 |
| L(in Air) | 12.30 |
| f | 1.14 |
| f1 | −8.15 |
| f2 | −2.50 |
| f3 | 3.25 |
| f4 | 2.04 |
| f34 | 3.05 |
| f123 | −6.01 |

(C)

| SURFACE NUMBER | KA | RB3 | RB4 | RB5 | RB6 |
|---|---|---|---|---|---|
| 3 | 0.0000000E+00 | 1.1113285E−02 | −7.8243289E−03 | −3.1953969E−04 | 8.5750030E−05 |
| 4 | 0.0000000E+00 | 7.3767833E−02 | −3.4003523E−02 | 1.2020392E−02 | 9.6117660E−03 |
| 5 | 0.0000000E+00 | −2.5895496E−02 | 7.0436259E−02 | −1.4410001E−02 | 2.9088794E−04 |
| 6 | 0.0000000E+00 | 3.2682146E−02 | −5.9939646E−02 | 5.7156137E−02 | 1.1000451E−01 |
| 8 | −4.4891094E−07 | −3.8784081E−02 | −6.6193770E−02 | −2.6609879E−01 | 1.1806929E+00 |
| 9 | 0.0000000E+00 | −7.5015455E−02 | 9.3342461E−02 | −7.4764506E−02 | −1.3819542E−02 |

| | RB7 | RB8 | RB9 | RB10 | RB11 |
|---|---|---|---|---|---|
| 3 | 3.2922672E−05 | 6.9102816E−06 | 5.8585316E−07 | −1.5125741E−07 | −9.1916502E−08 |
| 4 | 8.4892814E−04 | −1.2256570E−03 | −9.2571911E−04 | −4.8483050E−04 | −1.8653430E−04 |
| 5 | 3.8894779E−03 | 1.5867149E−03 | 4.4417977E−06 | −2.9927081E−04 | −1.7697892E−04 |
| 6 | 6.1152205E−03 | −8.7500416E−02 | −5.6986103E−02 | −5.8655217E−02 | −2.0917184E−02 |
| 8 | −9.3640408E−01 | −1.1771837E+00 | −1.3994775E−01 | 2.7508992E+00 | 2.6574860E+00 |
| 9 | 2.0394970E−02 | 8.8642109E−03 | −2.8042210E−03 | −5.3962377E−03 | −3.6506444E−03 |

| | RB12 | RB13 | RB14 | RB15 | RB16 |
|---|---|---|---|---|---|
| 3 | −3.1565515E−08 | −6.8139626E−09 | −7.3284602E−10 | 3.2628197E−10 | 2.7752611E−10 |
| 4 | −2.3147216E−05 | 5.5956590E−05 | −6.1350390E−06 | −2.6281426E−06 | −6.7187873E−07 |
| 5 | −4.7630041E−05 | 4.6490053E−05 | 9.5788285E−07 | −1.6429810E−06 | −2.4802545E−06 |
| 6 | 1.6062322E−02 | 1.3200323E−01 | 1.4549135E−01 | 3.1627017E−02 | −6.9400047E−02 |
| 8 | −2.4187030E+00 | −4.4845308E+00 | −2.1773579E+00 | 1.4877129E+00 | 3.7827381E+00 |
| 9 | −6.5442043E−04 | 3.5812212E−04 | 5.5149146E−04 | 4.2539773E−04 | 2.0124978E−04 |

| | RB17 | RB18 | RB19 | RB20 |
|---|---|---|---|---|
| 3 | 1.3556617E−10 | 4.2263601E−11 | 2.3703329E−12 | −7.5778872E−12 |
| 4 | 5.9129031E−08 | 2.6842531E−07 | 2.6392422E−07 | 2.1576211E−07 |
| 5 | −1.9447676E−06 | −1.2247259E−06 | −2.7154630E−07 | 4.2258858E−07 |
| 6 | 1.6921584E−01 | −2.1987059E−01 | −9.6024239E−01 | 8.8070586E−01 |
| 8 | 8.2390345E+00 | 2.4455762E−01 | −1.9020265E+01 | 1.0361449E+01 |
| 9 | 3.7908012E−05 | −2.5975570E−05 | −4.5639461E−05 | 1.1767671E−05 |

TABLE 9

EXAMPLE 9

(A)

| Si | Ri | Di | Ndj | vdj |
|---|---|---|---|---|
| 1 | 17.6977 | 1.2375 | 1.77250 | 49.6 |
| 2 | 4.4105 | 2.3377 | | |
| *3 | 7.8107 | 1.0500 | 1.53391 | 55.9 |
| *4 | 1.0744 | 0.7315 | | |
| *5 | 2.0136 | 2.2000 | 1.63360 | 23.6 |
| *6 | 1000.0000 | 0.2498 | | |
| 7(St) | ∞ | 0.3126 | | |
| *8 | −1000.0000 | 1.7500 | 1.53391 | 55.9 |
| *9 | −1.1476 | 1.9000 | | |
| 10 | ∞ | 0.5000 | 1.51680 | 64.2 |
| 11 | ∞ | 0.2137 | | |
| IMAGE PLANE | ∞ | | | |

(B)

| | |
|---|---|
| Fno | |
| BF(in Air) | 2.44 |
| L(in Air) | 12.31 |
| f | 1.13 |
| f1 | −7.93 |
| f2 | −2.47 |
| f3 | 3.18 |
| f4 | 2.15 |
| f34 | 3.00 |
| f123 | −8.37 |

(C)

| SURFACE NUMBER | KA | RB3 | RB4 | RB5 | RB6 |
|---|---|---|---|---|---|
| 3 | 0.0000000E+00 | 1.1215948E−02 | −7.8897304E−03 | −3.3726230E−04 | 8.1496130E−05 |
| 4 | 0.0000000E+00 | 7.2449396E−02 | −3.3556515E−02 | 1.2289246E−02 | 9.7391659E−03 |
| 5 | 0.0000000E+00 | −2.0715717E−02 | 6.7431580E−02 | −1.5621719E−02 | −1.8295631E−04 |
| 6 | 0.0000000E+00 | 4.0134432E−02 | −5.6088305E−02 | 5.5790953E−02 | 1.0614025E−01 |
| 8 | 2.4039596E−07 | −3.9050493E−02 | −6.6740428E−02 | −2.6633343E−01 | 1.1807395E+00 |
| 9 | 0.0000000E+00 | −7.9825829E−02 | 9.7080267E−02 | −7.2115875E−02 | −1.2340626E−02 |

| | RB7 | RB8 | RB9 | RB10 | RB11 |
|---|---|---|---|---|---|
| 3 | 3.1926431E−05 | 6.6816575E−06 | 5.3517944E−07 | −1.6180643E−07 | −9.3858610E−08 |
| 4 | 9.0118725E−04 | −1.2082643E−03 | −9.2263074E−04 | −4.8656563E−04 | −1.8916628E−04 |
| 5 | 3.7092791E−03 | 1.5305959E−03 | −5.0390655E−07 | −2.8587627E−04 | −1.5972298E−04 |
| 6 | 4.5715794E−03 | −8.1181329E−02 | −5.6986103E−02 | −5.8655217E−02 | −2.0917184E−02 |
| 8 | −9.3637940E−01 | −1.1776550E+00 | −1.4150371E−01 | 2.7508992E+00 | 2.6574860E+00 |
| 9 | 2.1230548E−02 | 9.3798402E−03 | −2.4491771E−03 | −5.1277067E−03 | −3.4343279E−03 |

| | RB12 | RB13 | RB14 | RB15 | RB16 |
|---|---|---|---|---|---|
| 3 | −3.1828833E−08 | −6.8104321E−09 | −7.1106953E−10 | 3.3779766E−10 | 2.8209935E−10 |
| 4 | −2.5316573E−05 | 5.4528693E−05 | −6.1350390E−06 | −2.6281426E−06 | −6.7187873E−07 |
| 5 | −3.2302529E−05 | 5.8152273E−05 | 9.5788285E−07 | −1.6429810E−06 | −2.4802545E−06 |
| 6 | 1.6062322E−02 | 1.3200323E−01 | 1.4549135E−01 | 3.1627017E−02 | −6.9400047E−02 |
| 8 | −2.4187030E+00 | −4.4845308E+00 | −2.1773579E+00 | 1.4877129E+00 | 3.7827381E+00 |
| 9 | −6.5442043E−04 | 3.5812212E−04 | 5.5149146E−04 | 4.2539773E−04 | 2.0124978E−04 |

| | RB17 | RB18 | RB19 | RB20 |
|---|---|---|---|---|
| 3 | 1.3715916E−10 | 4.2775488E−11 | 2.5225613E−12 | −7.5352150E−12 |
| 4 | 5.9129031E−08 | 2.6842531E−07 | 2.6392422E−07 | 2.1576211E−07 |
| 5 | −1.9447676E−06 | −1.2247259E−06 | −2.7154630E−07 | 4.2258858E−07 |
| 6 | 1.6921584E−01 | −2.1987059E−01 | −9.6024239E−01 | 8.8070586E−01 |
| 8 | 8.2390345E+00 | 2.4455762E−01 | −1.9020265E+01 | 1.0361449E+01 |
| 9 | 3.7908012E−05 | −2.5975570E−05 | −4.5639461E−05 | 1.1767671E−05 |

TABLE 10

EXAMPLE 10

(A)

| Si | Ri | Di | Ndj | vdj |
|---|---|---|---|---|
| 1 | 17.1761 | 1.3764 | 1.77250 | 49.6 |
| 2 | 4.3770 | 2.2372 | | |
| *3 | 7.5697 | 1.0500 | 1.53391 | 55.9 |
| *4 | 1.0232 | 0.8481 | | |
| *5 | 2.0185 | 2.2000 | 1.65181 | 21.0 |
| *6 | 1000.0000 | 0.2200 | | |
| 7(St) | ∞ | 0.3094 | | |
| *8 | −1000.0000 | 1.7047 | 1.53391 | 55.9 |
| *9 | −1.1342 | 1.8000 | | |
| 10 | ∞ | 0.7000 | 1.51680 | 64.2 |
| 11 | ∞ | 0.0964 | | |
| IMAGE PLANE | ∞ | | | |

(B)

| | |
|---|---|
| Fno | |
| BF(in Air) | 2.36 |
| L(in Air) | 12.30 |
| f | 1.09 |
| f1 | −7.98 |
| f2 | −2.35 |
| f3 | 3.10 |
| f4 | 2.13 |
| f34 | 2.93 |
| f123 | −10.03 |

(C)

| SURFACE NUMBER | KA | RB3 | RB4 | RB5 | RB6 |
|---|---|---|---|---|---|
| 3 | 0.0000000E+00 | 1.1049770E−02 | −7.8779149E−03 | −3.3126003E−04 | 8.3024304E−05 |
| 4 | 0.0000000E+00 | 7.4032550E−02 | −3.2325454E−02 | 1.2710980E−02 | 9.8608357E−03 |
| 5 | 0.0000000E+00 | −2.4921375E−02 | 6.5979357E−02 | −1.5877328E−02 | −2.5286593E−04 |
| 6 | 0.0000000E+00 | 4.0337978E−02 | −5.4011336E−02 | 5.9186158E−02 | 1.0727260E−01 |
| 8 | 0.0000000E+00 | −3.8366826E−02 | −6.8175441E−02 | −2.6868762E−01 | 1.1783688E+00 |
| 9 | 0.0000000E+00 | −7.6410674E−02 | 9.3410259E−02 | −7.5123881E−02 | −1.4023581E−02 |

| | RB7 | RB8 | RB9 | RB10 | RB11 |
|---|---|---|---|---|---|
| 3 | 3.2219390E−05 | 6.7152372E−06 | 5.3021057E−07 | −1.6707300E−07 | −9.6242708E−08 |
| 4 | 9.2729186E−04 | −1.2097047E−03 | −9.3037853E−04 | −4.9435722E−04 | −1.9540421E−04 |
| 5 | 3.6709338E−03 | 1.5011329E−03 | −2.2996127E−05 | −3.0145792E−04 | −1.6943331E−04 |
| 6 | −1.8515481E−03 | −1.0137488E−01 | −5.6986103E−02 | −5.8655217E−02 | −2.0917184E−02 |
| 8 | −9.3797061E−01 | −1.1776636E+00 | −1.3899522E−01 | 2.7508992E+00 | 2.6574860E+00 |
| 9 | 2.0502490E−02 | 9.2210629E−03 | −2.3027895E−03 | −4.8370712E−03 | −3.0917945E−03 |

| | RB12 | RB13 | RB14 | RB15 | RB16 |
|---|---|---|---|---|---|
| 3 | −3.2695109E−08 | −7.0827766E−09 | −7.8723549E−10 | 3.1926222E−10 | 2.7850832E−10 |
| 4 | −2.9930404E−05 | 5.1252985E−05 | −6.1350390E−06 | −2.6281426E−06 | −6.7187873E−07 |
| 5 | −3.7640183E−05 | 5.5710989E−05 | 9.5788285E−07 | −1.6429810E−06 | −2.4802545E−06 |
| 6 | 1.6062322E−02 | 1.3200323E−01 | 1.4549135E−01 | 3.1627017E−02 | −6.9400047E−02 |
| 8 | −2.4187030E+00 | −4.4845308E+00 | −2.1773579E+00 | 1.4877129E+00 | 3.7827381E+00 |
| 9 | −6.5442043E−04 | 3.5812212E−04 | 5.5149146E−04 | 4.2539773E−04 | 2.0124978E−04 |

| | RB17 | RB18 | RB19 | RB20 | |
|---|---|---|---|---|---|
| 3 | 1.3678554E−10 | 4.2913953E−11 | 2.6549557E−12 | −7.4665950E−12 | |
| 4 | 5.9129031E−08 | 2.6842531E−07 | 2.6392422E−07 | 2.1576211E−07 | |
| 5 | −1.9447676E−06 | −1.2247259E−06 | −2.7154630E−07 | 4.2258858E−07 | |
| 6 | 1.6921584E−01 | −2.1987059E−01 | −9.6024239E−01 | 8.8070586E−01 | |
| 8 | 8.2390345E+00 | 2.4455762E−01 | −1.9020265E+01 | 1.0361449E+01 | |
| 9 | 3.7908012E−05 | −2.5975570E−05 | −4.5639461E−05 | 1.1767671E−05 | |

TABLE 11

| EXAMPLE 11 |||||
|---|---|---|---|---|
| (A) |||||
| Si | Ri | Di | Ndj | vdj |
| 1 | 20.2419 | 1.2953 | 1.75500 | 52.3 |
| 2 | 4.8693 | 2.5288 | | |
| *3 | −2.2874 | 1.2339 | 1.53391 | 55.9 |
| *4 | 3.0271 | 0.5617 | | |
| *5 | 1.9214 | 2.6586 | 1.61400 | 25.5 |
| *6 | 31.1429 | 0.2709 | | |
| 7(St) | ∞ | 0.2039 | | |
| *8 | −13.9715 | 1.7941 | 1.53391 | 55.9 |
| *9 | −0.8486 | 1.0000 | | |
| 10 | ∞ | 0.7000 | 1.51680 | 64.2 |
| 11 | ∞ | 0.3489 | | |
| IMAGE PLANE | ∞ | | | |

| (B) ||
|---|---|
| Fno | |
| BF(in Air) | 1.81 |
| L(in Air) | 12.36 |
| f | 0.78 |
| f1 | −8.81 |
| f2 | −2.26 |
| f3 | 3.22 |
| f4 | 1.62 |
| f34 | 3.52 |
| f123 | −10.25 |

| (C) |||||
|---|---|---|---|---|
| SURFACE NUMBER | KA | RB3 | RB4 | RB5 | RB6 |
|---|---|---|---|---|---|
| 3 | 0.0000000E+00 | 1.0474497E−01 | −1.4657983E−02 | −8.4980904E−04 | 7.0485758E−05 |
| 4 | 0.0000000E+00 | 4.7842289E−02 | 5.0209503E−02 | −5.8586654E−02 | 2.3557870E−02 |
| 5 | 0.0000000E+00 | −2.2373026E−02 | −1.7844274E−02 | 7.0680021E−02 | −2.6669403E−04 |
| 6 | 0.0000000E+00 | −3.7391337E−02 | 2.9805846E−01 | −2.9461926E−01 | −9.0772212E−02 |
| 8 | 0.0000000E+00 | −2.2564226E−02 | −1.4991051E−01 | −8.1255220E−01 | 4.2728636E+00 |
| 9 | 0.0000000E+00 | −1.4925384E−02 | −2.1478049E−02 | 2.1025630E−02 | −1.7195856E−02 |

| | RB7 | RB8 | RB9 | RB10 | RB11 |
|---|---|---|---|---|---|
| 3 | 5.4942425E−05 | 1.5506499E−05 | 1.5893000E−07 | −9.6531254E−07 | −3.5227145E−07 |
| 4 | 1.6469006E−02 | 4.2010448E−03 | −5.0661012E−04 | −1.2019755E−03 | −8.1635090E−04 |
| 5 | −4.1225455E−03 | −1.8637222E−03 | −1.4294376E−03 | −4.6140216E−04 | 4.5240037E−04 |
| 6 | 1.3333043E−01 | 1.8870493E−01 | 6.6477194E−02 | −9.8920393E−02 | −2.8257195E−01 |
| 8 | −4.5626316E+00 | −7.7042167E+00 | −9.6440636E−01 | 2.9555461E+01 | 3.6311936E+01 |
| 9 | 3.6400462E−02 | 6.1849830E−03 | −2.9161490E−02 | −3.2202831E−02 | −1.6293755E−02 |

| | RB12 | RB13 | RB14 | RB15 | RB16 |
|---|---|---|---|---|---|
| 3 | −9.1224288E−08 | 5.6914569E−10 | 7.3936079E−09 | 2.5882554E−09 | 1.0718894E−09 |
| 4 | −4.0044437E−04 | −1.3546651E−04 | −1.4467209E−05 | 1.2346338E−05 | 2.5186043E−05 |
| 5 | 2.3533782E−04 | 8.5709416E−05 | 2.4018292E−05 | 4.4547274E−07 | −6.7227785E−06 |
| 6 | −3.8386701E−01 | −2.4522595E−01 | 2.6785167E−01 | 2.8210112E−01 | 1.4930839E+00 |
| 8 | −4.6115065E+01 | −1.0702836E+02 | −6.1688713E+01 | 7.3673526E+01 | 2.1230773E+02 |
| 9 | 6.0266786E−03 | 1.9288900E−02 | 1.8001657E−02 | 9.3475750E−03 | −2.2017765E−03 |

| | RB17 | RB18 | RB19 | RB20 |
|---|---|---|---|---|
| 3 | −7.1579336E−11 | −9.5425266E−11 | −2.4644629E−11 | 7.2371108E−12 |
| 4 | 1.6919337E−05 | 6.5203783E−06 | −1.4766498E−06 | −2.1043219E−06 |
| 5 | −9.5983803E−06 | −1.1753493E−05 | −1.5851663E−06 | 3.2138278E−06 |
| 6 | −3.2790922E−01 | 9.4353094E−01 | −3.0947848E+00 | 1.0720399E+00 |
| 8 | 5.5696893E+02 | 3.6577428E+01 | −2.6002979E+03 | 2.0001108E+03 |
| 9 | −1.0601260E−02 | −1.1277162E−02 | −6.0264507E−03 | 1.1027058E−02 |

TABLE 12

EXAMPLE 12

(A)

| Si | Ri | Di | Ndj | vdj |
|---|---|---|---|---|
| 1 | 18.1441 | 1.2500 | 1.75500 | 52.3 |
| 2 | 5.1291 | 2.6558 | | |
| *3 | −2.0860 | 1.1665 | 1.53391 | 55.9 |
| *4 | 2.0476 | 0.5611 | | |
| *5 | 1.6043 | 2.5527 | 1.63360 | 23.6 |
| *6 | 31.4099 | 0.2897 | | |
| 7(St) | ∞ | 0.2039 | | |
| *8 | −14.5885 | 1.7468 | 1.53391 | 55.9 |
| *9 | −0.8756 | 1.0000 | | |
| 10 | ∞ | 0.7000 | 1.51680 | 64.2 |
| 11 | ∞ | 0.3712 | | |
| IMAGE PLANE | ∞ | | | |

(B)

| | |
|---|---|
| Fno | |
| BF(in Air) | 1.83 |
| L(in Air) | 12.26 |
| f | 0.81 |
| f1 | −9.88 |
| f2 | −1.76 |
| f3 | 2.58 |
| f4 | 1.67 |
| f34 | 4.29 |
| f123 | −14.64 |

(C)

| SURFACE NUMBER | KA | RB3 | RB4 | RB5 | RB6 |
|---|---|---|---|---|---|
| 3 | 0.0000000E+00 | 1.0572994E−01 | −1.4511614E−02 | −8.2275486E−04 | 7.4822961E−05 |
| 4 | 0.0000000E+00 | 1.4746897E−02 | 6.1707903E−02 | −5.5613020E−02 | 2.3650277E−02 |
| 5 | 0.0000000E+00 | 2.8618006E−03 | −4.1290899E−02 | 6.8938755E−02 | 5.9760074E−04 |
| 6 | 0.0000000E+00 | −4.4508168E−02 | 2.9566950E−01 | −2.8515491E−01 | −7.4221962E−02 |
| 8 | 0.0000000E+00 | −3.4147945E−02 | −1.5052747E−01 | −8.0961634E−01 | 4.2801406E+00 |
| 9 | 0.0000000E+00 | 1.8753326E−02 | −4.0177622E−02 | 1.0994458E−02 | −1.9886408E−02 |

| | RB7 | RB8 | RB9 | RB10 | RB11 |
|---|---|---|---|---|---|
| 3 | 5.5450015E−05 | 1.5512504E−05 | 1.3820089E−07 | −9.7377135E−07 | −3.5463414E−07 |
| 4 | 1.6138478E−02 | 3.9570260E−03 | −6.3677421E−04 | −1.2622915E−03 | −8.4163596E−04 |
| 5 | −3.4264438E−03 | −1.5076591E−03 | −1.2826369E−03 | −4.1414825E−04 | 4.6178060E−04 |
| 6 | 1.4897478E−01 | 1.9538288E−01 | 6.1023606E−02 | −1.1435025E−01 | −3.0190663E−01 |
| 8 | −4.5455910E+00 | −7.3738606E+00 | −9.3612011E−01 | 2.9529630E+01 | 3.6131899E+01 |
| 9 | 3.6483657E−02 | 7.0061266E−03 | −2.8268371E−02 | −3.1403816E−02 | −1.5612323E−02 |

| | RB12 | RB13 | RB14 | RB15 | RB16 |
|---|---|---|---|---|---|
| 3 | −9.1751302E−08 | 4.7787754E−10 | 7.3833996E−09 | 2.5888323E−09 | 1.0725811E−09 |
| 4 | −4.0984068E−04 | −1.3854081E−04 | −1.5190011E−05 | 1.2374085E−05 | 2.5380425E−05 |
| 5 | 2.3122477E−04 | 7.8202345E−05 | 1.8038899E−05 | −3.4388779E−06 | −8.8918236E−06 |
| 6 | −3.9962356E−01 | −2.5158341E−01 | 2.7264327E−01 | 2.9335206E−01 | 1.5002750E+00 |
| 8 | −4.6592381E+01 | −1.0793290E+02 | −6.2966743E+01 | 7.2629892E+01 | 2.1324787E+02 |
| 9 | 6.5931647E−03 | 1.9740956E−02 | 1.8336090E−02 | 9.5611467E−03 | −2.1092848E−03 |

| | RB17 | RB18 | RB19 | RB20 |
|---|---|---|---|---|
| 3 | −7.1090664E−11 | −9.5337422E−11 | −2.4643085E−11 | 7.2288237E−12 |
| 4 | 1.7099305E−05 | 6.6488224E−06 | −1.3937471E−06 | −2.0530833E−06 |
| 5 | −1.0600309E−05 | −1.2048219E−05 | −1.4939586E−06 | 3.4885641E−06 |
| 6 | −3.3700777E−01 | 9.1608180E−01 | −3.1046149E+00 | 1.2060746E+00 |
| 8 | 5.6316318E+02 | 5.0871344E+01 | −2.5818436E+03 | 1.9324258E+03 |
| 9 | −1.0625880E−02 | −1.1410705E−02 | −6.2574343E−03 | 1.0712433E−02 |

TABLE 13

EXAMPLE 13

(A)

| Si | Ri | Di | Ndj | νdj |
|---|---|---|---|---|
| 1 | 17.0021 | 1.2500 | 1.77250 | 49.6 |
| 2 | 4.4761 | 2.7914 | | |
| *3 | −2.1000 | 1.1501 | 1.53391 | 55.9 |
| *4 | 2.7174 | 0.5490 | | |
| *5 | 1.6402 | 2.4485 | 1.63360 | 23.6 |
| *6 | 29.2099 | 0.3225 | | |
| 7(St) | ∞ | 0.2039 | | |
| *8 | −30.2143 | 1.7942 | 1.53391 | 55.9 |
| *9 | −0.9274 | 1.0000 | | |
| 10 | ∞ | 0.5450 | 1.51680 | 64.2 |
| 11 | ∞ | 0.4625 | | |
| IMAGE PLANE | ∞ | | | |

(B)

| | |
|---|---|
| Fno | |
| BF(in Air) | 1.82 |
| L(in Air) | 12.33 |
| f | 0.86 |
| f1 | −8.22 |
| f2 | −2.05 |
| f3 | 2.65 |
| f4 | 1.75 |
| f34 | 4.00 |
| f123 | −48.74 |

(C)

| SURFACE NUMBER | KA | RB3 | RB4 | RB5 | RB6 |
|---|---|---|---|---|---|
| 3 | 0.0000000E+00 | 1.0609687E−01 | −1.4410552E−02 | −8.2832053E−04 | 7.0213835E−05 |
| 4 | 0.0000000E+00 | 1.0158327E−01 | 4.1240748E−02 | −5.8904203E−02 | 2.2537482E−02 |
| 5 | 0.0000000E+00 | 4.2162078E−02 | −4.6860753E−02 | 6.2807764E−02 | −6.3129083E−04 |
| 6 | 0.0000000E+00 | −3.8218925E−02 | 2.8537551E−01 | −2.8537203E−01 | −6.2805221E−02 |
| 8 | 0.0000000E+00 | −5.7712815E−02 | −1.0765391E−01 | −7.4874280E−01 | 4.3118496E+00 |
| 9 | 0.0000000E+00 | −7.5748002E−03 | −1.4158027E−02 | 9.1661541E−03 | −2.1569840E−02 |

| | RB7 | RB8 | RB9 | RB10 | RB11 |
|---|---|---|---|---|---|
| 3 | 5.3995669E−05 | 1.5155698E−05 | 6.6987875E−08 | −9.8312884E−07 | −3.5385093E−07 |
| 4 | 1.5569863E−02 | 3.6761736E−03 | −7.5881504E−04 | −1.3065950E−03 | −8.5294701E−04 |
| 5 | −3.3383056E−03 | −1.2507644E−03 | −1.1011160E−03 | −3.1822305E−04 | 5.0304668E−04 |
| 6 | 1.6397446E−01 | 2.0566930E−01 | 6.3625673E−02 | −1.1684107E−01 | −3.0448598E−01 |
| 8 | −4.5777361E+00 | −7.4881332E+00 | −1.1345463E+00 | 2.9267811E+01 | 3.5866851E+01 |
| 9 | 3.6163245E−02 | 7.3264262E−03 | −2.8145923E−02 | −3.0895673E−02 | −1.5153357E−02 |

| | RB12 | RB13 | RB14 | RB15 | RB16 |
|---|---|---|---|---|---|
| 3 | −9.0652028E−08 | 9.9153588E−10 | 7.5516120E−09 | 2.6342395E−09 | 1.0824083E−09 |
| 4 | −4.0869610E−04 | −1.3445777E−04 | −1.1284516E−05 | 1.5006498E−05 | 2.6972696E−05 |
| 5 | 2.4368567E−04 | 7.8153418E−05 | 1.3949125E−05 | −7.8394063E−06 | −1.2168055E−05 |
| 6 | −3.9783731E−01 | −2.4702817E−01 | 2.7171890E−01 | 2.7274883E−01 | 1.4407377E+00 |
| 8 | −4.6726185E+01 | −1.0766280E+02 | −6.1778481E+01 | 7.5616722E+01 | 2.1927111E+02 |
| 9 | 7.0157554E−03 | 1.9832757E−02 | 1.8655709E−02 | 9.6324716E−03 | −1.9218368E−03 |

| | RB17 | RB18 | RB19 | RB20 |
|---|---|---|---|---|
| 3 | −6.9830011E−11 | −9.5540478E−11 | −2.4888725E−11 | 7.0997614E−12 |
| 4 | 1.7846476E−05 | 6.9251316E−06 | −1.3933410E−06 | −2.1769423E−06 |
| 5 | −1.2552747E−05 | −1.2849256E−05 | −1.4681535E−06 | 4.0383916E−06 |
| 6 | −4.3857964E−01 | 7.9595952E−01 | −3.1269760E+00 | 1.5520007E+00 |
| 8 | 5.7297633E+02 | 6.1766356E+01 | −2.5875138E+03 | 1.8733968E+03 |
| 9 | −1.0509032E−02 | −1.1376745E−02 | −6.2928483E−03 | 1.0611408E−02 |

TABLE 14

EXAMPLE 14

(A)

| Si | Ri | Di | Ndj | νdj |
|---|---|---|---|---|
| 1 | 17.0948 | 1.2500 | 1.77250 | 49.6 |
| 2 | 4.2306 | 2.8494 | | |
| *3 | −2.0000 | 1.2000 | 1.53391 | 55.9 |
| *4 | 2.6500 | 0.5405 | | |
| *5 | 1.5062 | 2.4630 | 1.63360 | 23.6 |
| *6 | 31.8875 | 0.2163 | | |
| 7(St) | ∞ | 0.2039 | | |
| *8 | −9.4728 | 1.7669 | 1.53391 | 55.9 |
| *9 | −0.9138 | 1.2000 | | |
| 10 | ∞ | 0.7000 | 1.51680 | 64.2 |
| 11 | ∞ | 0.1633 | | |
| IMAGE PLANE | ∞ | | | |

(B)

| | |
|---|---|
| Fno | |
| BF(in Air) | 1.82 |
| L(in Air) | 12.31 |
| f | 0.86 |
| f1 | −7.60 |
| f2 | −1.96 |
| f3 | 2.42 |
| f4 | 1.77 |
| f34 | 4.10 |
| f123 | 26.40 |

(C)

| SURFACE NUMBER | KA | RB3 | RB4 | RB5 | RB6 |
|---|---|---|---|---|---|
| 3 | 0.0000000E+00 | 1.1334945E−01 | −1.4507862E−02 | −9.5514463E−04 | 3.7148790E−05 |
| 4 | 0.0000000E+00 | 1.1728516E−01 | 2.4672680E−02 | −5.4573448E−02 | 2.4021322E−02 |
| 5 | 0.0000000E+00 | 4.2717165E−02 | −4.5508020E−02 | 5.8331504E−02 | −1.4737229E−03 |
| 6 | 0.0000000E+00 | −1.7713407E−02 | 2.0814017E−01 | −2.4345834E−01 | 3.0091426E−02 |
| 8 | 0.0000000E+00 | −1.2476023E−02 | −1.8164355E−01 | −9.0190974E−01 | 4.2916337E+00 |
| 9 | 0.0000000E+00 | 9.9601822E−03 | −4.0304133E−02 | 2.0807324E−03 | −1.8216253E−02 |

| | RB7 | RB8 | RB9 | RB10 | RB11 |
|---|---|---|---|---|---|
| 3 | 4.8000623E−05 | 1.4635361E−05 | 2.3506368E−07 | −8.6889884E−07 | −3.1241921E−07 |
| 4 | 1.5507176E−02 | 3.3856392E−03 | −9.4243415E−04 | −1.3759257E−03 | −8.6041420E−04 |
| 5 | −2.8558086E−03 | −7.1137156E−04 | −7.8688470E−04 | −1.9583387E−04 | 5.2342104E−04 |
| 6 | 1.7870931E−01 | 7.8195817E−02 | −1.7099670E−01 | −3.4118778E−01 | −3.6976272E−01 |
| 8 | −4.3055865E+00 | −6.9143803E+00 | −4.9648705E−01 | 2.9393667E+01 | 3.4534008E+01 |
| 9 | 4.1551619E−02 | 1.0882724E−02 | −2.7166970E−02 | −3.1827094E−02 | −1.6988754E−02 |

| | RB12 | RB13 | RB14 | RB15 | RB16 |
|---|---|---|---|---|---|
| 3 | −7.9453523E−08 | 3.1870461E−09 | 7.7580020E−09 | 2.5617175E−09 | 1.0304234E−09 |
| 4 | −3.9633434E−04 | −1.1977045E−04 | −5.5763001E−07 | 2.1404784E−05 | 3.0059253E−05 |
| 5 | 2.2878692E−04 | 5.8968494E−05 | −5.2318370E−07 | −1.6126923E−05 | −1.6003118E−05 |
| 6 | −1.7895955E−01 | 3.2043808E−01 | 1.0011037E+00 | 1.1050060E+00 | 1.7575961E+00 |
| 8 | −5.0658686E+01 | −1.1486309E+02 | −7.0838829E+01 | 7.1182159E+01 | 2.3511043E+02 |
| 9 | 5.1177633E−03 | 1.8384912E−02 | 1.7833667E−02 | 9.4084004E−03 | −1.7346984E−03 |

| | RB17 | RB18 | RB19 | RB20 |
|---|---|---|---|---|
| 3 | −8.7641837E−11 | −1.0019449E−10 | −2.5402873E−11 | 7.4158627E−12 |
| 4 | 1.9002571E−05 | 6.9479840E−06 | −1.8080537E−06 | −2.7405872E−06 |
| 5 | −1.3815823E−05 | −1.2951481E−05 | −1.1302648E−06 | 4.5278555E−06 |
| 6 | −1.4295961E+00 | −1.8223785E+00 | −5.8353024E+00 | 5.4592087E+00 |
| 8 | 6.3509051E+02 | 1.8840079E+02 | −2.4737292E+03 | 1.4721354E+03 |
| 9 | −1.0121087E−02 | −1.0997146E−02 | −6.0838610E−03 | 1.0543097E−02 |

TABLE 15

EXAMPLE 15

(A)

| Si | Ri | Di | Ndj | νdj |
|---|---|---|---|---|
| 1 | 23.4084 | 1.2024 | 1.77250 | 49.6 |
| 2 | 5.3243 | 2.9178 | | |
| *3 | −18.5361 | 1.1539 | 1.53391 | 55.9 |
| *4 | 1.3778 | 1.1071 | | |
| *5 | 2.0453 | 2.8040 | 1.63360 | 23.6 |
| *6 | 58.9833 | 0.4418 | | |
| 7(St) | ∞ | 0.3772 | | |
| *8 | −98.2286 | 2.2000 | 1.53391 | 55.9 |
| *9 | −1.2869 | 1.9000 | | |
| 10 | ∞ | 0.7000 | 1.51680 | 64.2 |
| 11 | ∞ | 0.1934 | | |
| IMAGE PLANE | ∞ | | | |

(B)

| | |
|---|---|
| Fno | |
| BF(in Air) | 2.55 |
| L(in Air) | 14.76 |
| f | 1.10 |
| f1 | −9.19 |
| f2 | −2.35 |
| f3 | 3.28 |
| f4 | 2.42 |
| f34 | 4.68 |
| f123 | −23.73 |

(C)

| SURFACE NUMBER | KA | RB3 | RB4 | RB5 | RB6 |
|---|---|---|---|---|---|
| 3 | 0.0000000E+00 | 2.3425549E−02 | −4.4281646E−03 | −8.2172326E−05 | 2.0951333E−05 |
| 4 | 0.0000000E+00 | 4.8319110E−04 | −1.8289408E−02 | −1.4118633E−03 | 3.3993339E−03 |
| 5 | 0.0000000E+00 | −8.6693522E−03 | 4.5277213E−03 | 1.9527356E−03 | 2.2395569E−04 |
| 6 | 0.0000000E+00 | −4.4508305E−03 | 6.4281860E−02 | −3.2301907E−02 | −8.2800631E−03 |
| 8 | 0.0000000E+00 | 6.6367107E−03 | −6.8497863E−02 | −1.5968038E−01 | 6.3166793E−01 |
| 9 | 0.0000000E+00 | −1.3247387E−02 | 4.7718349E−02 | −3.6328702E−02 | −6.8354158E−03 |

| | RB7 | RB8 | RB9 | RB10 | RB11 |
|---|---|---|---|---|---|
| 3 | 5.1379900E−06 | 7.9246318E−07 | −2.2532200E−08 | −2.5677459E−08 | −4.5503000E−09 |
| 4 | 5.8242218E−04 | −1.1139233E−04 | −8.7996304E−05 | −3.2706625E−05 | −8.8494043E−06 |
| 5 | 7.4124374E−04 | 2.1466395E−04 | −4.7221848E−05 | −4.1568768E−05 | −6.8247620E−06 |
| 6 | 5.3050073E−03 | 6.5791678E−03 | 4.1315293E−03 | 1.1054146E−04 | −3.0372505E−03 |
| 8 | −4.5093971E−01 | −5.0340421E−01 | −5.7327883E−02 | 8.9445147E−01 | 7.6017135E−01 |
| 9 | 8.3874519E−03 | 3.4815373E−03 | −4.8879761E−04 | −1.1286173E−03 | −6.4840341E−04 |

| | RB12 | RB13 | RB14 | RB15 | RB16 |
|---|---|---|---|---|---|
| 3 | −4.7446602E−10 | 2.1277273E−10 | 7.3239364E−11 | 1.1273988E−11 | 2.4440594E−12 |
| 4 | −1.5992195E−06 | 6.0504852E−08 | 2.4395497E−07 | 9.9408998E−08 | 6.1780269E−08 |
| 5 | −1.1840871E−06 | 2.9746201E−07 | 3.3210096E−07 | 1.5654127E−07 | 3.7863011E−08 |
| 6 | −3.9181390E−03 | −1.9584370E−03 | 1.0206768E−03 | 2.2380325E−04 | 3.5149789E−03 |
| 8 | −6.1475611E−01 | −1.0030950E+00 | −4.2828673E−01 | 2.6197693E−01 | 5.8395067E−01 |
| 9 | −1.3042215E−04 | 8.8144868E−05 | 9.2566960E−05 | 4.8691446E−05 | 7.4223952E−06 |

| | RB17 | RB18 | RB19 | RB20 |
|---|---|---|---|---|
| 3 | −3.9211155E−13 | −1.9365935E−13 | −3.2021224E−14 | 5.7916673E−15 |
| 4 | 2.1808580E−08 | 3.4358748E−09 | −2.4727842E−09 | −8.0848071E−10 |
| 5 | −1.0654623E−08 | −1.9677564E−08 | −4.2897226E−09 | 2.5153665E−09 |
| 6 | −1.1444191E−03 | 1.1093374E−03 | −2.6156266E−03 | 1.0250121E−03 |
| 8 | 1.1137289E+00 | 1.8326166E−02 | −1.9545647E+00 | 9.2567600E−01 |
| 9 | −1.0705482E−05 | −1.0409643E−05 | −5.0612416E−06 | 4.6553527E−06 |

TABLE 16

EXAMPLE 16

(A)

| Si | Ri | Di | Ndj | vdj |
|---|---|---|---|---|
| 1 | 15.8713 | 1.1000 | 1.77250 | 49.6 |
| 2 | 4.4878 | 2.3427 | | |
| *3 | −2.5462 | 1.1000 | 1.53391 | 55.9 |
| *4 | 2.8948 | 1.0000 | | |
| *5 | 1.9081 | 2.2000 | 1.63360 | 23.6 |
| *6 | 48.9892 | 0.3860 | | |
| 7(St) | ∞ | 0.2500 | | |
| *8 | −1000.0000 | 1.6500 | 1.53391 | 55.9 |
| *9 | −1.2605 | 1.6000 | | |
| 10 | ∞ | 0.7000 | 1.51680 | 64.2 |
| 11 | ∞ | 0.2058 | | |
| IMAGE PLANE | ∞ | | | |

(B)

| | |
|---|---|
| Fno | |
| BF(in Air) | 2.27 |
| L(in Air) | 12.30 |
| f | 1.12 |
| f1 | −8.46 |
| f2 | −2.37 |
| f3 | 3.08 |
| f4 | 2.36 |
| f34 | 3.09 |
| f123 | 27.32 |

(C)

| SURFACE NUMBER | KA | RB3 | RB4 | RB5 | RB6 |
|---|---|---|---|---|---|
| 3 | 0.0000000E+00 | 1.1621641E−01 | −5.7246615E−03 | −3.7795161E−03 | −1.5748793E−04 |
| 4 | 0.0000000E+00 | 1.0986827E−01 | −4.1552984E−02 | 4.0767680E−02 | 5.8274361E−03 |
| 5 | 0.0000000E+00 | −2.2099153E−02 | 4.7502116E−02 | −2.8281932E−02 | 9.4885128E−03 |
| 6 | 0.0000000E+00 | 1.9002288E−02 | −1.9447579E−02 | 1.0758204E−01 | −3.6441305E−02 |
| 8 | 0.0000000E+00 | 2.4357025E−02 | −1.2472653E−01 | −9.4967006E−02 | 6.8056766E−01 |
| 9 | 0.0000000E+00 | −3.3138119E−02 | 6.2785154E−02 | −5.1975739E−02 | 7.5061252E−03 |

| | RB7 | RB8 | RB9 | RB10 | RB11 |
|---|---|---|---|---|---|
| 3 | 7.2656249E−05 | 1.8486726E−05 | 1.7293536E−06 | −2.3367913E−07 | −1.3797174E−07 |
| 4 | −3.8097682E−03 | −2.2553264E−03 | −6.4340563E−04 | −8.5322976E−05 | 2.5469741E−05 |
| 5 | 5.2291385E−03 | −1.1950458E−04 | −9.1618776E−04 | −4.0037992E−04 | −4.2988610E−05 |
| 6 | −4.6497860E−02 | −1.3450770E−02 | 1.4909764E−02 | 1.6422276E−02 | 2.9076639E−02 |
| 8 | −4.9936911E−01 | −5.8110836E−01 | −8.2700345E−02 | 9.3976882E−01 | 8.4027447E−01 |
| 9 | 1.3973162E−02 | −4.5839445E−04 | −5.0737143E−03 | −3.0357304E−03 | −3.9995081E−04 |

| | RB12 | RB13 | RB14 | RB15 | RB16 |
|---|---|---|---|---|---|
| 3 | −3.3578586E−08 | −4.2198893E−09 | 1.8137061E−10 | 2.8541095E−10 | 9.1994704E−11 |
| 4 | 2.4690356E−05 | 1.1651745E−05 | 4.0604614E−06 | 9.8426539E−07 | 1.1334695E−07 |
| 5 | 4.6667884E−05 | 3.8920410E−05 | 1.6804141E−05 | 3.4264113E−06 | −1.3340535E−06 |
| 6 | 1.6713007E−02 | 2.1974770E−02 | −1.4299674E−02 | −3.8253502E−02 | −3.9219198E−02 |
| 8 | −5.5103249E−01 | −9.8912295E−01 | −4.6609843E−01 | 1.9874463E−01 | 5.3679884E−01 |
| 9 | 9.1505882E−04 | 1.0183378E−03 | 5.7094638E−04 | 1.0292461E−04 | −1.8413842E−04 |

| | RB17 | RB18 | RB19 | RB20 |
|---|---|---|---|---|
| 3 | 1.9410706E−11 | 2.6402407E−12 | −5.4243284E−13 | −1.9160633E−13 |
| 4 | −6.3939175E−08 | −5.4057180E−08 | −2.2469643E−08 | −5.2528884E−10 |
| 5 | −1.9401019E−06 | −1.0653214E−06 | −2.2686585E−07 | 2.6257696E−07 |
| 6 | −8.5682361E−02 | 1.1948141E−01 | 4.6038338E−02 | −4.7849943E−02 |
| 8 | 1.1206852E+00 | 8.2400609E−02 | −1.9614995E+00 | 8.6190428E−01 |
| 9 | −2.6095352E−04 | −1.8367871E−04 | −3.2049720E−05 | 1.3818952E−04 |

TABLE 17

EXAMPLE 17

(A)

| Si | Ri | Di | Ndj | vdj |
|---|---|---|---|---|
| 1 | 15.8144 | 1.1000 | 1.77250 | 49.6 |
| 2 | 4.1786 | 2.3261 | | |
| *3 | −2.2139 | 1.1000 | 1.53391 | 55.9 |
| *4 | 5.0307 | 0.8004 | | |
| *5 | 1.9938 | 2.2000 | 1.63360 | 23.6 |
| *6 | 48.9861 | 0.3123 | | |
| 7(St) | ∞ | 0.2501 | | |
| *8 | −1000.0000 | 2.0784 | 1.53391 | 55.9 |
| *9 | −1.1871 | 1.5000 | | |
| 10 | ∞ | 0.7000 | 1.51680 | 64.2 |
| 11 | ∞ | 0.1989 | | |
| IMAGE PLANE | ∞ | | | |

(B)

| | |
|---|---|
| Fno | |
| BF(in Air) | 2.16 |
| L(in Air) | 12.33 |
| f | 1.11 |
| f1 | −7.67 |
| f2 | −2.73 |
| f3 | 3.22 |
| f4 | 2.22 |
| f34 | 3.33 |
| f123 | 37.56 |

(C)

| SURFACE NUMBER | KA | RB3 | RB4 | RB5 | RB6 |
|---|---|---|---|---|---|
| 3 | 0.0000000E+00 | 1.3157562E−01 | −7.1137604E−03 | −4.4269738E−03 | −1.8499774E−04 |
| 4 | 0.0000000E+00 | 1.6385546E−01 | −6.0655927E−02 | 4.4107013E−02 | 8.0055999E−03 |
| 5 | 0.0000000E+00 | 7.4832109E−03 | 3.7945833E−02 | −2.4860984E−02 | 1.0807874E−02 |
| 6 | 0.0000000E+00 | 1.2379425E−02 | 1.2400562E−02 | 7.9680746E−02 | −6.2767726E−02 |
| 8 | 0.0000000E+00 | 4.0647443E−03 | −5.7548622E−02 | −1.4909540E−01 | 6.3878829E−01 |
| 9 | 0.0000000E+00 | −6.0021410E−03 | 1.2534966E−02 | −2.6043499E−02 | 1.8572538E−02 |

| | RB7 | RB8 | RB9 | RB10 | RB11 |
|---|---|---|---|---|---|
| 3 | 9.3220423E−05 | 2.5282465E−05 | 2.7524580E−06 | −2.8619480E−07 | −2.3288067E−07 |
| 4 | −3.5895291E−03 | −2.5239625E−03 | −8.6515304E−04 | −1.9670732E−04 | −1.7080578E−05 |
| 5 | 5.0978965E−03 | −4.0461419E−04 | −1.0344999E−03 | −4.0631085E−04 | −1.4968557E−05 |
| 6 | −3.7742525E−02 | 1.4087623E−02 | 3.4734652E−02 | 1.8170995E−02 | 1.2311257E−02 |
| 8 | −4.7122322E−01 | −5.0526321E−01 | −1.2525478E−02 | 9.5637549E−01 | 7.7897250E−01 |
| 9 | 1.4340242E−02 | −2.5726000E−03 | −6.7105248E−03 | −3.8035659E−03 | −5.9786804E−04 |

| | RB12 | RB13 | RB14 | RB15 | RB16 |
|---|---|---|---|---|---|
| 3 | −7.0632615E−08 | −1.3579247E−08 | −1.2634967E−09 | 3.7567820E−10 | 2.6450636E−10 |
| 4 | 1.3379359E−05 | 1.1265649E−05 | 6.2044143E−06 | 2.9052396E−06 | 1.2815190E−06 |
| 5 | 6.7474952E−05 | 4.6664813E−05 | 1.6953149E−05 | 7.4824314E−07 | −4.0163604E−06 |
| 6 | −6.7969351E−03 | 8.6190109E−04 | −2.3047588E−02 | −3.1275970E−02 | −3.6780161E−02 |
| 8 | −6.8038757E−01 | −1.1462009E+00 | −5.8422925E−01 | 1.9682062E−01 | 7.1616835E−01 |
| 9 | 9.8647513E−04 | 1.1754252E−03 | 7.2426882E−04 | 2.1789945E−04 | −1.1374331E−04 |

| | RB17 | RB18 | RB19 | RB20 |
|---|---|---|---|---|
| 3 | 9.9219291E−11 | 2.4039341E−11 | 2.1630635E−12 | −2.4632300E−12 |
| 4 | 4.8489586E−07 | 1.2052298E−07 | −3.3871460E−08 | −8.3306306E−08 |
| 5 | −3.5594771E−06 | −1.8219250E−06 | −2.9917535E−07 | 6.0203386E−07 |
| 6 | −6.8232317E−02 | 1.3188703E−01 | 4.4080484E−02 | −5.4277970E−02 |
| 8 | 1.4899716E+00 | 5.2537094E−01 | −1.7962366E+00 | 2.8454789E−02 |
| 9 | −2.2978284E−04 | −1.8269433E−04 | −5.2305163E−05 | 1.0416377E−04 |

TABLE 18

EXAMPLE 18

(A)

| Si | Ri | Di | Ndj | vdj |
|---|---|---|---|---|
| 1 | 20.7352 | 1.1000 | 1.58913 | 61.1 |
| 2 | 4.3709 | 2.3565 | | |
| *3 | -2.4973 | 1.1000 | 1.53391 | 55.9 |
| *4 | 2.7142 | 1.0000 | | |
| *5 | 1.8732 | 2.2000 | 1.63360 | 23.6 |
| *6 | 48.9955 | 0.2752 | | |
| 7(St) | ∞ | 0.2500 | | |
| *8 | -1000.0000 | 1.6500 | 1.53391 | 55.9 |
| *9 | -1.2486 | 1.6000 | | |
| 10 | ∞ | 0.7000 | 1.51680 | 64.2 |
| 11 | ∞ | 0.1725 | | |
| IMAGE PLANE | ∞ | | | |

(B)

| | |
|---|---|
| Fno | |
| BF(in Air) | 2.23 |
| L(in Air) | 12.17 |
| f | 1.12 |
| f1 | -9.64 |
| f2 | -2.27 |
| f3 | 3.02 |
| f4 | 2.34 |
| f34 | 2.97 |
| f123 | 24.45 |

(C)

| SURFACE NUMBER | KA | RB3 | RB4 | RB5 | RB6 |
|---|---|---|---|---|---|
| 3 | 0.0000000E+00 | 1.1624026E-01 | -5.7098459E-03 | -3.7759493E-03 | -1.5660659E-04 |
| 4 | 0.0000000E+00 | 1.0925431E-01 | -4.1837427E-02 | 4.0657334E-02 | 5.7789973E-03 |
| 5 | 0.0000000E+00 | -2.3808088E-02 | 4.7056326E-02 | -2.8409635E-02 | 9.4520256E-03 |
| 6 | 0.0000000E+00 | 1.9024529E-02 | -1.9185900E-02 | 1.0804036E-01 | -3.5683896E-02 |
| 8 | 0.0000000E+00 | 2.7344523E-02 | -1.2122294E-01 | -9.1719536E-02 | 6.8348882E-01 |
| 9 | 0.0000000E+00 | -3.4576806E-02 | 6.6661037E-02 | -5.0168725E-02 | 8.2583515E-03 |

| | RB7 | RB8 | RB9 | RB10 | RB11 |
|---|---|---|---|---|---|
| 3 | 7.2872662E-05 | 1.8538116E-05 | 1.7409496E-06 | -2.3127073E-07 | -1.3754944E-07 |
| 4 | -3.8325599E-03 | -2.2662275E-03 | -6.4857392E-04 | -8.7722962E-05 | 2.4387791E-05 |
| 5 | 5.2223860E-03 | -1.1738627E-04 | -9.1243703E-04 | -3.9721197E-04 | -4.0815486E-05 |
| 6 | -4.5481057E-02 | -1.2330593E-02 | 1.5934434E-02 | 1.7161277E-02 | 2.9330620E-02 |
| 8 | -4.9678608E-01 | -5.7889427E-01 | -8.0909474E-02 | 9.4106286E-01 | 8.4098276E-01 |
| 9 | 1.4273132E-02 | -3.4483190E-04 | -5.0345982E-03 | -3.0247790E-03 | -3.9852160E-04 |

| | RB12 | RB13 | RB14 | RB15 | RB16 |
|---|---|---|---|---|---|
| 3 | -3.3537789E-08 | -4.2328776E-09 | 1.6985405E-10 | 2.7959985E-10 | 8.9509901E-11 |
| 4 | 2.4222591E-05 | 1.1461890E-05 | 3.9914476E-06 | 9.6475135E-07 | 1.1214974E-07 |
| 5 | 4.7999468E-05 | 3.9670541E-05 | 1.7193792E-05 | 3.6098610E-06 | -1.2604842E-06 |
| 6 | 1.6326255E-02 | 2.1019299E-02 | -1.6451733E-02 | -4.0157150E-02 | -4.3402702E-02 |
| 8 | -5.5100908E-01 | -9.8988442E-01 | -4.6772570E-01 | 1.9622906E-01 | 5.3350604E-01 |
| 9 | 9.1409074E-04 | 1.0174005E-03 | 5.7064350E-04 | 1.0322251E-04 | -1.8343995E-04 |

| | RB17 | RB18 | RB19 | RB20 |
|---|---|---|---|---|
| 3 | 1.8429866E-11 | 2.2715298E-12 | -6.7722495E-13 | -2.3977757E-13 |
| 4 | -5.9700974E-08 | -4.9231453E-08 | -1.8551926E-08 | 2.2666444E-09 |
| 5 | -1.9205772E-06 | -1.0693506E-06 | -2.3896909E-07 | 2.4940191E-07 |
| 6 | -8.5279838E-02 | 1.1823953E-01 | 4.4802956E-02 | -4.5276354E-02 |
| 8 | 1.1169976E+00 | 7.9219907E-02 | -1.9623144E+00 | 8.6703732E-01 |
| 9 | -2.6005184E-04 | -1.8272044E-04 | -3.1128047E-05 | 1.3902360E-04 |

TABLE 19

EXAMPLE 19

(A)

| Si | Ri | Di | Ndj | vdj |
|---|---|---|---|---|
| 1 | 15.9964 | 1.1000 | 1.75500 | 52.3 |
| 2 | 4.1824 | 2.3820 | | |
| *3 | −2.1922 | 1.1000 | 1.51103 | 55.2 |
| *4 | 3.8567 | 0.8166 | | |
| *5 | 2.0118 | 2.2000 | 1.65181 | 21.0 |
| *6 | 48.9973 | 0.3481 | | |
| 7(St) | ∞ | 0.3047 | | |
| *8 | −53.4556 | 1.7379 | 1.51103 | 55.2 |
| *9 | −1.1760 | 1.6000 | | |
| 10 | ∞ | 0.7000 | 1.51680 | 64.2 |
| 11 | ∞ | 0.2404 | | |
| IMAGE PLANE | ∞ | | | |

(B)

| | |
|---|---|
| Fno | 2.30 |
| BF(in Air) | 2.30 |
| L(in Air) | 12.29 |
| f | 1.13 |
| f1 | −7.81 |
| f2 | −2.58 |
| f3 | 3.16 |
| f4 | 2.33 |
| f34 | 3.19 |
| f123 | 52.28 |

(C)

| SURFACE NUMBER | KA | RB3 | RB4 | RB5 | RB6 |
|---|---|---|---|---|---|
| 3 | 0.0000000E+00 | 1.3200649E−01 | −7.7684789E−03 | −4.5431149E−03 | −1.8700668E−04 |
| 4 | 0.0000000E+00 | 1.4458550E−01 | −6.1781008E−02 | 4.6346809E−02 | 8.8178459E−03 |
| 5 | 0.0000000E+00 | −7.8861447E−03 | 3.6455087E−02 | −2.1611650E−02 | 1.1413769E−02 |
| 6 | 0.0000000E+00 | 6.7518447E−03 | 1.9445472E−02 | 7.9749016E−02 | −6.3272498E−02 |
| 8 | 0.0000000E+00 | 1.0800026E−02 | −7.3626716E−02 | −1.5813114E−01 | 6.3720563E−01 |
| 9 | 0.0000000E+00 | −1.7726623E−02 | 2.2798515E−02 | −2.3140000E−02 | 1.0052442E−02 |

| | RB7 | RB8 | RB9 | RB10 | RB11 |
|---|---|---|---|---|---|
| 3 | 9.7039344E−05 | 2.6560692E−05 | 3.0141807E−06 | −2.4891755E−07 | −2.2742810E−07 |
| 4 | −3.4788086E−03 | −2.5725646E−03 | −9.1624163E−04 | −2.2534630E−04 | −2.9124828E−05 |
| 5 | 4.8546241E−03 | −6.3356584E−04 | −1.1329891E−03 | −4.2940110E−04 | −1.3684224E−05 |
| 6 | −3.7276738E−02 | 1.4658158E−02 | 3.3864611E−02 | 1.5770693E−02 | 1.0213510E−02 |
| 8 | −4.7004769E−01 | −5.0575311E−01 | −1.5793459E−02 | 9.5393003E−01 | 7.8361058E−01 |
| 9 | 8.7363764E−03 | −3.7174274E−03 | −5.7482140E−03 | −2.5440755E−03 | 2.5526896E−04 |

| | RB12 | RB13 | RB14 | RB15 | RB16 |
|---|---|---|---|---|---|
| 3 | −7.0174934E−08 | −1.3718354E−08 | −1.3111419E−09 | 3.6982972E−10 | 2.6279813E−10 |
| 4 | 9.4429237E−06 | 1.0700687E−05 | 6.6339044E−06 | 3.4302271E−06 | 1.6411127E−06 |
| 5 | 7.2684783E−05 | 5.0136581E−05 | 1.8653907E−05 | 1.4848931E−06 | −3.6344581E−06 |
| 6 | −5.6360108E−03 | 2.8959490E−03 | −1.5481371E−02 | −3.5052416E−02 | −1.8250709E−02 |
| 8 | −6.6285281E−01 | −1.1151872E+00 | −5.5039362E−01 | 2.0770411E−01 | 6.6391105E−01 |
| 9 | 1.3494314E−03 | 1.1964409E−03 | 5.7734338E−04 | 3.1952067E−05 | −2.6767883E−04 |

| | RB17 | RB18 | RB19 | RB20 |
|---|---|---|---|---|
| 3 | 9.8683350E−11 | 2.3953992E−11 | 1.7040832E−12 | −2.3504996E−12 |
| 4 | 6.7084073E−07 | 1.8522951E−07 | −3.8927455E−08 | −1.1332777E−07 |
| 5 | −3.7225197E−06 | −1.7373640E−06 | −2.4630503E−07 | 5.8716877E−07 |
| 6 | −8.3120387E−02 | 1.2711142E−01 | 4.5178879E−02 | −5.4864533E−02 |
| 8 | 1.3371748E+00 | 2.8841538E−01 | −1.9324939E+00 | 5.8546458E−01 |
| 9 | −3.2293165E−04 | −2.1258691E−04 | −2.9037384E−05 | 1.6589873E−04 |

TABLE 20

EXAMPLE 20

(A)

| Si | Ri | Di | Ndj | νdj |
|---|---|---|---|---|
| 1 | 16.3449 | 1.1000 | 1.78800 | 47.4 |
| 2 | 4.1201 | 2.3923 | | |
| *3 | −2.2140 | 1.0500 | 1.53391 | 55.9 |
| *4 | 3.0102 | 0.7066 | | |
| *5 | 1.6486 | 2.4705 | 1.63360 | 23.6 |
| *6 | 19.0392 | 0.2441 | | |
| 7(St) | ∞ | 0.2502 | | |
| *8 | −23.9985 | 2.0314 | 1.53391 | 55.9 |
| *9 | −1.1967 | 1.7000 | | |
| 10 | ∞ | 0.7000 | 1.51680 | 64.2 |
| 11 | ∞ | 0.1543 | | |
| IMAGE PLANE | ∞ | | | |

(B)

| | |
|---|---|
| Fno | |
| BF(in Air) | 2.32 |
| L(in Air) | 12.56 |
| f | 1.14 |
| f1 | −7.28 |
| f2 | −2.23 |
| f3 | 2.70 |
| f4 | 2.29 |
| f34 | 3.93 |
| f123 | 65.90 |

(C)

| SURFACE NUMBER | KA | RB3 | RB4 | RB5 | RB6 |
|---|---|---|---|---|---|
| 3 | 0.0000000E+00 | 1.2777513E−01 | −7.7516734E−03 | −4.4752942E−03 | −1.3355360E−04 |
| 4 | 0.0000000E+00 | 1.3827057E−01 | −7.8119268E−02 | 4.6307687E−02 | 9.6075831E−03 |
| 5 | 0.0000000E+00 | −8.9433168E−03 | 3.4044080E−02 | −2.6217209E−02 | 1.2594595E−02 |
| 6 | 0.0000000E+00 | 8.0662728E−03 | 3.3169124E−02 | 6.3749325E−02 | −7.7439002E−02 |
| 8 | 0.0000000E+00 | 1.0172578E−02 | −7.4242266E−02 | −1.6398646E−01 | 6.3843282E−01 |
| 9 | 0.0000000E+00 | −1.7733304E−02 | 3.9705358E−02 | −5.0940249E−02 | 1.4177462E−02 |

| | RB7 | RB8 | RB9 | RB10 | RB11 |
|---|---|---|---|---|---|
| 3 | 1.1114998E−04 | 2.8253809E−05 | 2.7533351E−06 | −4.7707088E−07 | −3.1412302E−07 |
| 4 | −3.1834788E−03 | −2.4677464E−03 | −8.6348000E−04 | −1.9541969E−04 | −1.4340322E−05 |
| 5 | 6.0181026E−03 | −2.6546746E−04 | −1.1409043E−03 | −5.1450187E−04 | −7.3548150E−05 |
| 6 | −3.2300332E−02 | 3.4964336E−02 | 6.2379514E−02 | 3.2313260E−02 | 1.0475333E−02 |
| 8 | −4.5996130E−01 | −4.9544146E−01 | −1.4765801E−02 | 9.3999127E−01 | 7.5585737E−01 |
| 9 | 1.6528796E−02 | −7.8122068E−04 | −6.1639392E−03 | −3.9163772E−03 | −8.7126588E−04 |

| | RB12 | RB13 | RB14 | RB15 | RB16 |
|---|---|---|---|---|---|
| 3 | −9.2102468E−08 | −1.7179537E−08 | −1.2523303E−09 | 6.8521456E−10 | 4.1346852E−10 |
| 4 | 1.5426734E−05 | 1.2195560E−05 | 6.4346492E−06 | 2.8517149E−06 | 1.1751224E−06 |
| 5 | 4.7267644E−05 | 4.5098348E−05 | 2.1279882E−05 | 5.2207719E−06 | −1.0989692E−06 |
| 6 | −3.5762634E−02 | −5.7602489E−02 | −1.1300522E−01 | −8.0081449E−02 | −2.1296006E−01 |
| 8 | −6.9729616E−01 | −1.1433463E+00 | −5.5498420E−01 | 2.4343184E−01 | 7.5180429E−01 |
| 9 | 7.6937388E−04 | 1.0594747E−03 | 6.8607341E−04 | 2.2172661E−04 | −9.5376409E−05 |

| | RB17 | RB18 | RB19 | RB20 |
|---|---|---|---|---|
| 3 | 1.5058275E−10 | 3.3635932E−11 | 2.4744735E−12 | −4.5447283E−12 |
| 4 | 4.0699350E−07 | 8.5517867E−08 | −3.9856016E−08 | −7.7184512E−08 |
| 5 | −2.1253481E−06 | −1.3730238E−06 | −3.9275409E−07 | 3.4521710E−07 |
| 6 | 3.8167030E−01 | 2.9688494E−01 | −4.8201221E−02 | −2.3074180E−01 |
| 8 | 1.4677243E+00 | 4.1195060E−01 | −1.9296692E+00 | 2.7487212E−01 |
| 9 | −2.1260737E−04 | −1.7329979E−04 | −5.1752151E−05 | 9.7451003E−05 |

TABLE 21

EXAMPLE 21

(A)

| Si | Ri | Di | Ndj | vdj |
|---|---|---|---|---|
| 1 | 18.7262 | 1.2500 | 1.77250 | 49.6 |
| 2 | 4.5792 | 2.6384 | | |
| *3 | −2.0000 | 1.1710 | 1.53391 | 55.9 |
| *4 | 2.6500 | 0.5390 | | |
| *5 | 1.6800 | 2.4851 | 1.65181 | 21.0 |
| *6 | 39.3358 | 0.2162 | | |
| 7(St) | ∞ | 0.2039 | | |
| *8 | −8.8174 | 1.7414 | 1.53391 | 55.9 |
| *9 | −0.9730 | 1.0000 | | |
| 10 | ∞ | 0.5450 | 1.51680 | 64.2 |
| 11 | ∞ | 0.7200 | | |
| IMAGE PLANE | ∞ | | | |

(B)

| | |
|---|---|
| Fno | |
| BF(in Air) | 2.08 |
| L(in Air) | 12.32 |
| f | 0.92 |
| f1 | −8.16 |
| f2 | −1.96 |
| f3 | 2.62 |
| f4 | 1.90 |
| f34 | 3.59 |
| f123 | −37.19 |

(C)

| SURFACE NUMBER | KA | RB3 | RB4 | RB5 | RB6 |
|---|---|---|---|---|---|
| 3 | 0.0000000E+00 | 1.1505789E−01 | −1.4511250E−02 | −9.7452063E−04 | 3.0748389E−05 |
| 4 | 0.0000000E+00 | 8.4767719E−02 | 2.2090459E−02 | −5.2183715E−02 | 2.5112141E−02 |
| 5 | 0.0000000E+00 | 1.7141693E−02 | −4.2398354E−02 | 5.7699321E−02 | −1.5364979E−03 |
| 6 | 0.0000000E+00 | −2.0040339E−02 | 1.9516244E−01 | −2.6039368E−01 | 1.1993868E−02 |
| 8 | 0.0000000E+00 | −1.3205174E−02 | −1.5901156E−01 | −8.9946096E−01 | 4.2675448E+00 |
| 9 | 0.0000000E+00 | 2.8503971E−03 | −4.5749659E−02 | 3.7431865E−03 | −1.3917689E−02 |

| | RB7 | RB8 | RB9 | RB10 | RB11 |
|---|---|---|---|---|---|
| 3 | 4.6081578E−05 | 1.4105679E−05 | 1.0719970E−07 | −8.9448001E−07 | −3.1468219E−07 |
| 4 | 1.5819636E−02 | 3.4396162E−03 | −9.4712809E−04 | −1.3865917E−03 | −8.6785576E−04 |
| 5 | −2.7507788E−03 | −6.9125294E−04 | −8.3728172E−04 | −2.6920618E−04 | 4.4826388E−04 |
| 6 | 1.5762977E−01 | 7.1955178E−02 | −1.4658578E−01 | −2.8139278E−01 | −2.8556196E−01 |
| 8 | −4.3477198E+00 | −6.9433009E+00 | −4.6934431E−01 | 2.9579974E+01 | 3.4896880E+01 |
| 9 | 4.4637734E−02 | 1.1883763E−02 | −2.7874913E−02 | −3.3350745E−02 | −1.8523820E−02 |

| | RB12 | RB13 | RB14 | RB15 | RB16 |
|---|---|---|---|---|---|
| 3 | −7.8531627E−08 | 3.8972730E−09 | 8.0598589E−09 | 2.6623680E−09 | 1.0569440E−09 |
| 4 | −4.0085574E−04 | −1.2273161E−04 | −2.6170948E−06 | 1.9941785E−05 | 2.9096871E−05 |
| 5 | 1.7512845E−04 | 3.1125296E−05 | −1.4630616E−05 | −2.1805924E−05 | −1.7264162E−05 |
| 6 | −9.8724477E−02 | 3.5340907E−01 | 9.4184553E−01 | 9.0811093E−01 | 1.3993434E+00 |
| 8 | −5.0104688E+01 | −1.1433278E+02 | −7.0980959E+01 | 6.8957894E+01 | 2.2897593E+02 |
| 9 | 4.0759848E−03 | 1.8035561E−02 | 1.8140838E−02 | 1.0176298E−02 | −7.7865541E−04 |

| | RB17 | RB18 | RB19 | RB20 |
|---|---|---|---|---|
| 3 | −8.1427107E−11 | −1.0000295E−10 | −2.6007954E−11 | 6.9954425E−12 |
| 4 | 1.8418103E−05 | 6.6543843E−06 | −1.9192956E−06 | −2.7457388E−06 |
| 5 | −1.3312986E−05 | −1.2042790E−05 | −4.5335502E−07 | 4.7778598E−06 |
| 6 | −1.8814458E+00 | −2.2201577E+00 | −5.6756273E+00 | 7.2118691E+00 |
| 8 | 6.2224622E+02 | 1.6957750E+02 | −2.4811476E+03 | 1.5360345E+03 |
| 9 | −9.2731207E−03 | −1.0536430E−02 | −6.2486228E−03 | 9.5654637E−03 |

TABLE 22

EXAMPLE 22

(A)

| Si | Ri | Di | Ndj | vdj |
|---|---|---|---|---|
| 1 | 17.0995 | 1.2500 | 1.77250 | 49.6 |
| 2 | 4.1771 | 2.7961 | | |
| *3 | −1.9501 | 1.1513 | 1.53391 | 55.9 |
| *4 | 2.6500 | 0.5376 | | |
| *5 | 1.5034 | 2.3741 | 1.63360 | 23.6 |
| *6 | 14.7189 | 0.2204 | | |
| 7(St) | ∞ | 0.2039 | | |
| *8 | −9.5000 | 1.7312 | 1.53391 | 55.9 |
| *9 | −0.9537 | 1.2000 | | |
| 10 | ∞ | 0.7000 | 1.51680 | 64.2 |
| 11 | ∞ | 0.3453 | | |
| IMAGE PLANE | ∞ | | | |

(B)

| | |
|---|---|
| Fno | |
| BF(in Air) | 2.01 |
| L(in Air) | 12.27 |
| f | 0.90 |
| f1 | −7.47 |
| f2 | −1.94 |
| f3 | 2.47 |
| f4 | 1.85 |
| f34 | 3.77 |
| f123 | −48.61 |

(C)

| SURFACE NUMBER | KA | RB3 | RB4 | RB5 | RB6 |
|---|---|---|---|---|---|
| 3 | 0.0000000E+00 | 1.1763294E−01 | −1.4649613E−02 | −1.0142573E−03 | 2.2815450E−05 |
| 4 | 0.0000000E+00 | 8.7697195E−02 | 2.1605446E−02 | −5.0795706E−02 | 2.5253558E−02 |
| 5 | 0.0000000E+00 | 1.7277918E−02 | −3.4285689E−02 | 5.6053486E−02 | −1.6910907E−03 |
| 6 | 0.0000000E+00 | −2.0140004E−02 | 2.1593002E−01 | −2.2540522E−01 | 2.8644979E−02 |
| 8 | 0.0000000E+00 | −7.8637476E−03 | −1.6402903E−01 | −8.8690702E−01 | 4.2876137E+00 |
| 9 | 0.0000000E+00 | 5.8924992E−04 | −3.1525739E−02 | −1.2377806E−02 | −1.7926325E−02 |

| | RB7 | RB8 | RB9 | RB10 | RB11 |
|---|---|---|---|---|---|
| 3 | 4.4275237E−05 | 1.3675267E−05 | 1.8785587E−08 | −9.0528186E−07 | −3.1275375E−07 |
| 4 | 1.5533022E−02 | 3.1772980E−03 | −1.1021086E−03 | −1.4614586E−03 | −8.9878536E−04 |
| 5 | −2.3359968E−03 | −3.3673201E−04 | −6.3717181E−04 | −1.7307424E−04 | 4.9143460E−04 |
| 6 | 1.4729528E−01 | 4.3805665E−02 | −1.7703270E−01 | −3.0011137E−01 | −2.8394017E−01 |
| 8 | −4.3470074E+00 | −6.9749508E+00 | −5.2010918E−01 | 2.9550238E+01 | 3.4948506E+01 |
| 9 | 4.8345612E−02 | 1.6308376E−02 | −2.5558145E−02 | −3.3186245E−02 | −1.9578900E−02 |

| | RB12 | RB13 | RB14 | RB15 | RB16 |
|---|---|---|---|---|---|
| 3 | −7.6537364E−08 | 4.8005891E−09 | 8.3713816E−09 | 2.7502494E−09 | 1.0763121E−09 |
| 4 | −4.1132146E−04 | −1.2488889E−04 | −1.9762694E−06 | 2.1168740E−05 | 3.0159245E−05 |
| 5 | 1.9384389E−04 | 3.8604406E−05 | −1.2498711E−05 | −2.2203009E−05 | −1.8630062E−05 |
| 6 | −7.2610255E−02 | 3.9329276E−01 | 9.9964059E−01 | 9.4461729E−01 | 1.3910286E+00 |
| 8 | −4.9906845E+01 | −1.1395213E+02 | −7.0467525E+01 | 6.9366728E+01 | 2.2876582E+02 |
| 9 | 2.7265117E−03 | 1.6972712E−02 | 1.7588972E−02 | 1.0110658E−02 | −5.1767679E−04 |

| | RB17 | RB18 | RB19 | RB20 |
|---|---|---|---|---|
| 3 | −7.9126860E−11 | −1.0071252E−10 | −2.6710039E−11 | 6.6275647E−12 |
| 4 | 1.9152211E−05 | 7.0961174E−06 | −1.6853458E−06 | −2.6424498E−06 |
| 5 | −1.4742738E−05 | −1.3052760E−05 | −8.6621935E−07 | 4.9454311E−06 |
| 6 | −1.9645452E+00 | −2.3634996E+00 | −5.8106754E+00 | 7.2901217E+00 |
| 8 | 6.2060246E+02 | 1.6586757E+02 | −2.4852945E+03 | 1.5421757E+03 |
| 9 | −8.8864657E−03 | −1.0211333E−02 | −6.1289279E−03 | 9.3869821E−03 |

TABLE 23

EXAMPLE 23

(A)

| Si | Ri | Di | Ndj | νdj |
|---|---|---|---|---|
| 1 | 17.8278 | 1.2500 | 1.77250 | 49.6 |
| 2 | 4.2125 | 2.8336 | | |
| *3 | −1.9506 | 1.1176 | 1.53391 | 55.9 |
| *4 | 2.6472 | 0.5075 | | |
| *5 | 1.5542 | 2.3682 | 1.63360 | 23.6 |
| *6 | 199.9999 | 0.2587 | | |
| 7(St) | ∞ | 0.2009 | | |
| *8 | −9.0910 | 1.7427 | 1.53391 | 55.9 |
| *9 | −0.9756 | 1.2000 | | |
| 10 | ∞ | 0.7000 | 1.51680 | 64.2 |
| 11 | ∞ | 0.3376 | | |
| IMAGE PLANE | ∞ | | | |

(B)

| | |
|---|---|
| Fno | |
| BF(in Air) | 2.00 |
| L(in Air) | 12.28 |
| f | 0.90 |
| f1 | −7.44 |
| f2 | −1.94 |
| f3 | 2.46 |
| f4 | 1.90 |
| f34 | 3.70 |
| f123 | 52.61 |

(C)

| SURFACE NUMBER | KA | RB3 | RB4 | RB5 | RB6 |
|---|---|---|---|---|---|
| 3 | 0.0000000E+00 | 1.2122698E−01 | −1.5391808E−02 | −1.1310211E−03 | 1.6100552E−05 |
| 4 | 0.0000000E+00 | 1.0134434E−01 | 1.9564144E−02 | −4.7888274E−02 | 2.5867013E−02 |
| 5 | 0.0000000E+00 | 2.1293579E−02 | −3.4967486E−02 | 5.3862522E−02 | −1.6168842E−03 |
| 6 | 0.0000000E+00 | −1.8992257E−02 | 1.7366132E−01 | −2.3534057E−01 | 5.2112737E−02 |
| 8 | 0.0000000E+00 | −6.0851748E−03 | −1.3860315E−01 | −8.7651608E−01 | 4.2530856E+00 |
| 9 | 0.0000000E+00 | 9.1393117E−03 | −2.1857621E−02 | −2.3860851E−02 | −1.9307445E−02 |

| | RB7 | RB8 | RB9 | RB10 | RB11 |
|---|---|---|---|---|---|
| 3 | 4.7140535E−05 | 1.5202382E−05 | 5.1565113E−07 | −7.7737084E−07 | −2.8713827E−07 |
| 4 | 1.5280372E−02 | 2.8867398E−03 | −1.2522708E−03 | −1.5025692E−03 | −8.8779349E−04 |
| 5 | −1.9667203E−03 | −2.4126701E−04 | −7.4077964E−04 | −3.2523553E−04 | 3.7245701E−04 |
| 6 | 1.8552909E−01 | 7.8213362E−02 | −1.5933124E−01 | −3.0495393E−01 | −3.1008870E−01 |
| 8 | −4.4239455E+00 | −7.0551584E+00 | −5.2863607E−01 | 2.9711656E+01 | 3.5367037E+01 |
| 9 | 5.2533825E−02 | 2.0377416E−02 | −2.3639621E−02 | −3.3173528E−02 | −2.0551167E−02 |

| | RB12 | RB13 | RB14 | RB15 | RB16 |
|---|---|---|---|---|---|
| 3 | −7.3754543E−08 | 4.0863546E−09 | 7.7410874E−09 | 2.4728386E−09 | 9.8382699E−10 |
| 4 | −3.8544104E−04 | −1.0121616E−04 | 1.4384953E−05 | 3.0514916E−05 | 3.4476114E−05 |
| 5 | 1.2782920E−04 | 1.5497807E−05 | −1.1465342E−05 | −9.4093863E−06 | −5.1098939E−06 |
| 6 | −1.1326771E−01 | 3.4408415E−01 | 9.6065666E−01 | 9.1216148E−01 | 1.3713761E+00 |
| 8 | −4.9224855E+01 | −1.1319545E+02 | −7.0174265E+01 | 6.8172788E+01 | 2.2464106E+02 |
| 9 | 1.6091656E−03 | 1.6216750E−02 | 1.7359288E−02 | 1.0345716E−02 | −1.3171602E−05 |

| | RB17 | RB18 | RB19 | RB20 |
|---|---|---|---|---|
| 3 | −1.0275973E−10 | −1.0406251E−10 | −2.5737160E−11 | 7.7943813E−12 |
| 4 | 2.0454756E−05 | 6.8842829E−06 | −2.4711604E−06 | −3.4993937E−06 |
| 5 | −4.3702318E−06 | −7.6964885E−06 | −2.1391669E−07 | 1.9374794E−06 |
| 6 | −2.0090641E+00 | −2.3622314E+00 | −5.7354777E+00 | 7.6898338E+00 |
| 8 | 6.1241420E+02 | 1.5523300E+02 | −2.4877269E+03 | 1.5817092E+03 |
| 9 | −8.3417454E−03 | −9.8424635E−03 | −6.1108055E−03 | 8.9355225E−03 |

TABLE 24

EXAMPLE 24

(A)

| Si | Ri | Di | Ndj | νdj |
|---|---|---|---|---|
| 1 | 16.1932 | 1.3804 | 1.77250 | 49.6 |
| 2 | 4.4649 | 2.3447 | | |
| *3 | 8.5974 | 1.0500 | 1.53391 | 55.9 |
| *4 | 1.0674 | 0.7205 | | |
| *5 | 1.8899 | 2.2000 | 1.63360 | 23.6 |
| *6 | ∞ | 0.2200 | | |
| 7(St) | ∞ | 0.2906 | | |
| *8 | ∞ | 1.7538 | 1.53391 | 55.9 |
| *9 | −1.1165 | 1.5000 | | |
| 10 | ∞ | 0.7000 | 1.51680 | 64.2 |
| 11 | ∞ | 0.3383 | | |
| IMAGE PLANE | ∞ | | | |

(B)

| Fno | |
|---|---|
| BF(in Air) | 2.30 |
| L(in Air) | 12.26 |
| f | 1.14 |
| f1 | −8.41 |
| f2 | −2.40 |
| f3 | 2.98 |
| f4 | 2.09 |
| f34 | 3.01 |
| f123 | −11.40 |

(C)

| SURFACE NUMBER | KA | RB3 | RB4 | RB5 | RB6 |
|---|---|---|---|---|---|
| 3 | 0.0000000E+00 | 1.0840884E−02 | −7.8635056E−03 | −3.2665411E−04 | 8.4304770E−05 |
| 4 | 0.0000000E+00 | 7.3863870E−02 | −3.3570477E−02 | 1.2203732E−02 | 9.6825170E−03 |
| 5 | 0.0000000E+00 | −2.7520575E−02 | 6.7983374E−02 | −1.5152928E−02 | 2.9729475E−05 |
| 6 | 0.0000000E+00 | 3.9132795E−02 | −5.6650187E−02 | 5.7078949E−02 | 1.0670505E−01 |
| 8 | −3.0653931E−07 | −3.9878167E−02 | −6.7597802E−02 | −2.6749893E−01 | 1.1794565E+00 |
| 9 | 0.0000000E+00 | −7.3799530E−02 | 9.4484481E−02 | −7.4095574E−02 | −1.3404290E−02 |

| | RB7 | RB8 | RB9 | RB10 | RB11 |
|---|---|---|---|---|---|
| 3 | 3.2613770E−05 | 6.8435065E−06 | 5.7179258E−07 | −1.5398482E−07 | −9.2340568E−08 |
| 4 | 8.7431999E−04 | −1.2179439E−03 | −9.2445163E−04 | −4.8554779E−04 | −1.8757544E−04 |
| 5 | 3.7916471E−03 | 1.5521621E−03 | −4.5484525E−06 | −2.9836287E−04 | −1.7288676E−04 |
| 6 | 1.4658184E−05 | −9.5855639E−02 | −5.6986103E−02 | −5.8655217E−02 | −2.0917184E−02 |
| 8 | −9.3739945E−01 | −1.1779172E+00 | −1.4043204E−01 | 2.7508992E+00 | 2.6574860E+00 |
| 9 | 2.0683511E−02 | 9.0825138E−03 | −2.6312877E−03 | −5.2566713E−03 | −3.5375416E−03 |

| | RB12 | RB13 | RB14 | RB15 | RB16 |
|---|---|---|---|---|---|
| 3 | −3.1584617E−08 | −6.7892996E−09 | −7.1683700E−10 | 3.3352823E−10 | 2.8039043E−10 |
| 4 | −2.3986395E−05 | 5.5411500E−05 | −6.1350390E−06 | −2.6281426E−06 | −6.7187873E−07 |
| 5 | −4.3152153E−05 | 5.0316772E−05 | 9.5788285E−07 | −1.6429810E−06 | −2.4802545E−06 |
| 6 | 1.6062322E−02 | 1.3200323E−01 | 1.4549135E−01 | 3.1627017E−02 | −6.9400047E−02 |
| 8 | −2.4187030E+00 | −4.4845308E+00 | −2.1773579E+00 | 1.4877129E+00 | 3.7827381E+00 |
| 9 | −6.5442043E−04 | 3.5812212E−04 | 5.5149146E−04 | 4.2539773E−04 | 2.0124978E−04 |

| | RB17 | RB18 | RB19 | RB20 |
|---|---|---|---|---|
| 3 | 1.3661845E−10 | 4.2632244E−11 | 2.4953488E−12 | −7.5365998E−12 |
| 4 | 5.9129031E−08 | 2.6842531E−07 | 2.6392422E−07 | 2.1576211E−07 |
| 5 | −1.9447676E−06 | −1.2247259E−06 | −2.7154630E−07 | 4.2258858E−07 |
| 6 | 1.6921584E−01 | −2.1987059E−01 | −9.6024239E−01 | 8.8070586E−01 |
| 8 | 8.2390345E+00 | 2.4455762E−01 | −1.9020265E+01 | 1.0361449E+01 |
| 9 | 3.7908012E−05 | −2.5975570E−05 | −4.5639461E−05 | 1.1767671E−05 |

TABLE 25

EXAMPLE 25

(A)

| Si | Ri | Di | Ndj | νdj |
|---|---|---|---|---|
| 1 | 17.3709 | 1.2500 | 1.77250 | 49.6 |
| 2 | 4.2759 | 2.8949 | | |
| *3 | −1.8500 | 1.1524 | 1.53391 | 55.9 |
| *4 | 2.5500 | 0.1964 | | |
| *5 | 1.5504 | 2.8232 | 1.63360 | 23.6 |
| *6 | ∞ | 0.2152 | | |
| 7(St) | ∞ | 0.2050 | | |
| *8 | ∞ | 1.7883 | 1.53391 | 55.9 |
| *9 | −0.9023 | 1.0000 | | |
| 10 | ∞ | 0.7000 | 1.51680 | 64.2 |
| 11 | ∞ | 0.3692 | | |
| IMAGE PLANE | ∞ | | | |

(B)

| | |
|---|---|
| Fno | |
| BF(in Air) | 1.83 |
| L(in Air) | 12.36 |
| f | 0.81 |
| f1 | −7.66 |
| f2 | −1.84 |
| f3 | 2.45 |
| f4 | 1.69 |
| f34 | 5.03 |
| f123 | −9.78 |

(C)

| SURFACE NUMBER | KA | RB3 | RB4 | RB5 | RB6 |
|---|---|---|---|---|---|
| 3 | 0.0000000E+00 | 1.2031440E−01 | −1.4922177E−02 | −1.1057907E−03 | 1.2265390E−05 |
| 4 | 0.0000000E+00 | 1.4628587E−01 | 6.3017455E−03 | −5.1717128E−02 | 2.5032113E−02 |
| 5 | 0.0000000E+00 | 5.4749477E−02 | −4.7401933E−02 | 5.3874980E−02 | −2.2897915E−03 |
| 6 | 0.0000000E+00 | −1.2468997E−02 | 1.7262376E−01 | −2.3164004E−01 | 4.0612148E−02 |
| 8 | 0.0000000E+00 | −1.5827643E−02 | −1.1010380E−01 | −9.0987493E−01 | 4.2242195E+00 |
| 9 | 0.0000000E+00 | 1.0647852E−02 | −3.3848030E−02 | 1.9873223E−03 | −1.3445561E−02 |

| | RB7 | RB8 | RB9 | RB10 | RB11 |
|---|---|---|---|---|---|
| 3 | 4.6807696E−05 | 1.5669432E−05 | 7.6886013E−07 | −6.9972453E−07 | −2.7318005E−07 |
| 4 | 1.5440033E−02 | 3.1938636E−03 | −1.0400210E−03 | −1.3992347E−03 | −8.5474061E−04 |
| 5 | −2.5881279E−03 | −4.6462627E−04 | −7.2947495E−04 | −2.4590658E−04 | 4.4966266E−04 |
| 6 | 1.4752492E−01 | 1.5731613E−02 | −2.1578345E−01 | −3.1305341E−01 | −2.2953866E−01 |
| 8 | −4.3526850E+00 | −6.8404692E+00 | −2.2707595E−01 | 2.9835995E+01 | 3.4941141E+01 |
| 9 | 4.7504645E−02 | 1.4767126E−02 | −2.6062200E−02 | −3.2714519E−02 | −1.8690717E−02 |

| | RB12 | RB13 | RB14 | RB15 | RB16 |
|---|---|---|---|---|---|
| 3 | −7.3804821E−08 | 2.8075729E−09 | 7.1071572E−09 | 2.2665644E−09 | 9.3651468E−10 |
| 4 | −3.8670595E−04 | −1.1404243E−04 | 1.1648874E−06 | 2.0993228E−05 | 2.9069908E−05 |
| 5 | 1.7137181E−04 | 2.6350131E−05 | −1.3710897E−05 | −1.8144646E−05 | −1.3420018E−05 |
| 6 | 6.4936794E−02 | 5.9013521E−01 | 1.1755377E+00 | 9.3765846E−01 | 9.9647396E−01 |
| 8 | −5.0752963E+01 | −1.1615801E+02 | −7.3961297E+01 | 6.6546863E+01 | 2.3185791E+02 |
| 9 | 3.5545372E−03 | 1.7485472E−02 | 1.7722559E−02 | 9.9312839E−03 | −8.7747712E−04 |

| | RB17 | RB18 | RB19 | RB20 |
|---|---|---|---|---|
| 3 | −1.0945731E−10 | −1.0256105E−10 | −2.4270730E−11 | 8.4487511E−12 |
| 4 | 1.8220691E−05 | 6.5870933E−06 | −1.8200537E−06 | −2.5470288E−06 |
| 5 | −1.0563392E−05 | −1.0772354E−05 | −4.7181504E−07 | 3.8781104E−06 |
| 6 | −2.5186928E+00 | −3.6970092E+00 | −6.5278757E+00 | 1.0815726E+01 |
| 8 | 6.4050224E+02 | 2.1175331E+02 | −2.4444890E+03 | 1.3756663E+03 |
| 9 | −9.2659972E−03 | −1.0445366E−02 | −6.0635409E−03 | 9.8890364E−03 |

TABLE 26

EXAMPLE 26

(A)

| Si | Ri | Di | Ndj | vdj |
|---|---|---|---|---|
| 1 | 17.1498 | 1.2500 | 1.77250 | 49.6 |
| 2 | 4.2669 | 2.8734 | | |
| *3 | −1.8499 | 1.2000 | 1.53391 | 55.9 |
| *4 | 2.6487 | 0.5390 | | |
| *5 | 1.4790 | 2.5673 | 1.63360 | 23.6 |
| *6 | 200.0000 | 0.2166 | | |
| 7(St) | ∞ | 0.2039 | | |
| *8 | −8.1763 | 1.7823 | 1.53391 | 55.9 |
| *9 | −0.9287 | 1.2000 | | |
| 10 | ∞ | 0.7000 | 1.51680 | 64.2 |
| 11 | ∞ | 0.1700 | | |
| IMAGE PLANE | ∞ | | | |

(B)

| | |
|---|---|
| Fno | |
| BF(in Air) | 1.83 |
| L(in Air) | 12.46 |
| f | 0.86 |
| f1 | −7.68 |
| f2 | −1.87 |
| f3 | 2.34 |
| f4 | 1.81 |
| f34 | 4.48 |
| f123 | 13.71 |

(C)

| SURFACE NUMBER | KA | RB3 | RB4 | RB5 | RB6 |
|---|---|---|---|---|---|
| 3 | 0.0000000E+00 | 1.2080988E−01 | −1.4784758E−02 | −1.0885353E−03 | 1.0993172E−05 |
| 4 | 0.0000000E+00 | 1.2379169E−01 | 1.1175202E−02 | −5.1820402E−02 | 2.4808675E−02 |
| 5 | 0.0000000E+00 | 4.2804392E−02 | −4.9905623E−02 | 5.4198161E−02 | −2.0091797E−03 |
| 6 | 0.0000000E+00 | −1.5605966E−02 | 1.7893557E−01 | −2.2989947E−01 | 4.3540592E−02 |
| 8 | 0.0000000E+00 | −1.3796547E−02 | −1.5859944E−01 | −9.4275326E−01 | 4.2341516E+00 |
| 9 | 0.0000000E+00 | 1.2634772E−02 | −4.0577000E−02 | −3.4331189E−03 | −1.7664321E−02 |

| | RB7 | RB8 | RB9 | RB10 | RB11 |
|---|---|---|---|---|---|
| 3 | 4.5129608E−05 | 1.4976964E−05 | 5.5851156E−07 | −7.5084983E−07 | −2.8253746E−07 |
| 4 | 1.5354077E−02 | 3.1693819E−03 | −1.0435783E−03 | −1.3959069E−03 | −8.4940586E−04 |
| 5 | −2.4395456E−03 | −3.8025641E−04 | −6.7851413E−04 | −2.1602480E−04 | 4.6557069E−04 |
| 6 | 1.5473403E−01 | 2.4372990E−02 | −2.1137109E−01 | −3.1786478E−01 | −2.4542581E−01 |
| 8 | −4.3007565E+00 | −6.7831155E+00 | −2.4536428E−01 | 2.9614840E+01 | 3.4364730E+01 |
| 9 | 4.4814576E−02 | 1.3538049E−02 | −2.6225873E−02 | −3.2297434E−02 | −1.8105224E−02 |

| | RB12 | RB13 | RB14 | RB15 | RB16 |
|---|---|---|---|---|---|
| 3 | −7.4582071E−08 | 3.1210233E−09 | 7.3169396E−09 | 2.3448836E−09 | 9.5855059E−10 |
| 4 | −3.8140505E−04 | −1.0968175E−04 | 4.3013184E−06 | 2.2986995E−05 | 3.0172028E−05 |
| 5 | 1.7863152E−04 | 2.8876900E−05 | −1.3358333E−05 | −1.8520354E−05 | −1.3841079E−05 |
| 6 | 4.0639775E−02 | 5.6106517E−01 | 1.1563370E+00 | 9.4584517E−01 | 1.0220895E+00 |
| 8 | −5.1787784E+01 | −1.1752494E+02 | −7.4949932E+01 | 6.7804018E+01 | 2.3901505E+02 |
| 9 | 4.0338227E−03 | 1.7724115E−02 | 1.7698543E−02 | 9.6976340E−03 | −1.2263719E−03 |

| | RB17 | RB18 | RB19 | RB20 |
|---|---|---|---|---|
| 3 | −1.0491600E−10 | −1.0220061E−10 | −2.4539504E−11 | 8.2432386E−12 |
| 4 | 1.8715318E−05 | 6.7171828E−06 | −1.8772365E−06 | −2.6774320E−06 |
| 5 | −1.0793291E−05 | −1.0789970E−05 | −3.3790494E−07 | 4.0902160E−06 |
| 6 | −2.4904209E+00 | −3.5933790E+00 | −6.4240868E+00 | 1.0539422E+01 |
| 8 | 6.5876276E+02 | 2.4347176E+02 | −2.4183382E+03 | 1.2952504E+03 |
| 9 | −9.6218071E−03 | −1.0703654E−02 | −6.1350835E−03 | 1.0073497E−02 |

TABLE 27

EXAMPLE 27

(A)

| Si | Ri | Di | Ndj | νdj |
|---|---|---|---|---|
| 1 | 15.8404 | 1.1000 | 1.77250 | 49.6 |
| 2 | 4.1773 | 2.3130 | | |
| *3 | −2.2495 | 1.1000 | 1.53391 | 55.9 |
| *4 | 4.5058 | 0.8004 | | |
| *5 | 2.0301 | 2.2000 | 1.63360 | 23.6 |
| *6 | ∞ | 0.2947 | | |
| 7(St) | ∞ | 0.2501 | | |
| *8 | ∞ | 2.0735 | 1.53391 | 55.9 |
| *9 | −1.2050 | 1.5000 | | |
| 10 | ∞ | 0.8000 | 1.51680 | 64.2 |
| 11 | ∞ | 0.1583 | | |
| IMAGE PLANE | ∞ | | | |

(B)

| | |
|---|---|
| Fno | |
| BF(in Air) | 2.19 |
| L(in Air) | 12.32 |
| f | 1.10 |
| f1 | −7.66 |
| f2 | −2.66 |
| f3 | 3.20 |
| f4 | 2.26 |
| f34 | 3.26 |
| f123 | 34.86 |

(C)

| SURFACE NUMBER | KA | RB3 | RB4 | RB5 | RB6 |
|---|---|---|---|---|---|
| 3 | 0.0000000E+00 | 1.3239849E−01 | −7.0704955E−03 | −4.4174577E−03 | −1.7843524E−04 |
| 4 | 0.0000000E+00 | 1.6185476E−01 | −6.0668361E−02 | 4.5465154E−02 | 8.4263908E−03 |
| 5 | 0.0000000E+00 | 5.7164565E−03 | 3.5062587E−02 | −2.4924679E−02 | 1.1385026E−02 |
| 6 | 0.0000000E+00 | 1.8020549E−02 | −3.3015779E−03 | 7.4477617E−02 | −5.9737621E−02 |
| 8 | 0.0000000E+00 | −4.2538101E−04 | −4.6952453E−02 | −1.5284583E−01 | 6.3168277E−01 |
| 9 | 0.0000000E+00 | −9.4465595E−03 | 1.7447793E−02 | −2.8150851E−02 | 1.8074510E−02 |

| | RB7 | RB8 | RB9 | RB10 | RB11 |
|---|---|---|---|---|---|
| 3 | 9.4421106E−05 | 2.5161997E−05 | 2.5996154E−06 | −3.4655610E−07 | −2.4869042E−07 |
| 4 | −3.5554028E−03 | −2.5549963E−03 | −8.8668762E−04 | −2.0549054E−04 | −1.9558142E−05 |
| 5 | 5.3179334E−03 | −4.2711092E−04 | −1.1173733E−03 | −4.7161467E−04 | −4.9992943E−05 |
| 6 | −3.2011151E−02 | 1.8443841E−02 | 3.6469897E−02 | 1.7649288E−02 | 1.0625375E−02 |
| 8 | −4.7602967E−01 | −5.0744980E−01 | −1.3344932E−02 | 9.5600914E−01 | 7.7926517E−01 |
| 9 | 1.4653054E−02 | −2.2839095E−03 | −6.6086470E−03 | −3.8172126E−03 | −6.4647345E−04 |

| | RB12 | RB13 | RB14 | RB15 | RB16 |
|---|---|---|---|---|---|
| 3 | −7.3197449E−08 | −1.3502387E−08 | −9.9204864E−10 | 5.1030382E−10 | 3.1032785E−10 |
| 4 | 1.3098627E−05 | 1.1506754E−05 | 6.4509838E−06 | 3.0592596E−06 | 1.3589366E−06 |
| 5 | 5.4207175E−05 | 4.4621073E−05 | 1.9235939E−05 | 3.7825529E−06 | −1.6395183E−06 |
| 6 | −8.4605725E−03 | −5.4022575E−04 | −2.2666409E−02 | −3.0102604E−02 | −3.2857866E−02 |
| 8 | −6.7830177E−01 | −1.1411200E+00 | −5.7609461E−01 | 2.0525388E−01 | 7.1840617E−01 |
| 9 | 9.4441914E−04 | 1.1512827E−03 | 7.1543707E−04 | 2.1805947E−04 | −1.1009195E−04 |

| | RB17 | RB18 | RB19 | RB20 |
|---|---|---|---|---|
| 3 | 1.1023440E−10 | 2.5204233E−11 | 1.3835343E−12 | −3.2314730E−12 |
| 4 | 5.1630127E−07 | 1.2810177E−07 | −3.6377915E−08 | −8.9357052E−08 |
| 5 | −2.1184703E−06 | −1.1990072E−06 | −2.5328821E−07 | 3.3607235E−07 |
| 6 | −6.6330045E−02 | 1.3408938E−01 | 4.3813498E−02 | −5.8313883E−02 |
| 8 | 1.4767265E+00 | 4.9201806E−01 | −1.8270329E+00 | 1.0634952E−01 |
| 9 | −2.2609645E−04 | −1.8060882E−04 | −5.2240722E−05 | 1.0244036E−04 |

TABLE 28

EXAMPLE 28

(A)

| Si | Ri | Di | Ndj | νdj |
|---|---|---|---|---|
| 1 | 15.8423 | 1.1000 | 1.77250 | 49.6 |
| 2 | 4.1794 | 2.2842 | | |
| *3 | −1.7856 | 1.1000 | 1.53391 | 55.9 |
| *4 | 35.1894 | 0.8001 | | |
| *5 | 2.4320 | 2.2000 | 1.63360 | 23.6 |
| *6 | ∞ | 0.2859 | | |
| 7(St) | ∞ | 0.2508 | | |
| *8 | ∞ | 2.0418 | 1.53391 | 55.9 |
| *9 | −1.1954 | 1.6000 | | |
| 10 | ∞ | 0.7000 | 1.51680 | 64.2 |
| 11 | ∞ | 0.1713 | | |
| IMAGE PLANE | ∞ | | | |

(B)

| | |
|---|---|
| Fno | |
| BF(in Air) | 2.23 |
| L(in Air) | 12.30 |
| f | 1.09 |
| f1 | −7.66 |
| f2 | −3.15 |
| f3 | 3.84 |
| f4 | 2.24 |
| f34 | 3.00 |
| f123 | 393.59 |

(C)

| SURFACE NUMBER | KA | RB3 | RB4 | RB5 | RB6 |
|---|---|---|---|---|---|
| 3 | 0.0000000E+00 | 1.5873607E−01 | −7.9449729E−03 | −5.0519830E−03 | −2.0810309E−04 |
| 4 | 0.0000000E+00 | 1.7929152E−01 | −7.5345253E−02 | 5.7325466E−02 | 1.2360152E−02 |
| 5 | 0.0000000E+00 | 5.4292893E−03 | 3.4769792E−02 | −1.9648861E−02 | 1.1451636E−02 |
| 6 | 0.0000000E+00 | 1.7509337E−02 | 5.4736224E−03 | 5.9122184E−02 | −6.4504826E−02 |
| 8 | 0.0000000E+00 | 4.3985059E−04 | −2.1075156E−02 | −2.1018811E−01 | 6.3485681E−01 |
| 9 | 0.0000000E+00 | −6.7794168E−03 | 1.2319759E−02 | −2.2085738E−02 | 1.6099915E−02 |

| | RB7 | RB8 | RB9 | RB10 | RB11 |
|---|---|---|---|---|---|
| 3 | 1.0962082E−04 | 2.9317742E−05 | 2.8586084E−06 | −5.4690445E−07 | −3.4869749E−07 |
| 4 | −3.4421113E−03 | −3.0036039E−03 | −1.1603714E−03 | −3.1068665E−04 | −4.5487996E−05 |
| 5 | 4.2355186E−03 | −9.8043631E−04 | −1.2107005E−03 | −4.1119260E−04 | 1.0640729E−05 |
| 6 | −1.4740626E−02 | 3.6725351E−02 | 3.9691072E−02 | 4.1328666E−03 | −8.3811076E−03 |
| 8 | −4.0973012E−01 | −4.5199448E−01 | −2.8713646E−02 | 8.6284071E−01 | 6.5591906E−01 |
| 9 | 1.2900517E−02 | −2.3406518E−03 | −6.0311467E−03 | −3.3608869E−03 | −4.7551121E−04 |

| | RB12 | RB13 | RB14 | RB15 | RB16 |
|---|---|---|---|---|---|
| 3 | −1.0014130E−07 | −1.8462096E−08 | −1.0411645E−09 | 9.0230179E−10 | 5.1467270E−10 |
| 4 | 1.2760408E−05 | 1.6052896E−05 | 9.9036217E−06 | 4.8325087E−06 | 2.0281812E−06 |
| 5 | 8.1943524E−05 | 5.0177982E−05 | 1.6935395E−05 | 9.8617474E−07 | −2.8060310E−06 |
| 6 | −1.7805960E−02 | −2.1183948E−02 | −8.1846303E−03 | −2.5695326E−02 | −2.2000643E−02 |
| 8 | −7.5057034E−01 | −1.0839359E+00 | −3.5778857E−01 | 5.2377275E−01 | 9.5069006E−01 |
| 9 | 9.2629379E−04 | 1.0680850E−03 | 6.4128706E−04 | 1.7787396E−04 | −1.1981354E−04 |

| | RB17 | RB18 | RB19 | RB20 |
|---|---|---|---|---|
| 3 | 1.6922408E−10 | 2.6837188E−11 | 1.5887761E−12 | −4.3195137E−12 |
| 4 | 6.6943295E−07 | 9.8220617E−08 | −1.0192113E−07 | −1.1580108E−07 |
| 5 | −2.2512173E−06 | −9.9877677E−07 | 3.5339981E−08 | 2.2504560E−07 |
| 6 | −5.8730082E−02 | 1.5926052E−01 | 5.5529039E−02 | −9.6942012E−02 |
| 8 | 1.3366507E+00 | −2.3123165E−01 | −2.7422354E+00 | 1.2742351E+00 |
| 9 | −2.1866704E−04 | −1.6899008E−04 | −4.5148935E−05 | 1.0087191E−04 |

TABLE 29

CONDITIONAL FORMULA

| EXAMPLE | (1) vd2/vd3 | (2) Nd3 − Nd2 | (3) \|f2/f\| | (4) D2/f | (5) f3/f | (6) (R8 − R9)/(R8 + R9) | (7) \|R8/f\| | (8) L/f | (9) Bf/f | (10) (D4 + D5)/f | (11) R4/f | (12) (R3 − R4)/(R3 + R4) | (13) R1/f | (14) R6/f |
|---|---|---|---|---|---|---|---|---|---|---|---|---|---|---|
| 1 | 2.37 | 0.10 | 2.22 | 2.03 | 2.89 | 1.00 | 922.25 | 11.34 | 2.14 | 2.79 | 0.97 | 0.76 | 15.61 | 922.25 |
| 2 | 2.37 | 0.10 | 2.29 | 3.33 | 2.83 | 0.82 | 11.08 | 14.40 | 2.13 | 3.51 | 3.10 | −7.15 | 19.99 | 37.29 |
| 3 | 2.37 | 0.10 | 2.14 | 2.06 | 2.88 | 0.99 | 179.09 | 11.02 | 2.22 | 2.66 | 0.93 | 0.76 | 16.24 | 179.09 |
| 4 | 2.37 | 0.10 | 2.05 | 2.06 | 2.85 | 0.96 | 46.64 | 11.08 | 2.24 | 2.69 | 0.87 | 0.74 | 14.77 | 72.85 |
| 5 | 2.37 | 0.10 | 2.01 | 2.06 | 2.86 | 0.96 | 49.79 | 11.09 | 2.26 | 2.72 | 0.84 | 0.73 | 14.71 | 63.97 |
| 6 | 2.37 | 0.10 | 2.06 | 2.06 | 2.69 | 0.75 | 7.04 | 11.20 | 2.30 | 2.79 | 0.90 | 0.77 | 15.05 | 41.15 |
| 7 | 2.37 | 0.10 | 2.22 | 2.06 | 3.02 | 0.98 | 79.91 | 10.88 | 2.24 | 2.63 | 0.95 | 0.74 | 15.91 | 7.43 |
| 8 | 2.19 | 0.08 | 2.20 | 2.06 | 2.86 | 0.97 | 73.39 | 10.82 | 2.15 | 2.57 | 0.96 | 0.76 | 15.31 | 13.40 |
| 9 | 2.37 | 0.10 | 2.18 | 2.06 | 2.81 | 1.00 | 881.72 | 10.86 | 2.15 | 2.58 | 0.95 | 0.76 | 15.60 | 881.72 |
| 10 | 2.66 | 0.12 | 2.15 | 2.05 | 2.84 | 1.00 | 916.64 | 11.28 | 2.16 | 2.79 | 0.94 | 0.76 | 15.74 | 916.64 |
| 11 | 2.19 | 0.08 | 2.90 | 3.24 | 4.13 | 0.89 | 17.92 | 15.85 | 2.32 | 4.13 | 3.88 | −7.18 | 25.96 | 39.94 |
| 12 | 2.37 | 0.10 | 2.17 | 3.28 | 3.19 | 0.89 | 17.99 | 15.12 | 2.26 | 3.84 | 2.53 | 107.65 | 22.38 | 38.74 |
| 13 | 2.37 | 0.10 | 2.38 | 3.24 | 3.08 | 0.94 | 35.10 | 14.33 | 2.12 | 3.48 | 3.16 | −7.80 | 19.75 | 33.94 |
| 14 | 2.37 | 0.10 | 2.29 | 3.33 | 2.83 | 0.82 | 11.08 | 14.40 | 2.13 | 3.51 | 3.10 | −7.15 | 19.99 | 37.29 |
| 15 | 2.37 | 0.10 | 2.13 | 2.64 | 2.97 | 0.97 | 88.96 | 13.37 | 2.31 | 3.54 | 1.25 | 1.16 | 21.20 | 53.42 |
| 16 | 2.37 | 0.10 | 2.12 | 2.10 | 2.76 | 1.00 | 896.15 | 11.02 | 2.03 | 2.87 | 2.59 | −15.61 | 14.22 | 43.90 |
| 17 | 2.37 | 0.10 | 2.47 | 2.10 | 2.91 | 1.00 | 903.20 | 11.13 | 1.95 | 2.71 | 4.54 | −2.57 | 14.28 | 44.24 |
| 18 | 2.37 | 0.10 | 2.02 | 2.10 | 2.69 | 1.00 | 890.69 | 10.84 | 1.99 | 2.85 | 2.42 | −24.03 | 18.47 | 43.64 |
| 19 | 2.63 | 0.14 | 2.27 | 2.10 | 2.79 | 0.96 | 47.14 | 10.84 | 2.03 | 2.66 | 3.40 | −3.63 | 14.11 | 43.20 |
| 20 | 2.37 | 0.10 | 1.96 | 2.10 | 2.37 | 0.91 | 21.09 | 11.04 | 2.03 | 2.79 | 2.64 | −6.56 | 14.36 | 16.73 |
| 21 | 2.66 | 0.12 | 2.13 | 2.86 | 2.85 | 0.80 | 9.57 | 13.38 | 2.26 | 3.28 | 2.88 | −7.15 | 20.33 | 42.70 |
| 22 | 2.37 | 0.10 | 2.16 | 3.12 | 2.76 | 0.82 | 10.60 | 13.69 | 2.24 | 3.25 | 2.96 | −6.57 | 19.08 | 16.42 |
| 23 | 2.37 | 0.10 | 2.16 | 3.15 | 2.74 | 0.81 | 10.11 | 13.65 | 2.22 | 3.20 | 2.94 | −6.60 | 19.82 | 222.31 |
| 24 | 2.37 | 0.10 | 2.11 | 2.06 | 2.62 | 1.00 | ∞ | 10.78 | 2.02 | 2.57 | 0.94 | 0.78 | 14.23 | ∞ |
| 25 | 2.37 | 0.10 | 2.26 | 3.56 | 3.01 | 1.00 | ∞ | 15.18 | 2.25 | 3.71 | 3.13 | −6.29 | 21.34 | ∞ |
| 26 | 2.37 | 0.10 | 2.17 | 3.35 | 2.72 | 0.80 | 9.52 | 14.51 | 2.13 | 3.62 | 3.08 | −5.63 | 19.97 | 232.86 |
| 27 | 2.37 | 0.10 | 2.42 | 2.10 | 2.91 | 1.00 | ∞ | 11.19 | 1.98 | 2.72 | 4.09 | −2.99 | 14.39 | ∞ |
| 28 | 2.37 | 0.10 | 2.90 | 2.10 | 3.53 | 1.00 | ∞ | 11.30 | 2.05 | 2.76 | 32.35 | −1.11 | 14.56 | ∞ |

TABLE 30

CONDITIONAL FORMULA

| EXAMPLE | (15) D3/f | (16) (R1 − R2)/(R1 + R2) | (17) R1/L | (18) (R5 − R6)/(R5 + R6) | (19) f/f123 | (20) f34/f |
|---|---|---|---|---|---|---|
| 1 | 0.97 | 0.59 | 1.38 | −1.00 | −0.11 | 2.74 |
| 2 | 1.40 | 0.60 | 1.39 | −0.91 | 0.03 | 4.80 |
| 3 | 0.94 | 0.61 | 1.47 | −0.98 | −0.15 | 2.69 |
| 4 | 0.91 | 0.58 | 1.33 | −0.95 | −0.14 | 2.58 |
| 5 | 0.91 | 0.58 | 1.33 | −0.95 | −0.15 | 2.55 |
| 6 | 0.92 | 0.59 | 1.34 | −0.92 | −0.08 | 2.70 |
| 7 | 0.93 | 0.60 | 1.46 | −0.63 | −0.24 | 2.68 |
| 8 | 0.92 | 0.59 | 1.41 | −0.78 | −0.19 | 2.68 |
| 9 | 0.93 | 0.60 | 1.44 | −1.00 | −0.14 | 2.65 |
| 10 | 0.96 | 0.59 | 1.40 | −1.00 | −0.11 | 2.68 |
| 11 | 1.58 | 0.61 | 1.64 | −0.88 | −0.08 | 4.52 |
| 12 | 1.44 | 0.56 | 1.48 | −0.90 | −0.06 | 5.29 |
| 13 | 1.34 | 0.58 | 1.38 | −0.89 | −0.02 | 4.65 |
| 14 | 1.40 | 0.60 | 1.39 | −0.91 | 0.03 | 4.80 |
| 15 | 1.05 | 0.63 | 1.59 | −0.93 | −0.05 | 4.24 |
| 16 | 0.99 | 0.56 | 1.29 | −0.93 | 0.04 | 2.77 |
| 17 | 0.99 | 0.58 | 1.28 | −0.92 | 0.03 | 3.01 |
| 18 | 0.98 | 0.65 | 1.70 | −0.93 | 0.05 | 2.64 |
| 19 | 0.97 | 0.59 | 1.30 | −0.92 | 0.02 | 2.81 |
| 20 | 0.92 | 0.60 | 1.30 | −0.84 | 0.02 | 3.45 |
| 21 | 1.27 | 0.61 | 1.52 | −0.92 | −0.02 | 3.90 |
| 22 | 1.28 | 0.61 | 1.39 | −0.81 | −0.02 | 4.20 |
| 23 | 1.24 | 0.62 | 1.45 | −0.98 | 0.02 | 4.11 |
| 24 | 0.92 | 0.57 | 1.32 | −1.00 | −0.10 | 2.64 |
| 25 | 1.42 | 0.60 | 1.41 | −1.00 | −0.08 | 6.17 |
| 26 | 1.40 | 0.60 | 1.38 | −0.99 | 0.06 | 5.22 |
| 27 | 1.00 | 0.58 | 1.29 | −1.00 | 0.03 | 2.96 |
| 28 | 1.01 | 0.58 | 1.29 | −1.00 | 0.00 | 2.76 |

In all of the imaging lenses of Examples 1 through 28, first lens L1 is a glass spherical lens, and second lens L2, third lens L3 and fourth lens L4 are plastic aspherical lenses.

FIG. 32, Sections A through D, FIG. 33, Sections A through D, FIG. 34, Sections A through D, FIG. 35, Sections A through D, FIG. 36, Sections A through D, FIG. 37, Sections A through D, FIG. 38, Sections A through D, FIG. 39, Sections A through D, FIG. 40, Sections A through D, FIG. 41, Sections A through D, FIG. 42, Sections A through D, FIG. 43, Sections A through D, FIG. 44, Sections A through D, FIG. 45, Sections A through D, FIG. 46, Sections A through D, FIG. 47, Sections A through D, FIG. 48, Sections A through D, FIG. 49, Sections A through D, FIG. 50, Sections A through D, FIG. 51, Sections A through D, FIG. 52, Sections A through D, FIG. 53, Sections A through D, FIG. 54, Sections A through D, FIG. 55, Sections A through D, FIG. 56, Sections A through D, FIG. 57, Sections A through D, FIG. 58, Sections A through D, and FIG. 59, Sections A through D show aberration diagrams of the imaging lenses of Examples 1 through 28, respectively.

Here, the aberration diagrams of Example 1 will be explained as an example, but the aberration diagrams of the other examples are similar to those of Example 1. FIG. 32, Section A, FIG. 32, Section B, FIG. 32, Section C and FIG. 32, Section D illustrate a spherical aberration, astigmatism, distortion (distortion aberration), and a lateral chromatic aberration (a chromatic aberration of magnification) in the imaging lens of Example 1, respectively. In the diagram of a spherical aberration, F represents F-number, and in the other diagrams, ω represents a half angle of view. In the diagram of distortion, a shift amount from an ideal image height 2f×tan (φ/2) is illustrated by using focal length f of the entire system and angle φ of view (variable, 0≤φ≤ω). Each aberration diagram illustrates an aberration when d-line (587.56 nm) is a reference wavelength. The diagram of spherical aberrations illustrates aberrations also for F-line (wavelength 486.13 nm), C-line (wavelength 656.27 nm) and an offense against the sine condition (indicated as SNC). Further, the diagram of lateral chromatic aberrations illustrates aberrations for F-line and C-line. Since the kinds of line used in the diagram of lateral chromatic aberrations are the same as those used in the diagram of spherical aberrations, they are not written in the diagram of lateral chromatic aberrations.

As these data show, the imaging lens of Examples 1 through 28 consists of four lenses, which are small number of lenses, and producible in small size and at low cost. Further, it is possible to achieve an extremely wide angle of view, which is a full angle of view of about 150 to 200 degrees. Further, F-number is in the range of 2.0 to 2.6, which is small. Further, the imaging lens has high optical performance in which each aberration has been corrected in an excellent manner. These imaging lenses are appropriate for use in a surveillance camera, an in-vehicle camera for imaging an image on the front side, the lateral sides, the rear side or the like of a car, or the like.

Embodiment of Imaging Apparatus

Figure 60:
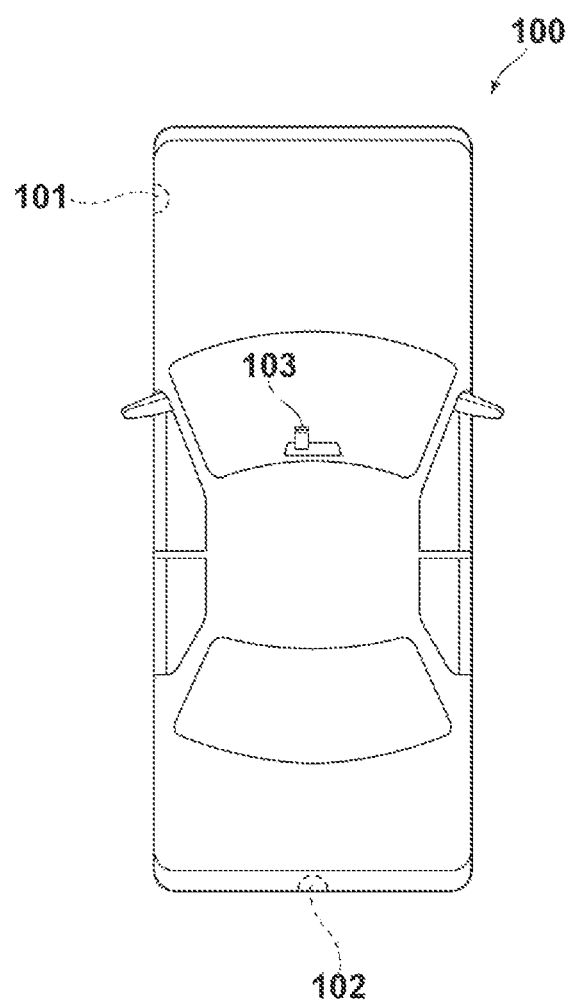
FIG. 60 is a diagram for explaining the arrangement of imaging apparatuses for in-vehicle use according to an embodiment of the present invention.

FIG. 60 illustrates, as an example of usage, a manner of mounting an imaging apparatus including the imaging lens of the embodiment of the present invention in a car 100. In FIG. 60, the car 100 includes an exterior camera 101 for imaging a driver's blind spot on a side of a seat next to the driver, an exterior camera 102 for imaging a driver's blind spot on a rear side of the car 100, and an interior camera 103 for imaging the same range as the driver's visual field. The interior camera 103 is attached to the back side of a rearview mirror. The exterior camera 101, the exterior camera 102, and the interior camera 103 are imaging apparatuses according to an embodiment of the present invention, and they include an imaging lens according to an example of the present invention and an imaging device for converting an optical image formed by the imaging lens into electrical signals.

The imaging lenses according to the examples of the present invention have the aforementioned advantages. Therefore, the exterior cameras 101 and 102, and the interior camera 103 can be structured also in small size and at low cost, and have wide angles of view. Further, they can obtain excellent images also in a peripheral portion of an image formation area.

So far, the present invention has been described by using embodiments and examples. However, the present invention is not limited to the aforementioned embodiments nor examples, and various modifications are possible. For example, values of a curvature radius, a distance between surfaces, a refractive index, and an Abbe number of each lens element are not limited to the values in the aforementioned examples of numerical values, but may be other values.

In the aforementioned examples, all of the lenses consist of homogeneous materials. Alternatively, a gradient index lens having distributed refractive indices may be used. Further, in the aforementioned examples, second lens L2 through fourth lens L4 consist of refraction-type lenses on which aspherical surfaces are formed. A diffraction optical element or elements may be formed on a surface or plural surfaces.

In the embodiment of the imaging apparatus, a case in which the present invention is applied to an in-vehicle camera was described with reference to the drawing. However, the use of the present invention is not limited to this purpose. For example, the present invention may be applied to a camera for a mobile terminal, a surveillance camera, and the like.

What is claimed is:
1. An imaging lens consisting of:
a negative first lens;
a negative second lens;
a third lens of a plano-convex shape having a convex surface directed toward an object side or of a positive meniscus shape having a convex surface directed toward the object side; and
a fourth lens of a plano-convex shape having a convex surface directed toward an image side or of a positive meniscus shape having a convex surface directed toward the image side, which are arranged in this order from the object side,
wherein the following conditional formula (1) is satisfied:

$$2.25 < vd2/vd3 \qquad (1),\text{where}$$

vd2: an Abbe number of a material of the second lens for d-line, and
vd3: an Abbe number of a material of the third lens for d-line.
2. The imaging lens, as defined in claim 1, wherein the following conditional formula (1-4) is satisfied:

$$2.25 < vd2/vd3 < 2.8 \qquad (1\text{-}4).$$

3. The imaging lens, as defined in claim 1, wherein the following conditional formula (1-6) is satisfied:

$$2.35 < vd2/vd3 < 2.6 \qquad (1\text{-}6).$$

4. The imaging lens, as defined in claim 1, wherein the following conditional formula (13) is satisfied:

$$8 < R1/f < 50 \qquad (13),\text{where}$$

R1: a curvature radius of an object-side surface of the first lens, and
f: a focal length of an entire system.
5. The imaging lens, as defined in claim 1, wherein the following conditional formula (14) is satisfied:

$$2 < R6/f \qquad (14),\text{where}$$

R6: a curvature radius of an image-side surface of the third lens, and
f: a focal length of an entire system.

6. The imaging lens, as defined in claim 1, wherein the following conditional formula (15) is satisfied:

$$0.5 < D3/f < 5.0 \quad (15)$$

where

D3: a center thickness of the second lens, and
f: a focal length of an entire system.

7. The imaging lens, as defined in claim 1, wherein the following conditional formula (16) is satisfied:

$$0.1 \leq (R1-R2)/(R1+R2) \leq 1.0 \quad (16)$$

where

R1: a curvature radius of an object-side surface of the first lens, and
R2: a curvature radius of an image-side surface of the first lens.

8. The imaging lens, as defined in claim 1, wherein the following conditional formula (17) is satisfied:

$$0.2 < R1/L < 3.0 \quad (17)$$

where

R1: a curvature radius of an object-side surface of the first lens, and
L: a distance from a vertex of an object-side surface of the first lens to an image plane.

9. The imaging lens, as defined in claim 1, wherein the following conditional formula (18) is satisfied:

$$-1.0 \leq (R5-R6)/(R5+R6) \leq -0.1 \quad (18)$$

where

R5: a curvature radius of an object-side surface of the third lens, and
R6: a curvature radius of an image-side surface of the third lens.

10. The imaging lens, as defined in claim 1, wherein the following conditional formula (19) is satisfied:

$$-0.8 < f/f123 < 0.8 \quad (19)$$

where f: a focal length of an entire system, and
f123: a combined focal length of the first lens, the second lens and the third lens.

11. The imaging lens, as defined in claim 1, wherein the following conditional formula (20) is satisfied:

$$1 \leq f34/f \leq 10 \quad (20)$$

where f34: a combined focal length of the third lens and the fourth lens, and
f: a focal length of an entire system.

12. The imaging lens, as defined in claim 1, wherein a material constituting the third lens is polycarbonate.

13. An imaging apparatus comprising:
the imaging lens, as defined in claim 1, mounted thereon.

14. An imaging lens consisting of:
a negative first lens;
a negative second lens;
a third lens of a plano-convex shape having a convex surface directed toward an object side or of a positive meniscus shape having a convex surface directed toward the object side; and
a fourth lens of a plano-convex shape having a convex surface directed toward an image side or of a positive meniscus shape having a convex surface directed toward the image side, which are arranged in this order from the object side,
wherein the following conditional formula (2) is satisfied:

$$0.09 < Nd3 - Nd2 \quad (2)$$

where

Nd2: a refractive index of a material of the second lens for d-line, and
Nd3: a refractive index of a material of the third lens for d-line.

15. The imaging lens, as defined in claim 14, wherein the following conditional formula (2-2) is satisfied:

$$0.09 < Nd3 - Nd2 < 0.16 \quad (2-2)$$

16. An imaging lens consisting of:
a negative first lens;
a negative second lens;
a third lens of a plano-convex shape having a convex surface directed toward an object side or of a positive meniscus shape having a convex surface directed toward the object side; and
a fourth lens of a plano-convex shape having a convex surface directed toward an image side or of a positive meniscus shape having a convex surface directed toward the image side, which are arranged in this order from the object side,
wherein the following conditional formula (8) is satisfied:

$$8.0 < L/f < 13.9 \quad (8)$$

where

L: a distance from a vertex of an object-side surface of the first lens to an image plane, and
f: a focal length of an entire system.

17. The imaging lens, as defined in claim 16, wherein the following conditional formula (8-2) is satisfied:

$$9.0 < L/f < 13.5 \quad (8-2)$$

18. The imaging lens, as defined in claim 16, wherein the following conditional formula (8-3) is satisfied:

$$10 < L/f < 13 \quad (8-3)$$

19. An imaging lens consisting of:
a negative first lens;
a negative second lens of a biconcave shape;
a third lens of a plane-convex shape having a convex surface directed toward an object side or of a positive meniscus shape having a convex surface directed toward the object side; and
a fourth lens of a plane-convex shape having a convex surface directed toward an image side or of a positive meniscus shape having a convex surface directed toward the image side, which are arranged in this order from the object side,
wherein the following conditional formula (9) is satisfied:

$$1.0 < Bf/f < 3.0 \quad (9)$$

where

Bf: a distance from a vertex of an image-side surface of a most-image-side lens to an image plane (a distance in air), and
f: a focal length of an entire system.

20. The imaging lens, as defined in claim 19, wherein the following conditional formula (9-2) is satisfied:

$$1.5 < Bf/f < 2.5 \quad (9-2)$$

21. The imaging lens, as defined in claim 19, wherein the following conditional formula (9-3) is satisfied:

$$1.7 < Bf/f < 2.3 \quad (9-3)$$

* * * * *